US012688766B2

(12) United States Patent
Shashikant et al.

(10) Patent No.: US 12,688,766 B2
(45) Date of Patent: Jul. 21, 2026

(54) AUTHORIZATION SYSTEM FOR INTEGRATED FEATURE OF SUPPORT APPARATUS

(71) Applicant: Hill-Rom Services, Inc., Batesville, IN (US)

(72) Inventors: Nishita Vanita Shashikant, Batesville, IN (US); Archana Vaidyanathan, Batesville, IN (US); Robert Mark Zerhusen, Cincinnati, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 669 days.

(21) Appl. No.: 17/989,028

(22) Filed: Nov. 17, 2022

(65) Prior Publication Data

US 2023/0162587 A1 May 25, 2023

Related U.S. Application Data

(60) Provisional application No. 63/304,796, filed on Jan. 31, 2022, provisional application No. 63/281,120, filed on Nov. 19, 2021.

(51) Int. Cl.
*G08B 21/04* (2006.01)
*G06F 3/0482* (2013.01)
(Continued)

(52) U.S. Cl.
CPC ....... *G08B 21/0469* (2013.01); *G06F 3/0482* (2013.01); *G07C 9/00658* (2013.01); *G06F 3/04847* (2013.01)

(58) Field of Classification Search
CPC ........... G08B 21/0469; A61G 2203/20; A61G 2203/16; A61G 2203/12; A61G 2203/10;
(Continued)

(56) References Cited

U.S. PATENT DOCUMENTS 7,027,358 B1 * 4/2006 Esposito ................... G04F 8/08
600/592
7,472,440 B2 1/2009 Bartlett et al.
(Continued)

FOREIGN PATENT DOCUMENTS

CN 112603326 A 12/2021
WO 2018072765 A1 4/2018
(Continued)

*Primary Examiner* — Kimberly S Berona
(74) *Attorney, Agent, or Firm* — Price Heneveld LLP

(57) ABSTRACT

An authorization system for a medical facility includes a support apparatus having a pneumatic system and a control panel coupled to the support apparatus. The control panel includes a display. The authorization system also includes a control unit communicatively coupled to the control panel. The control unit is configured to receive settings information for a continuous rotation function of the pneumatic system, seek authorization for at least one of enabling and activating the continuous rotation function via at least one of a key code and a multi-step authorization process via the display, activate the pneumatic system in a preview mode to adjust the pneumatic system through a single cycle of the continuous rotation function in response to receiving authorization, and activate the pneumatic system in an active mode for providing the continuous rotation function for a predefined period of time in response to receiving the authorization.

18 Claims, 33 Drawing Sheets

(51) Int. Cl.
  *G07C 9/00* (2020.01)
  *G06F 3/04847* (2022.01)
(58) Field of Classification Search
  CPC ........ A61G 7/018; A61G 7/05; A61G 7/0524;
          A61G 7/015; A61G 7/0507; G06F
          3/0482; G06F 3/04847; G07C 9/00658;
          G16H 40/63; G16H 20/40
  See application file for complete search history.

(56) References Cited

U.S. PATENT DOCUMENTS

| | | | |
|---|---|---|---|
| 8,413,271 B2 | 4/2013 | Blanchard et al. | |
| 8,789,222 B2 | 7/2014 | Blanchard et al. | |
| 9,126,571 B2 | 9/2015 | Lemire et al. | |
| 9,486,374 B2 * | 11/2016 | Heimbrock ....... | A61M 16/0003 |
| 10,052,249 B2 * | 8/2018 | Elliott ................. | G06F 3/04842 |
| 10,403,401 B2 | 9/2019 | Brosnan et al. | |
| 10,434,022 B2 | 10/2019 | Streeter, Jr. et al. | |
| 10,517,783 B2 | 12/2019 | Richards et al. | |
| 10,561,549 B2 | 2/2020 | Walton et al. | |
| 10,561,552 B2 | 2/2020 | Newkirk et al. | |
| 10,751,229 B2 | 8/2020 | Squitieri | |
| 10,857,050 B2 | 12/2020 | Huster et al. | |
| 11,071,665 B2 | 7/2021 | Peters et al. | |
| 11,116,681 B2 | 9/2021 | Zerhusen et al. | |
| 11,135,110 B2 * | 10/2021 | Zerhusen ............. | A47C 27/10 |
| 2002/0038392 A1 * | 3/2002 | De La Huerga ....... | G16H 20/17 |
| | | | 710/8 |
| 2002/0138905 A1 * | 10/2002 | Bartlett ................ | A61G 7/0507 |
| | | | 5/607 |
| 2003/0052787 A1 * | 3/2003 | Zerhusen ................ | G16Z 99/00 |
| | | | 340/286.07 |
| 2006/0101581 A1 * | 5/2006 | Blanchard ................ | A61G 7/00 |
| | | | 5/713 |
| 2006/0117482 A1 * | 6/2006 | Branson ............. | A61G 7/05769 |
| | | | 5/600 |
| 2011/0205061 A1 * | 8/2011 | Wilson ................. | G05B 19/042 |
| | | | 340/573.1 |

| | | | |
|---|---|---|---|
| 2012/0089419 A1 * | 4/2012 | Huster ................. | A61G 7/0528 |
| | | | 705/3 |
| 2013/0253291 A1 * | 9/2013 | Dixon .................... | A61B 90/98 |
| | | | 600/323 |
| 2014/0059766 A1 * | 3/2014 | Gibson .............. | A61G 7/05784 |
| | | | 5/600 |
| 2014/0266733 A1 * | 9/2014 | Hayes ...................... | A61G 7/05 |
| | | | 600/484 |
| 2015/0186611 A1 | 7/2015 | George et al. | |
| 2017/0172827 A1 * | 6/2017 | Schaaf ................... | A61G 5/006 |
| 2018/0081527 A1 * | 3/2018 | Dolecki .............. | G04G 21/025 |
| 2018/0350464 A1 * | 12/2018 | Bhimavarapu ......... | G06F 9/451 |
| 2018/0369039 A1 | 12/2018 | Bhimavarapu et al. | |
| 2018/0374573 A1 * | 12/2018 | Bhimavarapu ........ | G16H 40/20 |
| 2019/0198166 A1 * | 6/2019 | Errico .................. | G06Q 20/405 |
| 2020/0035358 A1 | 1/2020 | Williams et al. | |
| 2020/0038269 A1 * | 2/2020 | Lachenbruch ......... | A61G 7/015 |
| 2020/0168308 A1 * | 5/2020 | Ledwith .................. | B66C 11/04 |
| 2020/0314081 A1 | 10/2020 | Yamamoto et al. | |
| 2020/0334229 A1 | 10/2020 | Harrison et al. | |
| 2021/0045948 A1 * | 2/2021 | Nahavandi ........... | A61G 7/0509 |
| 2021/0052197 A1 * | 2/2021 | Sukumaran ........... | A61B 5/1115 |
| 2021/0100706 A1 | 4/2021 | Childs et al. | |
| 2021/0193312 A1 | 6/2021 | Kapadia et al. | |
| 2022/0133054 A1 * | 5/2022 | Tsemn ................. | A47C 27/082 |
| | | | 5/710 |
| 2023/0122043 A1 * | 4/2023 | Zerhusen ............... | A61G 7/001 |
| | | | 601/61 |
| 2023/0233102 A1 * | 7/2023 | Paul ....................... | A61G 7/001 |
| | | | 5/611 |
| 2023/0233389 A1 * | 7/2023 | Bhimavarapu ...... | A61G 7/0527 |
| | | | 5/617 |
| 2024/0115452 A1 * | 4/2024 | Birchler ................. | A61G 15/10 |
| 2024/0245319 A1 * | 7/2024 | Sukumaran ........... | A61G 7/018 |

FOREIGN PATENT DOCUMENTS

| | | |
|---|---|---|
| WO | 2020112688 A1 | 6/2020 |
| WO | 2020131851 A1 | 6/2020 |
| WO | 2020264140 A1 | 12/2020 |
| WO | 2021074895 A1 | 4/2021 |

* cited by examiner

352

392

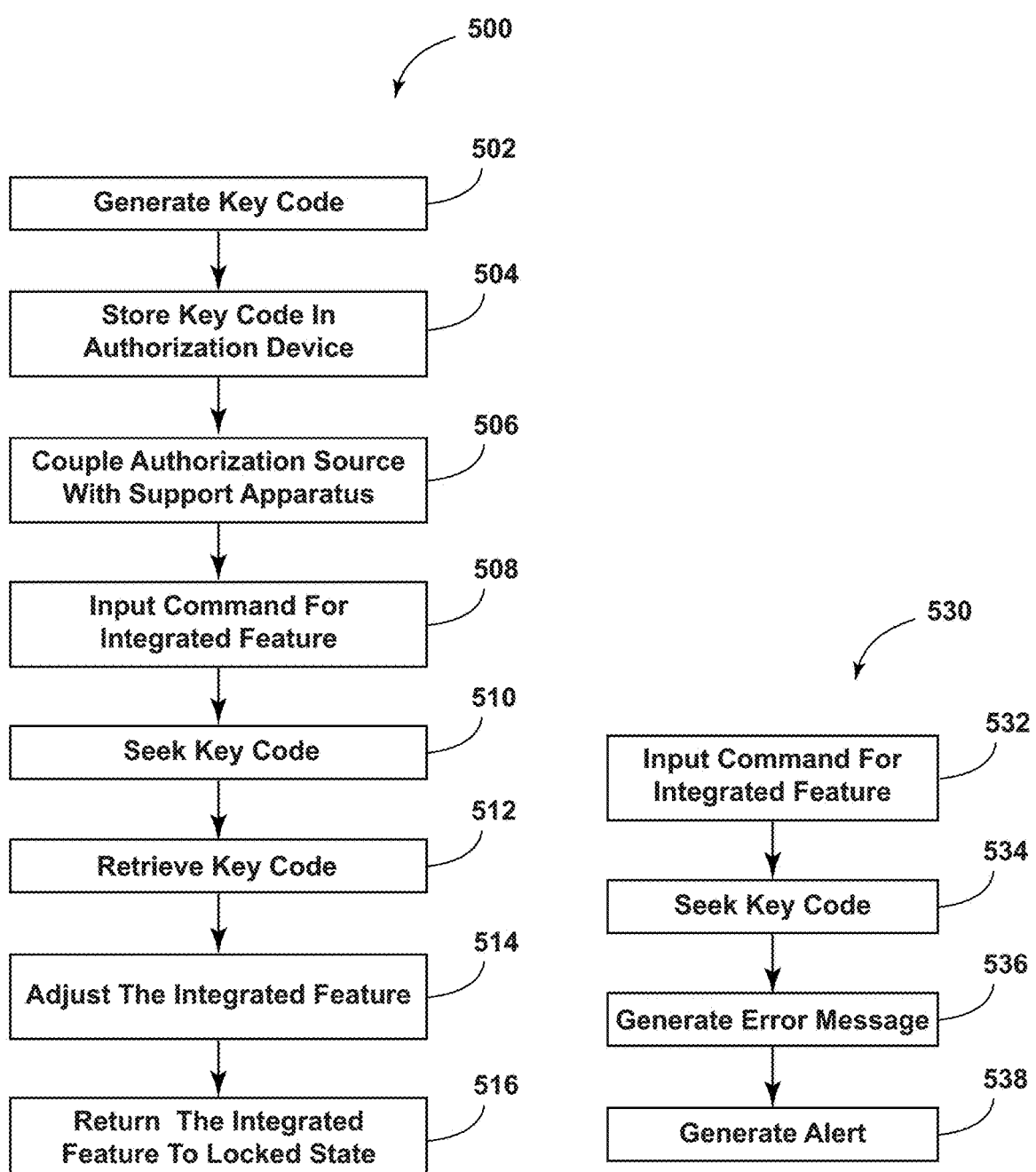
FIG. 16                                    FIG. 17

900

| Provide support apparatus with rotation function | 902 |

Enable rotation function — 904

Select rotation settings — 906

Preview rotation function based on rotation settings — 908

Set bed exit mode — 910

Start rotation function — 912

Check rotation status — 914

Stop rotation function — 916

Disable rotation function — 918

AUTHORIZATION SYSTEM FOR INTEGRATED FEATURE OF SUPPORT APPARATUS

CROSS-REFERENCE TO RELATED APPLICATIONS

This application claims priority to and the benefit under 35 U.S.C. § 119(e) of U.S. Provisional Application No. 63/281,120, filed on Nov. 19, 2021, entitled "AUTHORI-ZATION SYSTEM FOR INTEGRATED FEATURE OF SUPPORT APPARATUS," and U.S. Provisional Application No. 63/304,796, filed on Jan. 31, 2022, entitled "AUTHORIZATION SYSTEM FOR INTEGRATED FEA-TURE OF SUPPORT APPARATUS," the disclosure of which is hereby incorporated herein by reference in its entirety.

FIELD OF THE DISCLOSURE

The present disclosure generally relates to an authoriza-tion system, and more particularly to an authorization sys-tem for an integrated feature of a support apparatus.

SUMMARY OF THE DISCLOSURE

According to one aspect of the present disclosure, an authorization system for a medical facility includes a sup-port apparatus having a pneumatic system and a control panel coupled to the support apparatus. The control panel includes a display. The authorization system also includes a control unit communicatively coupled to the control panel. The control unit is configured to receive settings information for a continuous rotation function of the pneumatic system, seek authorization for at least one of enabling and activating the continuous rotation function via at least one of a key code and a multi-step authorization process via the display, activate the pneumatic system in a preview mode to adjust the pneumatic system through a single cycle of the continu-ous rotation function in response to receiving authorization, and activate the pneumatic system in an active mode for providing the continuous rotation function for a predefined period of time in response to receiving the authorization.

According to another aspect of the present disclosure, a patient support apparatus includes a user interface operably coupled to a frame and an integrated feature included in at least one of the frame and a mattress disposed on the frame. The integrated feature is operable between an unlocked state and a locked state. The locked state is a default condition. A control unit in communication with the user interface and the integrated feature. The control unit is configured to receive an input related to controlling the integrated feature via the user interface, seek a key code stored in an autho-rization source, control the integrated feature based on the input upon obtaining the key code, and retain the integrated feature in the locked state if at least one of the authorization source is free of the key code and the control unit is free of communication with the authorization source.

According to yet another aspect of the present disclosure, an authorization system including a control panel coupled to a support apparatus having a pneumatic system. The control panel includes a display. A control unit is communicatively coupled to the control panel. The control unit is configured to receive settings information for a continuous rotation function of the pneumatic system, generate a preview screen to be viewed on the display, generate a conditions list to be viewed on the display indicating predefined conditions to be satisfied prior to activation of the continuous rotation func-tion, and activate the pneumatic system in a preview mode to adjust the pneumatic system through a cycle of the continuous rotation function when each of the predefined conditions is satisfied.

These and other features, advantages, and objects of the present disclosure will be further understood and appreci-ated by those skilled in the art by reference to the following specification, claims, and appended drawings.

BRIEF DESCRIPTION OF THE DRAWINGS

In the drawings:

FIG. 16 is a flow diagram of a method for controlling an integrated feature of a support apparatus using a key code, according to the present disclosure;

FIG. 17 is a flow diagram of a method for controlling an integrated feature of a support apparatus without a key code, according to the present disclosure;

DETAILED DESCRIPTION

Figure 1:
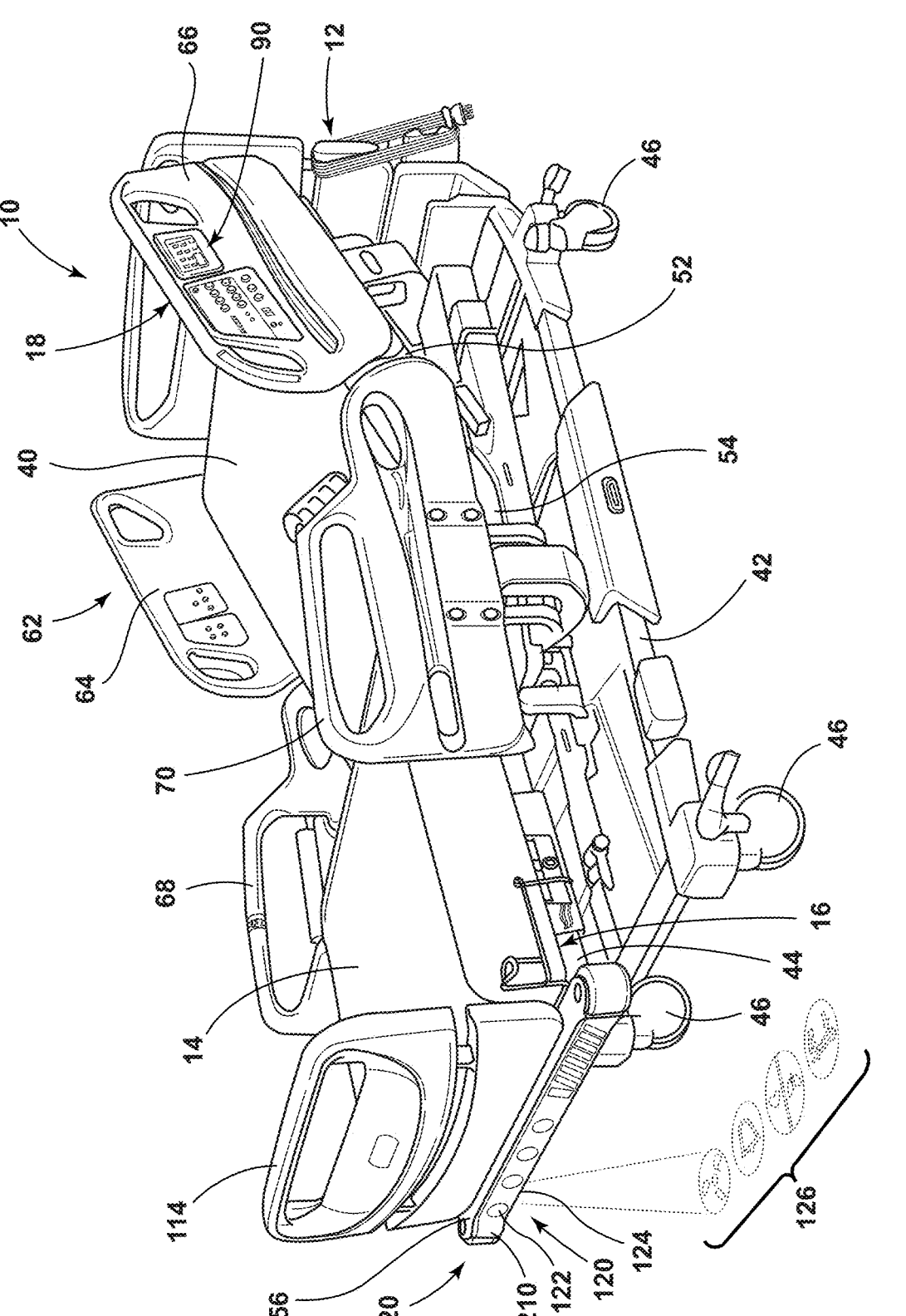
FIG. 1 is a side perspective view of a support apparatus, according to the present disclosure.

The present illustrated embodiments reside primarily in combinations of method steps and apparatus components related to an authorization system for an integrated feature of a support apparatus. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

With reference to FIGS. 1-46, reference numeral 10 generally designates a support apparatus 10 having a frame 12 and a mattress 14 disposed on a deck 16 of the frame 12. A user interface 18 is operably coupled to the frame 12. An integrated feature 20 is included in at least one of the frame 12 and the mattress 14. The integrated feature 20 is operable between an unlocked state and a locked state. The locked state is a default condition. A control unit 22 is in communication with the user interface 18 and the integrated feature 20. The control unit 22 is configured to receive an input related to controlling the integrated feature 20 via the user interface 18 and seek a key code 24 stored in an authorization source 26. The control unit 22 is also configured to control the integrated feature 20 based on the input upon obtaining the key code 24 and retain the integrated feature 20 in the locked state if at least one of the authorization source 26 is free of the key code 24 and the control unit 22 is free of communication with the authorization source 26.

Figure 2:
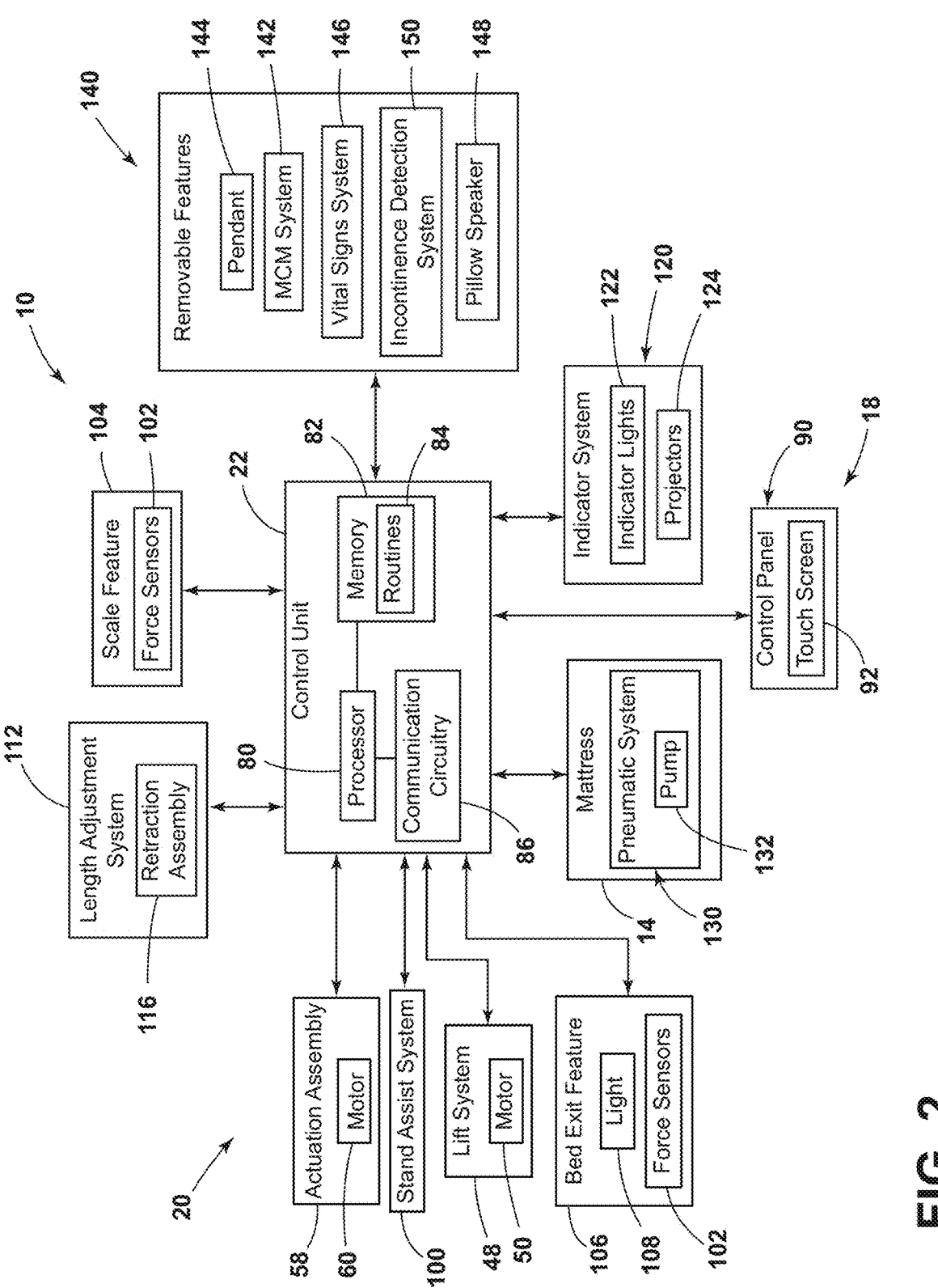
FIG. 2 is a box diagram illustrating possible features and functionality of a support apparatus, according to the present disclosure.

With reference to FIGS. 1 and 2, the support apparatus 10 is configured as a bed 40 typically used within medical facilities. Although illustrated as the bed 40, the support apparatus 10 may be configured as a surgical table, a stretcher, a chair, or other structure for supporting a patient thereon. When configured as the bed 40, the support apparatus 10 includes the frame 12 having a base frame 42 and an upper frame 44. The base frame 42 has casters or wheels 46 configured for engaging an underlying floor surface. The upper frame 44 is operably coupled to the base frame 42. The upper frame 44 is adjustable relative to the base frame 42 (e.g., raise, lower, tilt, etc.) via a lift system 48. The lift system 48 may include a motor 50, which is activated to adjust the upper frame 44 between various heights relative to the base frame 42 and the underlying floor surface and between various angles relative to the base frame 42. Any practicable configuration of the lift system 48 may be included in the support apparatus 10 without departing from the teachings herein.

The upper frame 44 generally includes multiple segments 52, 54, 56, which collectively form the deck 16. The deck 16 includes a head end segment 52, a base segment 54, and a foot end segment 56 that are independently adjustable relative to one another via at least one actuation assembly 58. The actuation assembly 58 may include a motor 60 that, when activated, is configured to adjust the segments 52, 54, 56 between various positions.

For example, the head end segment 52 may be adjusted to elevate a head region of the patient, which is often beneficial for many treatments to the patient. Additionally, the foot end segment 56 may be lowered to bring the support apparatus 10 into a chair position, allowing the patient to be in a sitting position. Further, the base segment 54 and the foot end segment 56 may both be adjusted to raise the knees of the patient to prevent or minimize movement of the patient along a longitudinal extent of the support apparatus 10. The adjustable segments 52, 54, 56 are independently operable relative to one another. Any practicable configuration of the actuation assembly 58 may be included in the support apparatus 10 without departing from the teachings herein. Each of the lift system 48 and the actuation assembly 58 are operably coupled to the control unit 22 of the support apparatus 10.

With reference still to FIGS. 1 and 2, the support apparatus 10 also includes multiple siderails 62, which are configured to be raised and lowered to selectively prevent or allow ingress and egress to the support apparatus 10. In the illustrated example of FIG. 1, the support apparatus 10 includes two head siderails 64, 66 and two base siderails 68, 70, collectively referred to herein as the siderails 62. Each of the siderails 62 may be automatically adjusted via an actuator, or alternatively may be manually adjusted.

Referring still to FIGS. 1 and 2, the control unit 22 of the support apparatus 10 includes a processor 80, a memory 82, and other control circuitry. Instructions or routines 84 are stored in the memory 82 and executable by the processor 80. The control circuitry generally includes communication circuitry 86 configured for bidirectional wired and wireless communication. A control panel 90 is communicatively coupled to the control unit 22 of the support apparatus 10. The control panel 90 includes a graphical touchscreen display 92, which allows the caregiver to view information and provide various inputs.

The support apparatus 10 includes multiple integrated features 20 within the frame 12 and the mattress 14, which are each in communication with the control unit 22. The integrated features 20 are included in the support apparatus 10 and do not utilize additional hardware that is optional or removable. Integrated features 20 are features in which the components are permanently or semi-permanently included in the support apparatus 10, such that the features are generally not removable on a frequent basis. The integrated features 20 are generally controlled by changes in software configuration (e.g., routines 84) of the support apparatus 10.

The integrated feature 20 may be a component that adjusts the position of the support apparatus 10. One example of the integrated feature 20 may be the actuation assembly 58 for adjusting the segments 52, 54, 56 of the upper frame 44. Another example of the integrated feature 20 is the lift system 48 for adjusting the upper frame 44 relative to the base frame 42. The lift system 48 may be part of a stand assist system 100, which is another example of the integrated feature 20 and operates to position the support apparatus 10 to assist the patient in standing from a sitting position on the support apparatus 10.

The integrated features 20 in the support apparatus 10 may also be used for treatment of the patient. Another example of the integrated feature 20 is force sensors 102, which may be included in a scale feature 104. The force sensors 102 may monitor the position or movement of the patient, or be utilized to weigh the patient for the scale feature 104. An additional example of the integrated feature may be a bed exit feature 106 for a fall risk protocol. The bed exit feature 106 may be configured to alert a caregiver of a bed exit attempt. Additionally, the bed exit feature 106 may include a light 108 that provides additional lighting to assist the patient with standing from the support apparatus 10.

Another non-limiting example of the integrated feature 20 may be a length adjustment system 112, which adjusts a footboard 114 between a deployed position and a retracted position via a retraction assembly 116. The length adjustment system 112 may be utilized for comfort for the patient or to prevent movement of the patient on the support apparatus. Additionally or alternatively, one example of the integrated feature 20 may be an indicator system 120, which includes multiple indicator lights 122 and a projector 124 associated with each indicator light 122 for communicating information to the caregiver. The indicator system 120 may project images 126 related to various integrated features 20 and removable features 140.

In another example, the integrated feature 20 may be included in the mattress 14. The integrated feature 20 may be a pneumatic system 130 having a pump 132 for directing fluid within the mattress 14 for comfort or treatment.

In various configurations of the support apparatus 10, the support apparatus 10 may include at least one removable feature 140 coupled thereto. Generally, each removable feature 140 includes detachable hardware that is selectively and removably coupled to the support apparatus 10 when the removable feature 140 is to be used. Various removable features 140 may be coupled to the support apparatus 10 at any given time. Examples of the removable features 140 include a microclimate management (MCM) system 142, a vital signs system 144, a pendant 146, a pillow speaker 148, and an incontinence detection system 150, as discussed further herein. The various integrated features 20 and removable features 140 illustrated in FIG. 2 are merely exemplary and not meant to be limiting. Any practicable integrated feature 20 or removable feature 140 may be included in the support apparatus 10 without departing from the teachings herein.

Figure 3:
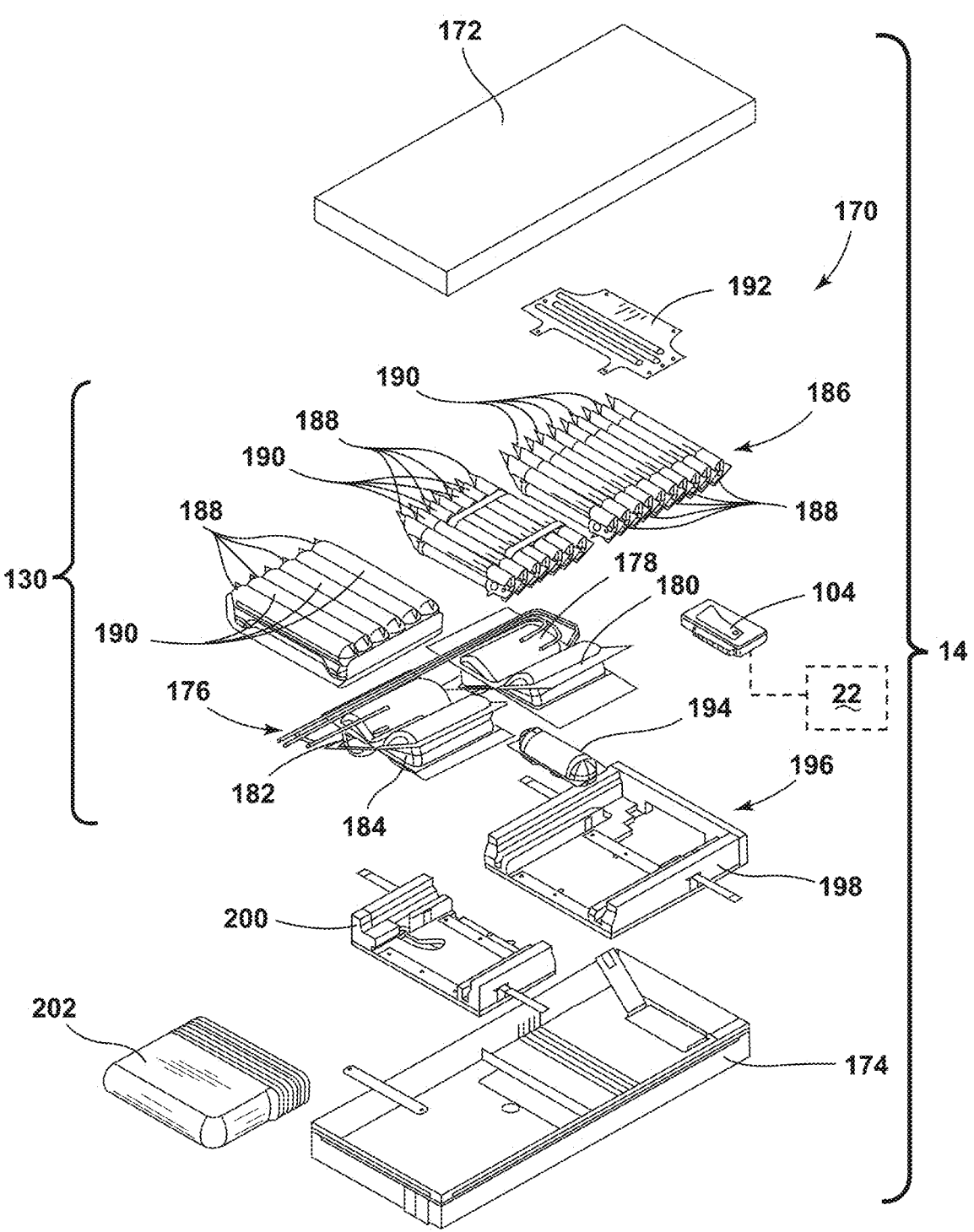
FIG. 3 is an exploded side perspective view of a mattress having a pneumatic system, according to the present disclo-sure.

With reference now to FIGS. 1-3, integrated features 20 are activated via an input communicated to the control unit 22 without additional or detachable hardware being coupled to the bed 40. In a non-limiting example, as illustrated in FIG. 3, the integrated feature 20 may be the pneumatic system 130 within an interior of the mattress 14. The pneumatic system 130 includes bladders 170 positioned in the mattress 14 and in fluid communication with the pump 132 for adjusting fluid within the bladders 170. The amount of fluid within each bladder 170 adjusts the firmness of the mattress 14. Additionally, the bladders 170 may be used for various therapies and treatments, such as, pressure ulcer prevention. The bladders 170 may be adjusted in a certain pattern to apply pressure therapy or other treatments to the patient and the support apparatus 10. The pneumatic system 130 may be disposed within the mattress 14 and activated without additional hardware or features being connected to the mattress 14 or the support apparatus 10, thereby being integrated into the mattress 14 and controlled via the software and/or changes in the software configuration.

In various examples, the mattress 14 includes an upper cover 172 and a base cover 174 that enclose the pneumatic system 130. The pneumatic system 130 may provide one or more types of treatment to the patient. For example, the pneumatic system 130 may be utilized to provide continuous lateral rotation therapy or a continuous lateral rotation feature for the patient on the support apparatus 10. The bladders 170 may include rotation bladders 176 within the mattress 14. The rotation bladders 176 may be deployed or inflated in a certain pattern to provide a gentle, side-to-side movement of the patient to aid in the prevention and treatment of pulmonary and other health complications related to immobility, as well as treat or prevent pressure ulcers.

In the illustrated configuration of FIG. 3, the rotation bladders 176 include first and second turn bladders 178, 180 arranged adjacent to third and fourth turn bladders 182, 184. The first and second turn bladders 178, 180 are arranged under a torso of the patient when the patient is lying on the support apparatus 10 and operate to turn the torso along a longitudinal axis in response to the inflation of one of the first and second turn bladders 178, 180. The third and fourth turn bladders 182, 184 are arranged under a seat or thigh of the patient and operate to turn the legs of the patient along the longitudinal axis in response to the inflation of one of the third and fourth turn bladders 182, 184. For example, to rotate the patient to the right, the second and fourth turn bladders 180, 184 are inflated. The first and third turn bladders 178, 182 may remain in a current state or may deflate. As illustrated in the example of FIG. 3, the first and second turn bladders 178, 180 are in fluid communication with the third and fourth turn bladders 182, 184 for concurrent inflation and deflation. However, each set of rotation bladders 176 may operate independently. Additional rotation bladders 176 may be included in the pneumatic system 130 without debating from the teachings herein.

Referring still to FIGS. 1-3, the rotation bladders 176 operate to adjust the patient between a center position, in which the patient is lying on his or her back, and lateral positions, in which the patient is lying on his or her right or left side. The control unit 22 may control the pneumatic system 130 to vary a number of turns, a pause time in each position, a duration of the continuous lateral rotation therapy, etc. to provide customized treatment for the patient. The amount of pressure provided by each rotation bladder 176 may be based on a detected or input weight of the patient. Additionally or alternatively, the therapy may be initiated and adjusted via the user interface 18 (e.g., in response to a software configuration change).

The pneumatic system 130 may include support bladders 186 arranged over the rotation bladders 176. The support bladders 186 support the patient lying on the mattress 14. Each of the support bladders 186 may include one or more cells that may be concurrently or independently adjusted between inflated and deflated conditions. The support bladders 186 may also be utilized to provide alternating pressure therapy to the patient. When providing alternating pressure therapy, a first set of support bladders 188 are in fluid communication, and a second set of support bladders 190 are in fluid communication.

The first set of support bladders 188 and the second set of support bladders 190 are arranged in an alternating pattern. Accordingly, the first set of support bladders 188 and the second set of support bladders 190 are separately inflated, maintained, or deflated in a pattern to relieve pressure points by cyclically dropping or elevating a pressure within one of the first set of support bladders 188 and the second set of support bladders 190. The control unit 22 may include alternating pressure therapy protocols that include at least frequency, duration, pattern, and intensity of the therapy. The alternating pressure therapy may be initiated and adjusted (e.g., frequency, duration, intensity, etc.) via the user interface 18 (e.g., in response to a software configuration change).

Additionally or alternatively, the pneumatic system 130 may be utilized to provide percussion and vibration therapies to the patient on the support apparatus 10. The percussion and vibration therapies may be conducted separately or together as sequential treatments. Percussion and vibration therapy (PVT) bladders 192 are disposed over the support bladders 186. While illustrated in FIG. 3 proximate the head end of the mattress 14, the PVT bladders 192 may be disposed in other locations in the mattress 14, or alternatively, multiple sets of PVT bladders 192 may be disposed in the mattress 14. The PVT bladders 192 provide percussion or vibration therapies when pressure in the PVT bladders 192 drops and elevates at a rate sufficient to impart a vibration to the patient. For example, percussion or vibration therapy may be applied to a chest region of the patient to aid in breaking down undesired materials within the lungs of the patient.

Referring still to FIGS. 1-3, the percussion and vibration therapies may also be utilized in conjunction with other therapies, such as continuous lateral rotation therapy. The control unit 22 may include percussion and vibration protocols that include at least the frequency, duration, and intensity of the therapies. The percussion and vibration therapies may be initiated and adjusted (e.g., frequency, duration, intensity, etc.) via the user interface 18. The percussion and vibration therapies may be utilized to treat or prevent pulmonary or other complications associated with immobility, treat or prevent pressure ulcers, or any additional medical benefits.

The pneumatic system 130 may also be utilized for providing a turn assist for the caregiver. The control unit 22 may include a turn assist protocol, which assists the caregiver in turning the patient on the support apparatus 10 for linen changes, dressing changes, bed pan placement, back care, and other procedures or treatments. When the turn assist protocol is activated, some or all of the bladders 170 in the mattress 14 are adjusted.

For example, when the patient is to be turned onto his or her right side, the bladders 170 on the left side of the mattress 14 may inflate, consequently rotating the patient. In such an example, the bladders 170 on the right side of the mattress 14 may remain in a current state (e.g., neither inflate nor deflate) or may deflate to further contribute to the rotation of the patient. The turn assist protocol may be initiated through the user interface 18. In various examples, certain conditions of the support apparatus 10 may be met before the turn assist protocol is initiated. For example, the siderails 62 in the direction the patient is to be turned may be raised before the turn assist protocol is initiated. In such configurations, an alert or message may be provided via the user interface 18 if the condition is not met prior to the attempted activation of the turn assist protocol.

The pneumatic system 130 may also include a fill bladder 194 disposed below the support bladders 186 within the mattress 14. The fill bladder 194 may be utilized to fill a gap formed between the support bladders 186 and adjustable frame 44 as the adjustable upper frame 44 articulates between different positions. As different segments 52, 54, 56 of the adjustable frame 44 move, the fill bladder 194 inflates to fill any gap or space between adjacent segments 52, 54, 56. It is contemplated that the pneumatic system 130 may have additional components or functions without departing from the teachings herein. It is also contemplated that the pneumatic system 130 may include fewer bladders 170 where each bladder 170 performs multiple functions to provide different therapies.

Additionally or alternatively, the mattress 14 generally includes a shell assembly 196 for retaining the various components of the pneumatic system 130 in a selected position. The shell assembly 196 includes at least first, second, and third shells 198, 200, 202 that retain the bladders 170 in selected regions (e.g., head end, seat, etc.) of the mattress 14. The shell assembly 196 is disposed on the base cover 174 and provides support for the pneumatic system 130. The shell assembly 196 may also assist in positioning or retaining the pump 132. It is contemplated that tubing, manifolds, or other connectors may extend from the pump 132 and through the mattress 14 to connect with each of the bladders 170. The shell assembly 196 may include grooves or other features for guiding the tubing between the pump 132 and the various bladders 170.

With reference still to FIGS. 1-3, the pneumatic system 130 can be activated through the user interface 18, which is typically coupled to one of the siderails 62. Without any additional hardware to be connected to the support apparatus 10, the input through the user interface 18 directly controls the pneumatic system 130. Each integrated feature 20, such as the exemplary integrated feature 20 of the pneumatic system 130, is directly affected by the input received into the control unit 22.

Referring again to FIGS. 1 and 2, as previously noted, one example of the integrated feature 20 includes the force sensors 102, which are generally coupled to the upper frame 44. The force sensors 102 are configured to sense a force or weight of the patient, as well as monitor a position of the patient. The force sensors 102 may be utilized to monitor movement of the patient on the support apparatus 10. The force sensors 102 may be included in the scale feature 104 of the support apparatus 10. The scale feature 104 is configured to weigh or monitor the weight of the patient disposed on the support apparatus 10.

The force sensors 102 may additionally or alternatively be included in the bed exit feature 106 of the fall risk protocol. When the fall risk protocol is activated, the patient may not exit the support apparatus 10 unassisted due to the risk of a fall event occurring. The fall risk protocol is configured to alert a caregiver when the patient is attempting to exit the support apparatus 10. The force sensors 102 sense the weight or the position of a center of gravity of the patient on the support apparatus 10. Based on the sensed weight relative to an edge of the support apparatus 10, the bed exit feature 106 is configured to alert the caregiver of the exit attempt. The bed exit feature 106 may also include the light 108 integrated into the frame 12, which is activated to provide additional lighting around the support apparatus 10 to assist with standing from the support apparatus 10. The light 108 may also convey information to the caregiver (e.g., by color, intensity, etc.).

With reference still to FIGS. 1 and 2, the integrated feature 20 may include the actuation assembly 58 for adjusting the segments 52, 54, 56 of the upper frame 44. The patient or the caregiver can activate the actuation assembly 58 to adjust the upper frame 44 to a selected position for treatment or comfort. In certain aspects, the adjustment of the upper frame 44 may be limited by the caregiver. For example, based on the condition of the patient, the head of the patient should be elevated. In such examples, the head end segment 52 may be adjustable between various angles but may not be adjusted lower than a 30° angle relative to a flat position. The angle of the head end segment 52 may be advantageous for patients with head or respiratory conditions or for preventing respiratory conditions.

Additionally, the lift system 48 is another example of the integrated feature 20. The lift system 48 is integrated into the frame 12 to adjust the upper frame 44 relative to the base frame 42. The lift system 48 may be included in the stand assist system 100, which positions the support apparatus 10 to assist the patient in moving from a sitting position to a standing position. For example, when the stand assist system 100 is activated, the lift system 48 lowers the upper frame 44 to allow the patient to place his or her feet on the underlying floor surface when sitting on the support apparatus 10. It is contemplated the segments 52, 54, 56 of the upper frame 44 may also be adjusted for the stand assist system 100

Further, the integrated feature 20 may include the length adjustment system 112. When the support apparatus 10 includes the length adjustment system 112, the footboard 114 is adjustable between the deployed position and the retracted position to adjust the length of the upper frame 44. The retraction assembly 116 adjusts the footboard 114, allowing the support apparatus 10 to be customized to the height of the patient. Further, the position of the footboard 114 may assist in minimizing shear forces and patient migration toward a foot end 210 of the support apparatus 10. Moreover, the position of the footboard 114 can assist in minimizing sliding when the support apparatus 10 is adjusted to the chair position.

With further reference to FIGS. 1 and 2, the integrated feature 20 may be an indicator system 120 of the support apparatus 10. As illustrated in FIG. 1, the indicator system 120 is generally located at the foot end 210 of the support apparatus 10 adjacent to the footboard 114. The indicator system 120 includes multiple indicator lights 122 and the projectors 124 associated with each indicator light 122. The indicator system 120 is associated with the various integrated features 20 and removable features 140 of the support apparatus 10. The indicator lights 122 may be illuminated when the corresponding integrated feature 20 or the corresponding removable feature 140 is activated. For the removable features 140, the indicator lights 122 may also illuminate when the removable features 140 are coupled with the support apparatus 10.

The indicator lights 122 may illuminate in different colors to indicate different information to the caregiver. For example, a green light may indicate that the corresponding feature 20, 140 is active, while a red light may indicate an alert related to the corresponding feature 20, 140. The projectors 124 may project the images 126 on the underlying floor surface that is substantially similar (e.g., design, icon, colors, etc.) to the indicator light 122 to provide a secondary location for the caregiver to view the information. The indicator system 120 provides a convenient method for caregivers to monitor information about the support apparatus 10 or the patient.

In the example illustrated in FIG. 1, the indicator system 120 is associated with four different features, therefore having four indicator lights 122 and four projectors 124. The exemplary features associated with the indicator system 120 include the bed exit feature 106, the stand assist system 100, the MCM system 142, and the vital signs system 144. The bed exit feature 106 and the stand assist system 100 are integrated features 20, while the MCM system 142 and the vital signs system 144 are removable features 140, as discussed further herein.

Referring still to FIGS. 1 and 2, as previously set forth, the removable features 140 are selectively and removably coupled to the support apparatus 10. In comparison to the integrated features 20, the removable features 140 include additional or detachable hardware that is coupled to the support apparatus 10. In this way, the removable features 140 can be adjusted via an input into the user interface 18; however, if the additional hardware is not coupled to the support apparatus 10, then no adjustment occurs. Accordingly, operation of the removable features 140 is restricted based on the hardware availability. The addition and removal of the hardware operate to prevent inadvertent or accidental activation of the removable features 140. When coupled to the support apparatus 10, the removable features 140 are in communication with the control unit 22. In this way, the control unit 22 is configured to determine which removable features 140 are coupled to the support apparatus 10 at a given time.

The removable features 140 may be added for patient comfort, patient entertainment, treatment, therapy, etc. In a non-limiting example, the removable feature 140 may include the pendant 146, which is coupled to the frame 12 and extends from a support rod to hang a housing in front of the patient. The housing may include a display screen for providing information, entertainment, controls, etc. to the patient. Additionally or alternatively, the pendant 146 may provide a location for the patient to position a personal device, such as a phone or tablet. The pendant 146 may include a connector port that allows the patient to couple the personal device to the pendant 146 to be charged.

Another example of the removable feature 140 may include the pillow speaker 148 or nurse call remote that may be selectively coupled to the support apparatus 10. The pillow speaker 148 generally provides controls for various features in the patient room, such as television control, lighting control, etc., as well as a call feature allowing the patient to contact the caregiver.

Further, an additional non-limiting example of the removable feature 140 may be the incontinence detection system 150. The incontinence detection system 150 generally includes sensors 152, a pad 154, and an indicator 156 (see FIG. 18). When activated, the sensors 152 operably coupled with the pad 154 are configured to sense an incontinence event and the indicator 156 alerts the caregiver that such event has occurred. Further, the incontinence detection system 150 may include a blower. In such examples, the pad 154 includes a spacer material and the blower directs fluid, such as air, through the spacer material of the pad 154. The air traveling through the pad 154 wicks moisture from the patient and assists in drying the skin of the patient.

Further, the removable features 140 may be the MCM system 142. The MCM system 142 generally includes a blower, a top coverlet, and a spacer material within the top coverlet. The blower is controlled by the control unit 22 and operates to direct or blow air through the spacer material. The MCM system 142 is generally disposed on a top surface of the mattress 14 and the patient may rest on the MCM system 142 while the patient is positioned on the MCM system 142, air is directed through the top coverlet. This configuration wicks away moisture from the skin of the patient by blowing air underneath the patient, which is advantageous for preventing skin conditions and which may be caused by lying on the mattress 14 for an extended period of time.

Referring still to FIGS. 1 and 2, the removable feature 140 may include the vital signs system 144. The vital signs system 144 generally includes a sensor assembly positioned below the mattress 14 on the upper frame 44 in a position that aligns with a chest of the patient. The sensor assembly may be configured to sense a heart rate and a respiration rate of the patient. Each of these removable features 140 includes additional hardware to be coupled to the support apparatus 10.

Figure 4:
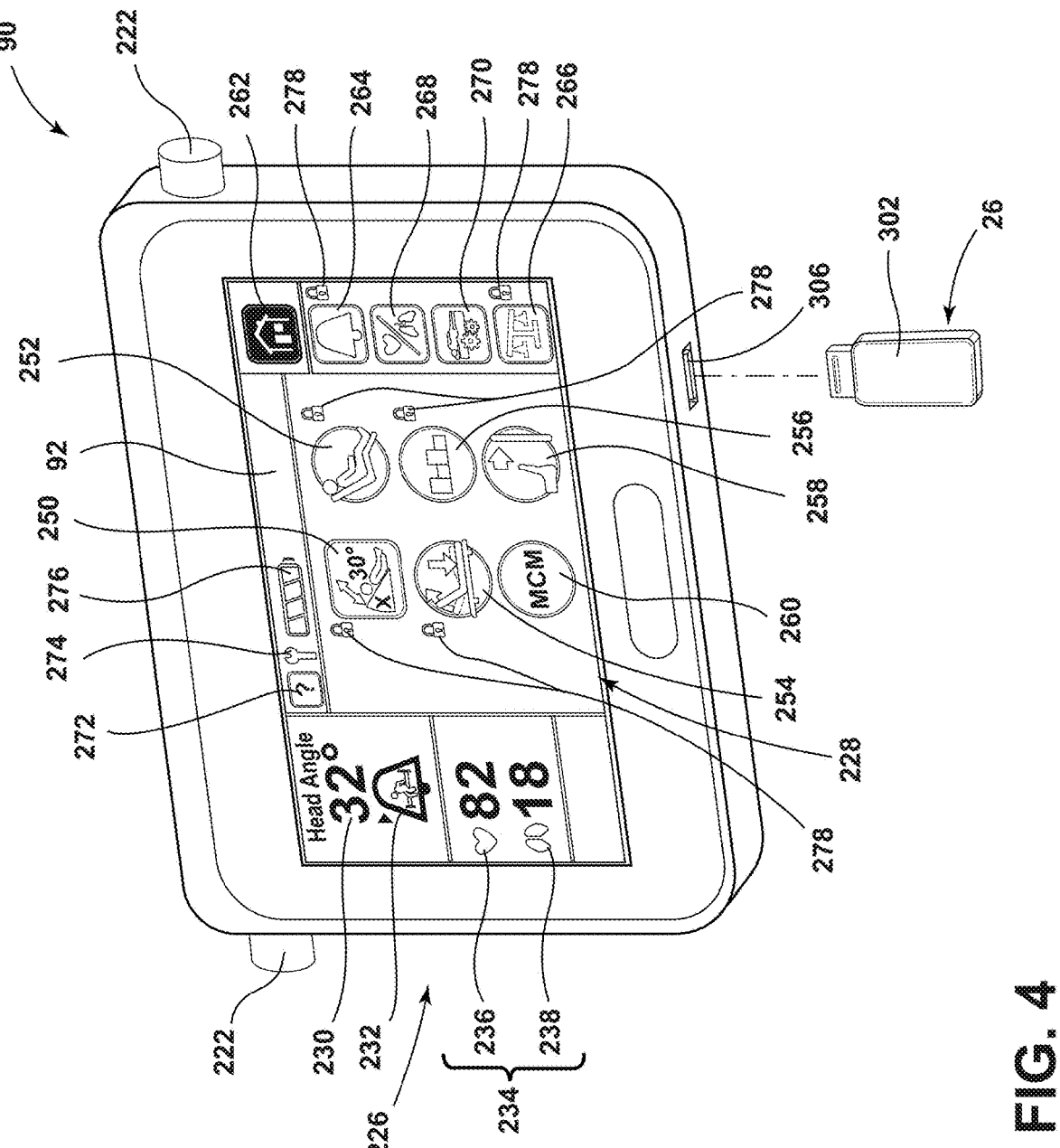
FIG. 4 is illustrative of a display on a control panel having multiple icons related to features of a support apparatus and an authorization device of an authorization system, accord-ing to the present disclosure.

With reference now to FIG. 4, the user interface 18 is configured as the control panel 90 operably coupled to the support apparatus 10, such as on the siderail 66 (as illustrated in FIG. 1). The control panel 90 includes two pins 222, which allow the control panel 90 to be rotatably coupled and rotate relative to the support apparatus 10. The control panel 90 includes the graphical touchscreen display 92, allowing the caregiver to view information and provide various inputs, which are communicated to the control unit 22 of the support apparatus 10.

In the illustrated example of FIG. 4, the touchscreen display 92 includes a variety of information 226 and icons 228. For example, the touchscreen display 92 includes a head angle measurement 230, which conveys the angle of the head end segment 52 of the support apparatus 10 relative to the flat position. Further, the illustrated touchscreen display 92 includes an active alert 232 related to the bed exit feature 106. This active alert 232 indicates to the caregiver that the bed exit feature 106 is activated and the caregiver will be alerted if the patient attempts to exit the support apparatus 10 unassisted. Additionally, vital signs information 234 including a heart rate 236 and a respiration rate 238 are included on the touchscreen display 92. The vital signs information 234 is received from the vital signs system 144 when the sensor assembly is coupled to the support apparatus 10.

The touchscreen display 92 also includes icons 228 that are selectable by the caregiver. The icons 228 generally relate to the integrated features 20 and the removable features 140. The touchscreen display 92 may be dynamically or automatically updated based on the removable features 140 that are currently coupled with the support apparatus 10. In the example illustrated in FIG. 4, for integrated features 20, the touchscreen display 92 includes a head angle icon 250 related to adjusting the angle of the head end segment 52, a sitting position icon 252 related to adjusting the upper frame 44 into the chair position, a stand assist icon 254 related to the stand assist system 100, a pneumatic system icon 256 related to the pneumatic system 130, and a length adjustment icon 258 related to the length adjustment system 112. For removable features 140, the touchscreen display 92 includes an MCM icon 260 related to the MCM system 142.

Additionally, under a home icon 262, which directs the caregiver to a home display screen, the touchscreen display 92 also includes icons 228 related to the integrated features 20, such as a bed exit icon 264 related to the bed exit feature 106 and a scale icon 266 related to weighing the patient, and icons 228 related to the removable features 140, such as a vital signs icon 268 related to the vital signs system 144. Further, the touchscreen display 92 also includes a settings icon 270, a help feature 272, a service screen icon 274, and a battery status 276. Each of the icons 228 may be configured to activate, adjust, or deactivate (i.e., control) the corresponding feature or may adjust the touchscreen display 92 to a subsequent screen allowing the caregiver to control aspects of the related feature 20, 140. The information 226 and icons 228 communicated via the touchscreen display 92 is merely exemplary and can include any practicable information useful to the caregiver.

As illustrated in FIG. 4, each of the icons 228 associated with the integrated features 20 includes a lock indicator 278 adjacent to the respective icon 228. In comparison, the icons 228 associated with the removable features 140 do not have the lock indicator 278 associated with the respective icon 228. The lock indicator 278 conveys that the features 20 associated with the icons 228 are in the locked state and utilize additional authorization to activate, adjust, deactivate, or otherwise control the feature 20. The locked state is the default condition for the integrated features 20 to prevent unauthorized, inadvertent, or accidental operation of the integrated features 20.

Figure 5:
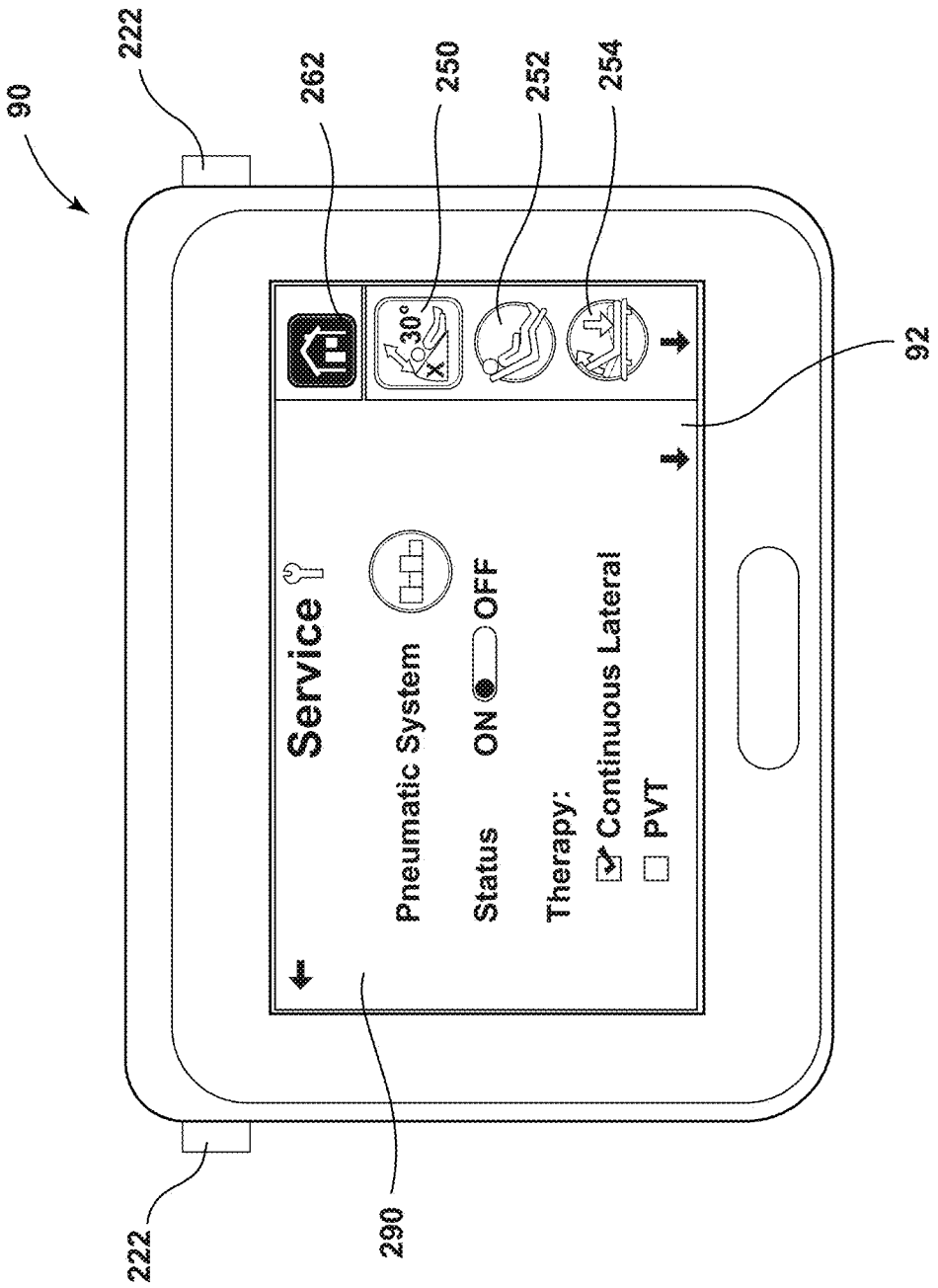
FIG. 5 is illustrative of a display showing a service screen related to a feature of a support apparatus, according to the present disclosure.

With reference now to FIG. 5, a service screen 290 on the control panel 90 is illustrated, which may be accessed by selecting the service screen icon 274 (FIG. 4). The exemplary service screen 290 illustrated in FIG. 5 includes controls for the pneumatic system 130. The integrated features 20 are generally controlled through the service screen 290 or a service tool. The inputs entered through the service screen 290 are configured to adjust the software configuration within the control unit 22 to control the integrated features 20 accordingly. The integrated features 20, which are not restricted by hardware availability, are controlled through the inputs provided to the control unit 22. Accordingly, additional authorization or security may prevent inadvertent, unauthorized, or accidental control of the integrated features 20. For example, without additional authorization, if the steps to activate certain integrated features 20 became known by those other than the caregiver, the integrated features 20 could be controlled in a manner that adversely affects the patient, the caregiver, or the facility.

Figure 6:
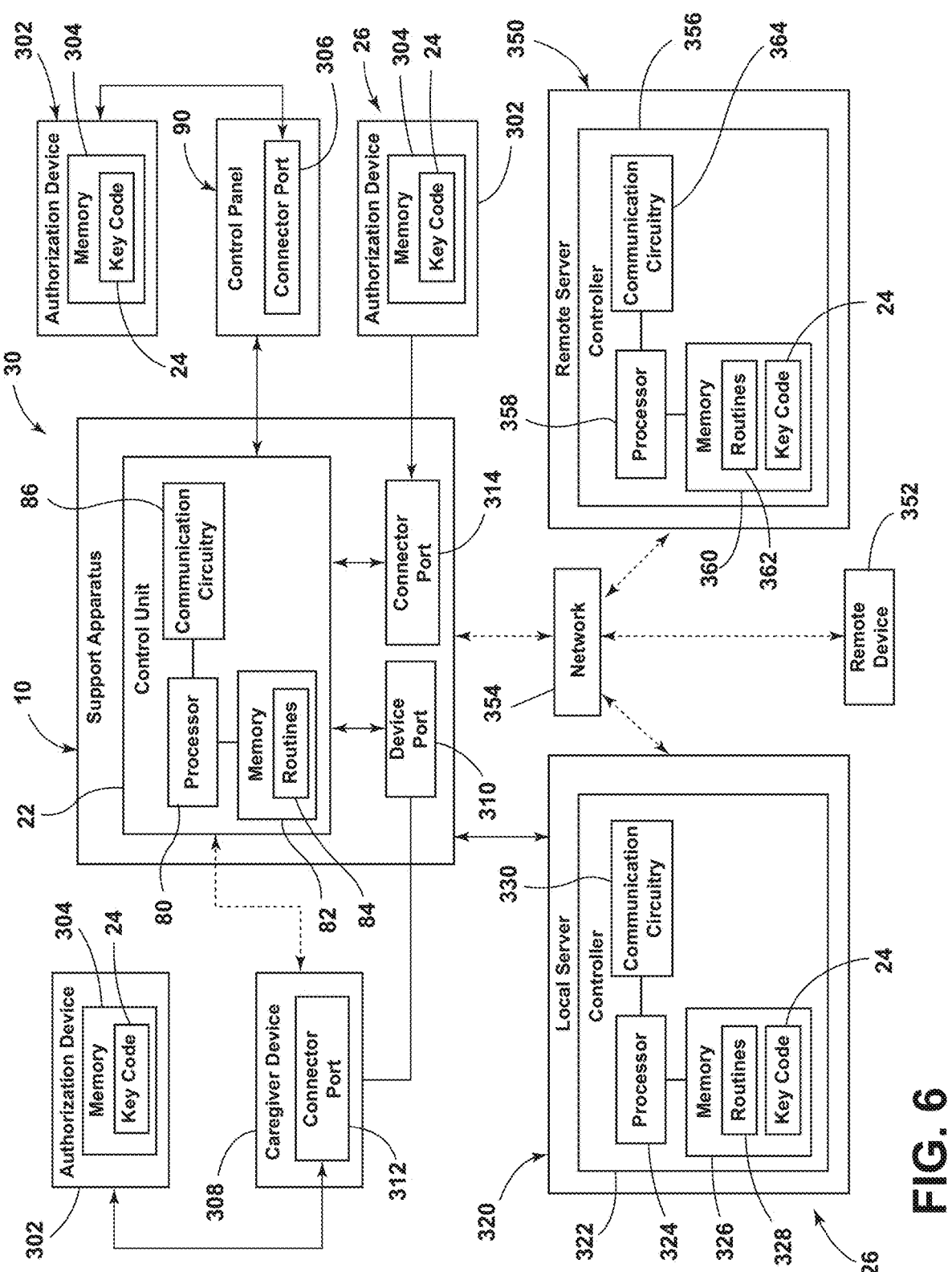
FIG. 6 is a block diagram illustrating a possible authori-zation system for integrated features of a support apparatus, according to the present disclosure.

Referring now to FIGS. 4-6, the integrated features 20 are controlled in accordance with the user input by being authorized through an authorization system 300. The authorization system 300 is configured to utilize the key code 24 to adjust the selected integrated features 20 to the unlocked state to be controlled by the caregiver, the patient, or another user. The authorization system 300 provides an additional step between inputting a command related to control of the integrated features 20 and the actual control of the feature 20 to prevent unauthorized, inadvertent, or accidental activation.

The authorization system 300 provides an additional check in the control unit 22 for the features 20 that are controlled primarily or entirely through the change in software configuration. In comparison, the removable features 140 may not be authorized through the authorization system 300. Inadvertent, accidental, or unauthorized activation is unlikely or prevented for the removable features 140 based on the hardware availability (e.g., being disconnected from the support apparatus 10). If the hardware for removable feature 140 is not connected, even if the icon on the control panel 90 is selected, the removable feature 140 is not activated. Therefore, accidental or unauthorized activation of the removable features 140 is less likely. However, the authorization system 300 may be utilized for authorizing adjustments or control of the removable features 140 without departing from the teachings herein.

The authorization system 300 includes the authorization source 26 having the key code 24, which provides authorization to the support apparatus 10 to control the selected integrated feature 20. The key code 24 may have a variety of configurations or the medical facility may use a variety of key codes 24. For example, the key code 24 may be a generic code for the medical facility. In another example, the key code 24 may be a specific or unique code for each support apparatus 10. In such examples, the key code 24 may include the serial number or other identification data of the support apparatus 10 in addition to other alphanumeric values. In an additional example, the key code 24 may also be a specific or unique code for the integrated feature 20, which is common throughout the medical facility. In another non-limiting example, the key code 24 may be a specific or unique code for the integrated feature 20 for each support apparatus 10. The authorization system 300 may become increasingly complex as more aspects utilize unique or specific codes.

Referring still to FIG. 6, the key code 24 may also be encrypted to provide an additional level of security to the authorization system 300. The key code 24 is typically an alphanumeric combination. Additional features or programs may be utilized or included in the authorization system 300 to generate complex and/or encrypted key codes 24. One such process to encrypt the key code 24 may include hashing, which prevents the reverse engineering of the key code 24.

Referring again to FIGS. 4 and 6, the authorization system 300 can store the key code 24 in a variety of authorization sources 26. For example, the authorization source 26 may be an authorization device 302, such as a universal serial bus (USB) device. The key code 24 may be stored in a memory 304 of the authorization device 302. The authorization device 302 may be selectively coupled to a connector port 306 of the control panel 90, as illustrated in FIG. 4. When the authorization device 302 is coupled with the control panel 90, the control unit 22 can seek and obtain the key code 24 or key codes 24 stored within the authorization device 302. This may provide wired communication between authorization device 302 and the control unit 22 of the support apparatus 10.

Figure 7:
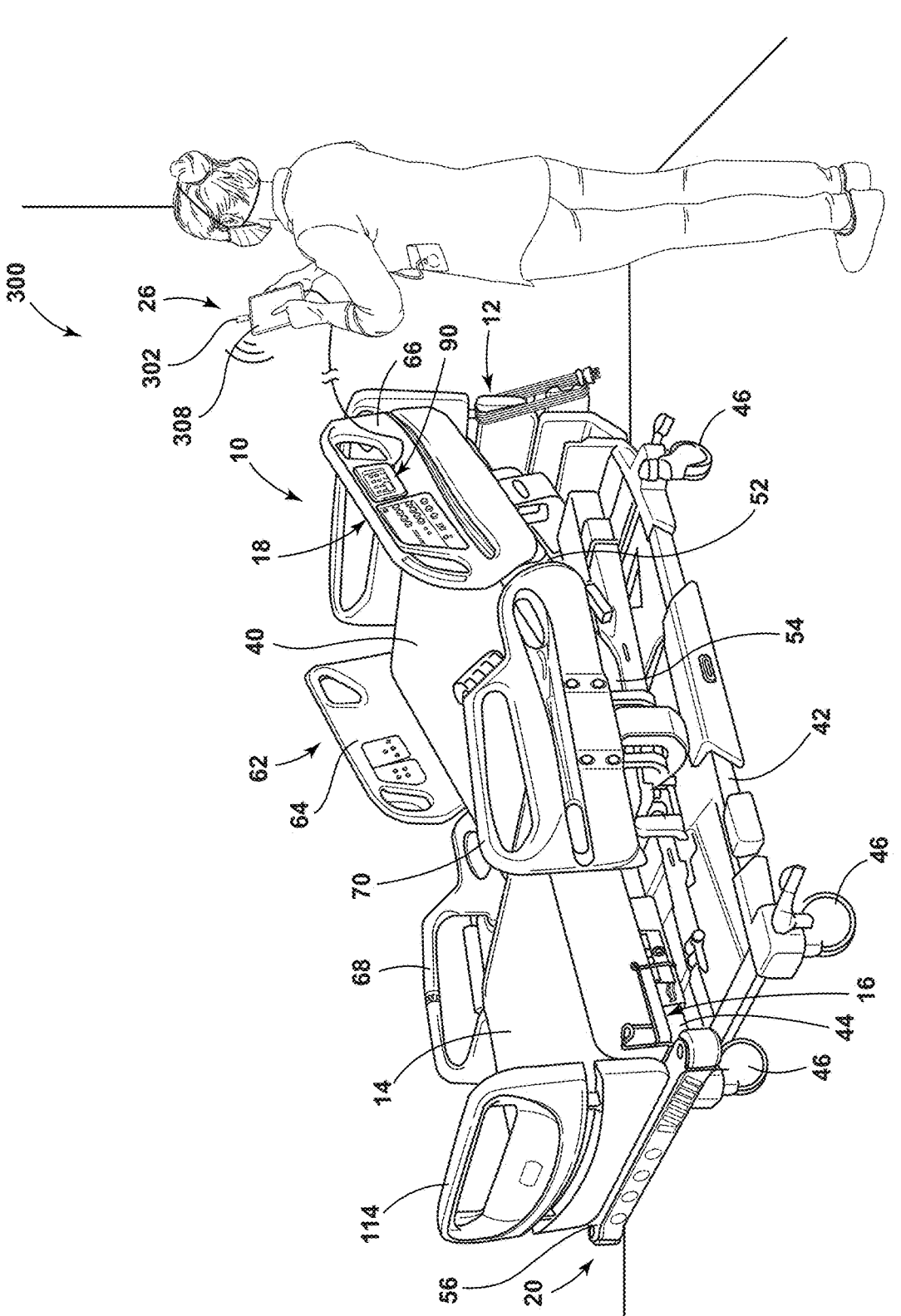
FIG. 7 is a side perspective view of a support apparatus coupled to a caregiver device to receive a key code from an authorization system, according to the present disclosure.

As illustrated in FIG. 7, the authorization device 302 may be coupled with a caregiver device 308, such as a service tablet. The service tablet may be connected to the support apparatus 10 via a device port 310, which may be a USB port, a micro-USB port, or another port for allowing data communication. The device port 310 may be the same or a different type of port compared to the connector port 306. The caregiver may selectively couple the service tablet to a support apparatus 10 for a variety of reasons, such as controlling various features of the support apparatus 10, running diagnostics, etc. The authorization device 302 may be coupled with the service tablet (i.e., via a connector port 312) and the control unit 22 may communicate with the authorization device 302 via the wired connection and the service tablet.

Additionally or alternatively, the support apparatus 10 may communicate directly and/or wirelessly with the caregiver device 308. In such configurations, the service tablet may not have any wired connection to the support apparatus 10. Further, the support apparatus 10 and the service tablet may communicate directly, without Internet, Wi-Fi, cellular data, etc.

The support apparatus 10 may also have a connector port 314, for example on one of the siderails 62, to directly receive the authorization device 302. In this way, the caregiver may couple the authorization device 302 with the support apparatus 10 directly to provide the key code 24. It is contemplated that the support apparatus 10 may be configured to obtain or retrieve the key code 24 whether directly or indirectly coupled with the authorization device 302.

Referring again to FIG. 6, the control unit 22 includes the communication circuitry 86 configured for bidirectional wired and wireless communication. The support apparatus 10 is configured to communicate with a local server 320 via one or both of wired and wireless communication. The local server 320 includes a controller 322 having a processor 324, a memory 326, and other control circuitry. Instructions or routines 328 are stored within the memory 326 and executable by the processor 324. The controller 322 includes communication circuitry 330 configured for bidirectional wired and wireless communication. The local server 320 may store the key code 24 or key codes 24 within the memory 326 thereof.

Figure 8:
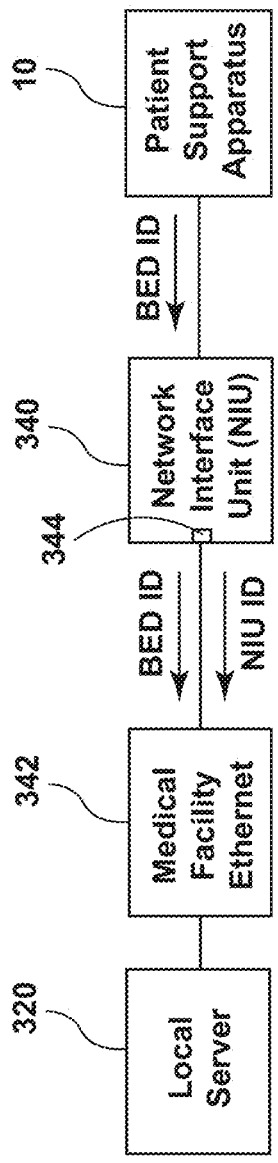
FIG. 8 is a box diagram of a communication path from a support apparatus to a local server via wired communica-tion, according to the present disclosure.
Figure 9:
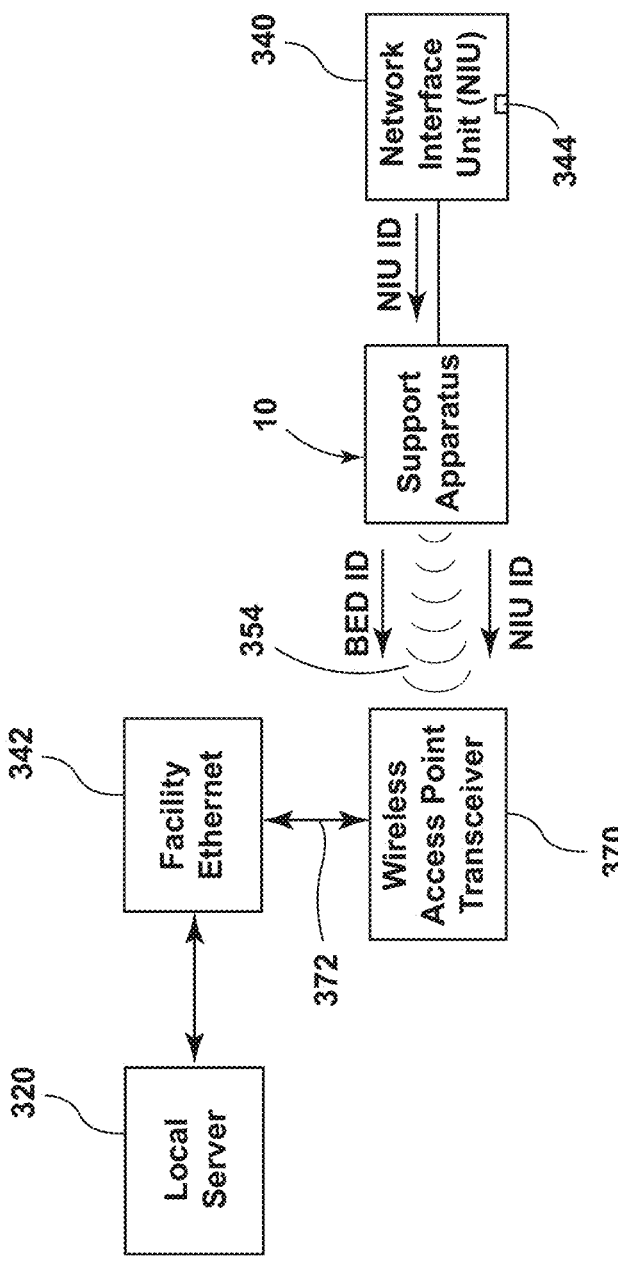
FIG. 9 is a box diagram of a communication path from a support apparatus to a local server with a wireless access point transceiver via wireless communication, according to the present disclosure.

With reference to FIGS. 6 and 8, each support apparatus 10 may be associated with a network interface unit 340. Multiple network interface units 340 may be provided in various locations around the medical facility. It is contemplated that each support apparatus 10 may communicate with any one or more of the network interface units 340 within the medical facility. Each support apparatus 10 and each network interface unit 340 is assigned a unique identification (ID) code, such as a serial number. The local server 320 may have software (e.g., routines 328) that operates to associate bed ID data of the support apparatus 10 with network interface units ID data of the network interface units 340 to locate where each support apparatus 10 is positioned in the medical facility. When the network interface unit 340 is directly coupled to Ethernet 342 via a port 344, as illustrated in FIG. 9, the associated support apparatus 10 communicates the bed ID to the network interface unit 340, which then communicates the bed ID and the network interface unit ID to Ethernet 342 through wired communication.

The control unit 22 may wirelessly communicate with the local server 320, as well as a remote server 350 and/or a remote device 352 via a communication network 354. The remote server 350 also includes a controller 356 having a processor 358, a memory 360, and other control circuitry. Instructions or routines 362 are stored within the memory 360 and executable by the processor 358. The remote server 350 includes communication circuitry 364 configured for bidirectional wired and wireless communication. The remote server 350 may store the key code 24 or key codes 24 within the memory 360 thereof.

Referring still to FIG. 6, the communication network 354 may be part of a network of the medical facility. The network may include a combination of wired connections (e.g., Ethernet 342), as well as wireless connections, which may include the wireless communication network 354. The communication network 354 may include a variety of electronic devices, which may be configured to communicate over various wired or wireless communication protocols. The communication network 354 may include a wireless router through which the remotely accessed devices may be in communication with one another, as well as the local server 320.

The communication network 354 may be implemented via one or more direct or indirect nonhierarchical communication protocols, including but not limited to, Bluetooth®, Bluetooth® low energy (BLE), Thread, Ultra-Wideband, Z-wave, ZigBee, etc. Additionally, the communication network 354 may correspond to a centralized or hierarchal communication network 354 where one or more of the devices communicate via the wireless router (e.g., a communication routing controller). Accordingly, the communication network 354 may be implemented by a variety of communication protocols, including, but not limited to, global system for mobile communication (GSM), general packet radio services, code division multiple access, enhanced data GSM environment, fourth generation (4G) wireless, fifth generation (5G) wireless, Wi-Fi, world interoperability for wired microwave access (WiMAX), local area network, Ethernet 342, etc. By flexibly implementing the communication network 354, the various devices and servers may be in communication with one another directly via the wireless communication network 354 or a cellular data connection.

Each of the controllers 322, 356 and the control unit 22 disclosed herein may include various types of control circuitry, digital or analog, and may each include a processor, a microcontroller, an application specific integrated circuit (ASIC), or other circuitry configured to perform the various inputs or outputs, control, analysis, or other functions described herein. The memories described herein may be implemented in a variety of volatile and nonvolatile memory formats. Routines may include operating instructions to enable the various methods described herein.

Figure 10:
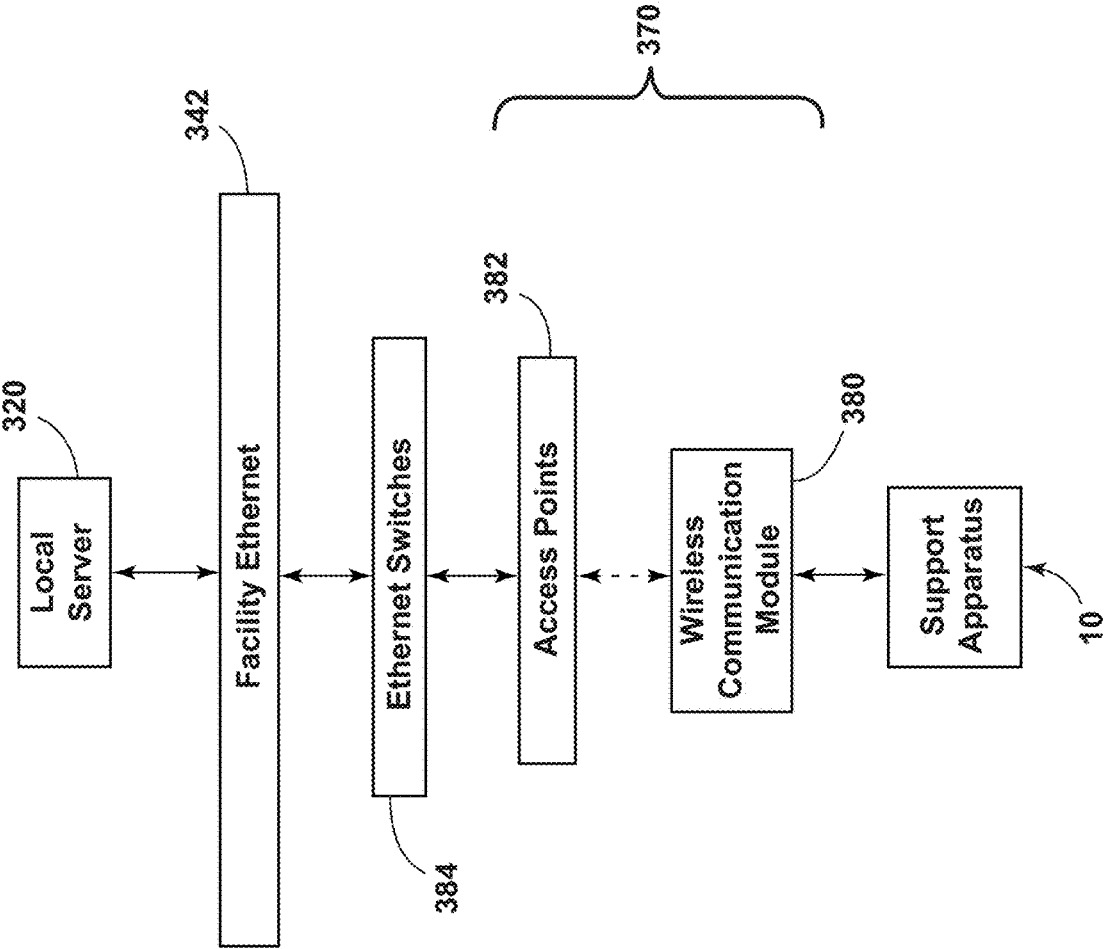
FIG. 10 is a box diagram of a communication path from a support apparatus to a local server via wireless commu-nication between a wireless control module and access points, according to the present disclosure.

Referring still to FIG. 6, as well as FIGS. 9 and 10, exemplary wireless communications of the support apparatus 10 to the local server 320 are illustrated. The monitoring system may receive information from the support apparatus 10 via the communication network 354 and through the local server 320. In certain aspects, the support apparatus 10 is configured to communicate with a wireless access transceiver 370, which is coupled to Ethernet 342 of the medical facility. The communication network 354 provides for bidi-rectional communication between the support apparatus 10 and the wireless access transceiver 370. The wireless access transceiver 370 communicates bidirectionally with Ethernet 342 via a data link 372.

As illustrated in FIG. 9, the support apparatus 10 may be associated with the network interface unit 340. The local server 320, or other aspects of the authorization system 300, may include software (e.g., routines 328) that operate to associate the identification code of the support apparatus 10 with the network interface units 340 identification data to locate each support apparatus 10 within the medical facility. Each network interface unit 340 includes the port 344 for selectively coupling with Ethernet 342. When the network interface unit 340 is coupled with Ethernet 342, the network interface unit 340 communicates the identification data to the support apparatus 10, which then wirelessly communi-cates the data for the support apparatus 10 and the network interface units 340 to the wireless access transceiver 370. The wireless access transceiver 370 then communicates with the local server 320 via Ethernet 342.

As illustrated in FIG. 10, the support apparatus 10 may be capable of communicating wirelessly via a wireless com-munication module 380. The wireless communication mod-ule 380 generally communicates via an SPI link with cir-cuitry of the associated support apparatus 10 (e.g., the communication circuitry 86) and via a wireless 802.11 link with wireless access points 382. The wireless access points 382 are generally coupled to Ethernet switches 384 via 802.3 links. It is contemplated that the wireless communication modules 380 may communicate with the wireless access points 382 via any of the wireless protocols disclosed herein. Additionally or alternatively, the Ethernet switches 384 may generally communicate with Ethernet 342 via an 802.3 link. Ethernet 342 is also in communication with the local server 320, allowing information and data to be communicated between the local server 320 and the support apparatus 10.

With reference again to FIG. 6, the support apparatus 10 may also communicate with the remote device 352. The remote device 352 may belong to the caregiver (e.g., the caregiver device 308), such as a phone, a tablet, a laptop, a wearable device, etc. The remote device 352 may be the same as or separate from the caregiver device 308. In certain aspects, the remote device 352 may store the key code 24 in a memory thereof. Additionally or alternatively, the remote device 352 may be selectively coupled with the authoriza-tion device 302. In such examples, the control unit 22 is configured to wirelessly communicate with the remote device 352 to receive the key code 24 from the memory or the authorization device 302. The support apparatus 10 may communicate with the remote device 352 directly (e.g., without Internet, cellular data, etc.) or via the communica-tion network 354.

Referring to FIGS. 6-10, the control unit 22 is configured to seek the key code 24 in response to an input relating to one of the integrated features 20. The control unit 22 is configured to determine whether the authorization device 302 is coupled to the support apparatus 10 directly or indirectly. The control unit 22 may additionally or alterna-tively be configured to wirelessly communicate with one or more of the local server 320, the remote server 350, and the remote device 352 to seek the key code 24. The control unit 22 includes routines 84 to determine the order for seeking the key code 24 as well as for locating the key code 24. For example, the control unit 22 includes routines 84 directed to finding the location of the key code 24 within the authori-zation device 302 or location within the remote server 350, the local server 320, or the remote device 352. Generally, the key code 24 is stored in a predefined location, such that the control unit 22 is programmed to follow a predefined path to the predefined location to retrieve the key code 24.

Figure 11:
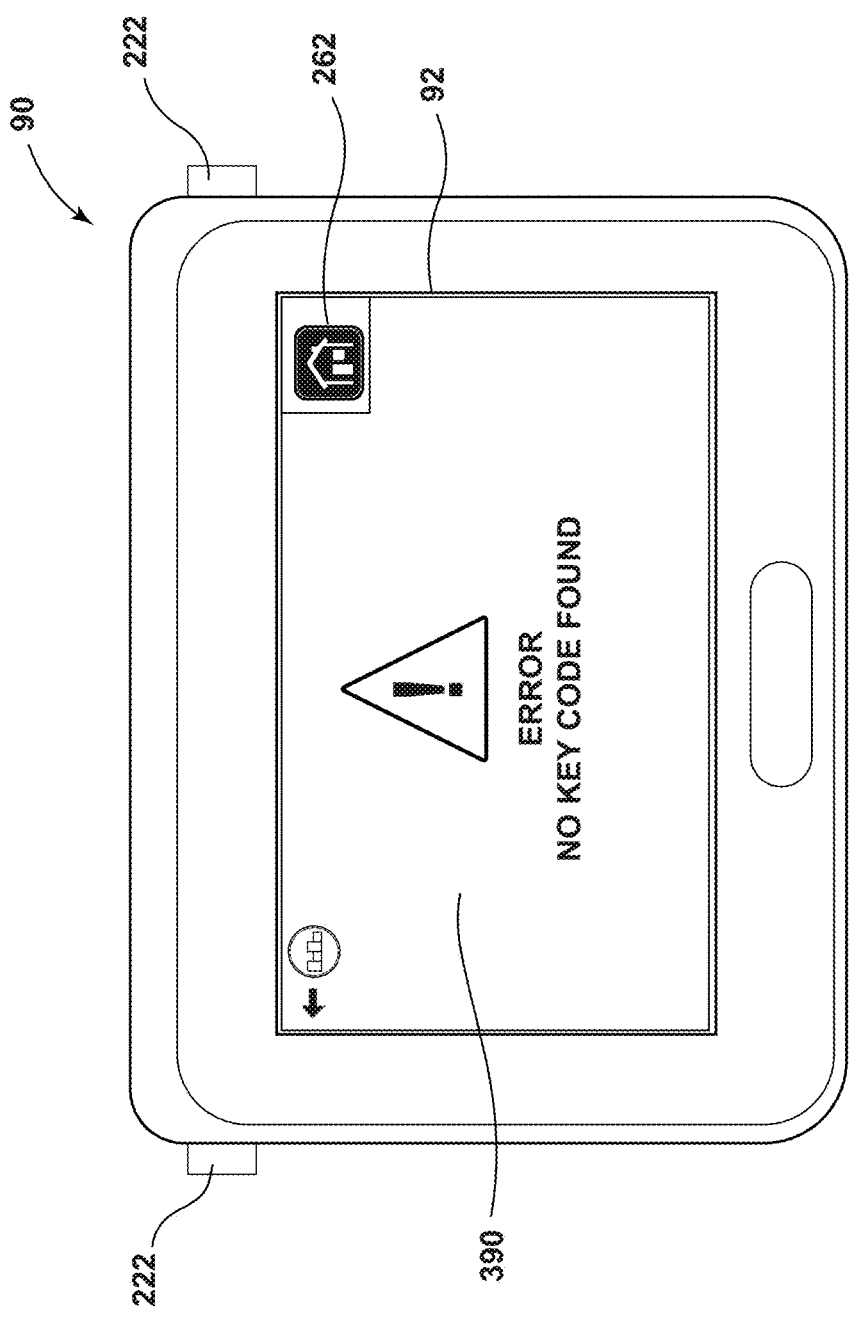
FIG. 11 is illustrative of an error message on a display of a control panel associated with an authorization system, according to the present disclosure.

Referring now to FIG. 11, if the key code 24 is unable to be retrieved or found, the control unit 22 may generate and communicate an error message 390, such as the error message 390 illustrated on the control panel 90 in FIG. 11. There may be a variety of reasons for the error message 390 to be displayed. For example, the authorization device 302 may not be coupled to the support apparatus 10 (i.e., the control unit 22 is free of direct or indirect communication with the authorization device 302). Further, the local server 320, the remote server 350, and/or the local server 320 may also not be in communication (i.e., free of communication with) the control unit 22. Further, the key code 24 may not be stored in the local server 320, the remote device 352, or the remote server 350. In such examples, the key code 24 may not have been generated to prevent activation of the integrated feature 20 or the key code 24 may be unavailable due to a corruption of the path or location of the key code 24. The error message 390 may notify the caregiver of the inability of the control unit 22 to obtain the key code 24 and control the integrated feature 20.

In certain aspects, the caregiver may determine which integrated features 20 may be activated based on the treat-ment or therapy to be provided and the key code 24 is generated for those integrated features 20. Additionally or alternatively, the patient may select integrated features 20 for comfort or as an upgrade to his or her medical facility stay, and the key code 24 may be generated for those integrated features 20. If neither the caregiver nor the patient has selected the integrated features 20, the key code 24 may not be generated and the integrated features 20 remain in the locked state. The key code 24 or key codes 24 may be continuously generated and deleted to dynamically adjust the authorization system 300.

Figure 12:
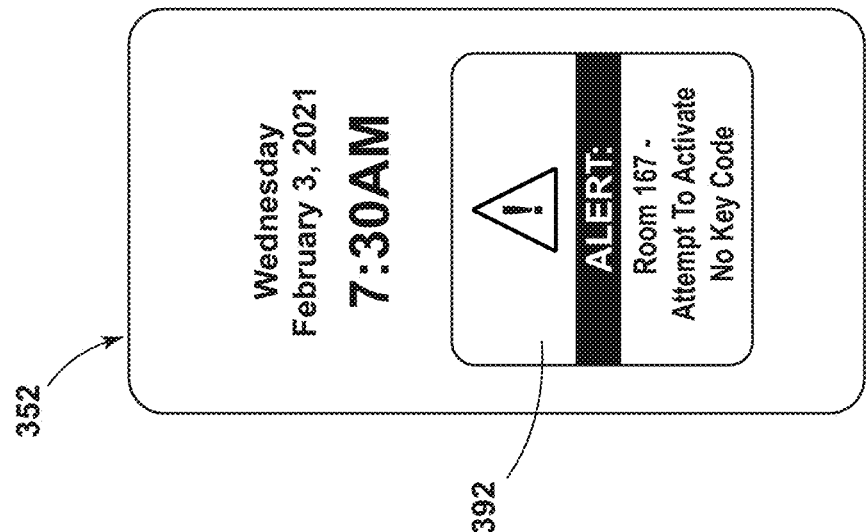
FIG. 12 is illustrative of an alert on a remote device associated with an authorization system, according to the present disclosure.

Referring to FIG. 12, the control unit 22 may also be configured to generate an alert 392, which is communicated to the caregiver, for example, via the remote device 352 as illustrated in FIG. 12. The alert 392 indicates to the caregiver that at least one of the integrated features 20 was attempted to be activated and the key code 24 was not found by the control unit 22. This may be due to an unauthorized attempted activation or a problem with the key code 24. The alert 392 may be any visual, haptic, or audible alert. Addi-tionally, the alert 392 may be communicated to a variety of locations, such as the remote device 352, the caregiver device 308, a nurse call station, a facility status board, etc.

Figure 13:
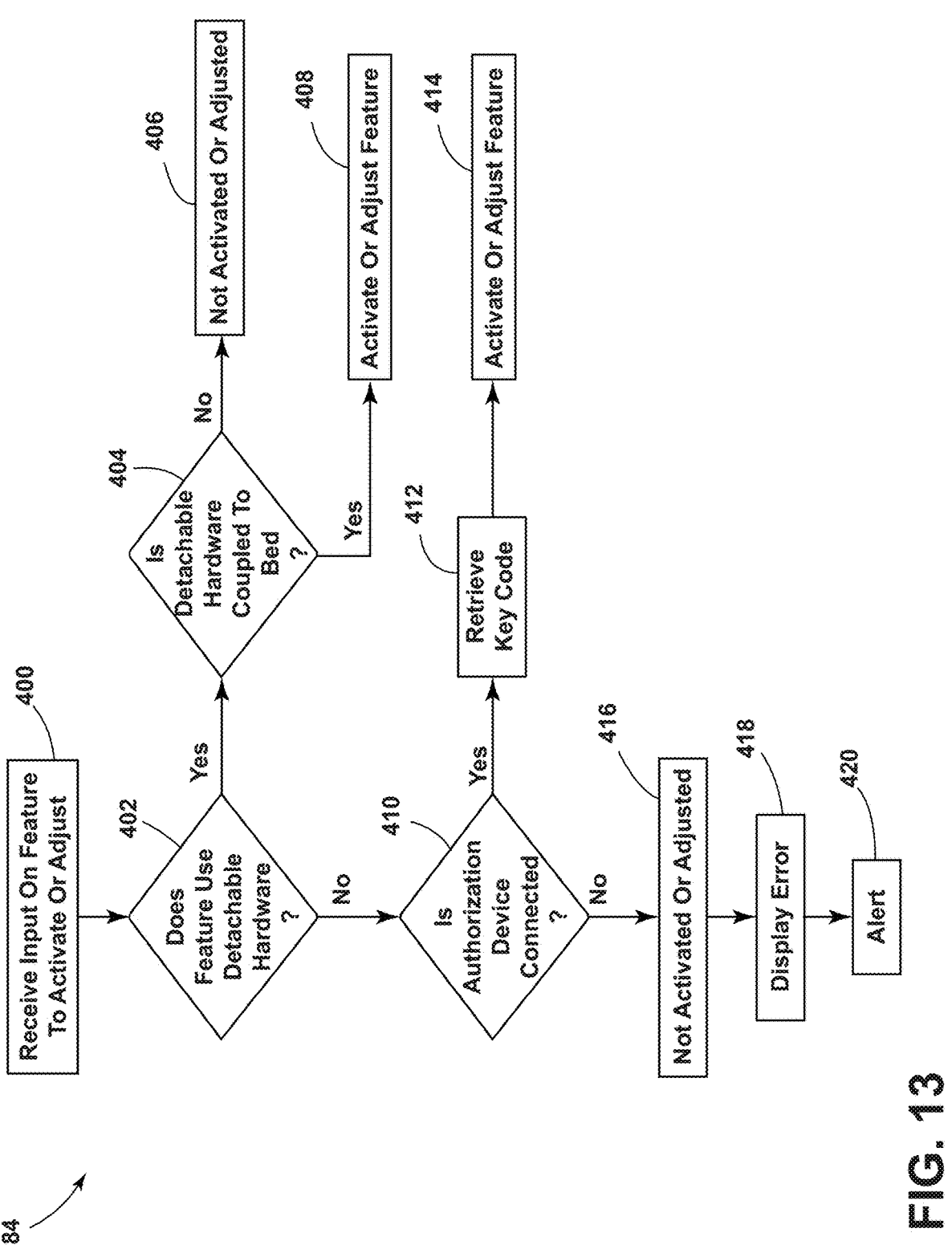
FIG. 13 is a flow diagram of a routine for authorizing control of an integrated feature via a key code stored in an authorization device, according to the present disclosure.

Referring now to FIG. 13, the control unit 22 includes at least one routine 84 for authorizing and activating features 20 of the support apparatus 10 using the authorization device 302. In step 400, the control unit 22 is configured to receive an input related to the feature 20, 140 on the support apparatus 10 to be controlled (e.g., activated, deactivated, adjusted, etc.). In decision step 402, the control unit 22 is configured to determine whether the selected feature 20, 140 is the integrated feature 20 or the removable feature 140. The control unit 22 is configured to determine whether the selected feature 20, 140 utilizes detachable or additional hardware that is selectively coupled to the support apparatus 10. In decision step 402, if the control unit 22 determines that new or additional hardware is utilized by the selected feature 140, then the control unit 22 proceeds to decision step 404.

In decision step 404, the control unit 22 is configured to determine whether the hardware for the selected removable feature 140 is coupled to the support apparatus 10. If the hardware is not coupled to the support apparatus 10, the control unit 22 proceeds to step 406 where the selected removable feature 140 is not activated or adjusted. In such configurations, even though the removable feature 140 was selected, the support apparatus 10 remains in a same condition. Returning to decision step 404, if the detachable hardware is currently coupled to the support apparatus 10 and, consequently, in communication with the control unit 22, the control unit 22 proceeds to step 408 of controlling the selected removable feature 140 in accordance with the input.

Returning to decision step 402, if the selected feature is the integrated feature 20 and, therefore, does not utilize new or additional hardware, the control unit 22 proceeds to decision step 410. In decision step 410, the control unit 22 is configured to determine whether the authorization device 302 is connected. The authorization device 302 may be connected directly to the support apparatus 10, to the control panel 90, or to the caregiver device 308.

If the authorization device 302 is connected, either directly or indirectly to the support apparatus 10, the control unit 22 proceeds to step 412 to obtain or retrieve the key code 24 from the authorization device 302. It is also contemplated that the control unit 22 may seek the key code 24 from the memory of the local server 320 via wired communication as described herein. The control unit 22 is configured to seek the key code 24 in a predefined location on a predefined path within the authorization device 302. In step 412, the control unit 22 is configured to adjust the selected integrated feature 20 to the unlocked state upon obtaining the key code 24. After obtaining the key code 24, the control unit 22 proceeds to step 414 where the selected integrated feature 20 is controlled in accordance with the user input. The control unit 22 may then return the integrated feature 20 to the locked state. The integrated feature 20 may be locked after a predefined period of time from the initial user input, from any user input, in response to an input to re-lock the feature 20, etc.

Referring still to FIG. 13, returning to decision step 410, if the authorization device 302 is not detected and the control unit 22 cannot obtain the key code 24 from the local server 320, the control unit 22 proceeds to step 416 where the feature is not controlled. In this way, the integrated feature 20 remains in the current state of operation and in the locked state. The current state of operation may be an off or deactivated state. Alternatively, the current state of operation may be an activated state providing a certain function. For example, the pneumatic system 130 may be providing a select therapy and the select therapy continues without the key code 24 providing for authorization to adjust or deactivate the pneumatic system 130.

In step 418, the control unit 22 proceeds to generate and communicate (e.g., display) the error message 390. The error message 390 may be displayed or otherwise communicated via the control panel 90, the caregiver device 308, the remote device 352, or any other device of the medical facility. In step 420, the control unit 22 is configured to generate and communicate the alert 392. The alert 392 is generally communicated to the caregiver via the remote device 352 but may also be communicated via the control panel 90, another facility device, etc. to indicate to the caregiver that there was an attempt to control the integrated feature 20 though the key code 24 was not obtained. The alert 392 may be generic, indicating that any adjustment to any integrated feature 20 was attempted, or specific, indicating that adjustment of the select integrated feature 20 was attempted. The alert 392 may also be adjusted to be personalized for the caregiver, the patient, or the facility.

It is contemplated that the key code 24 may also be utilized with the removable feature 140 when the detachable hardware is coupled to the support apparatus 10. This configuration may be advantageous for providing an additional security check to prevent unauthorized control of the removable feature 140 when the detachable hardware is coupled to the support apparatus 10. In such examples, when the control unit 22 determines in decision step 404 that the detachable hardware is coupled to the support apparatus 10, the control unit 22 proceeds to decision step 410 to determine whether the authorization device 302 is connected. If so, the control unit 22 proceeds to step 412 to retrieve the key code 24 and then to step 408 to activate the removable feature 140, or, if not, the control unit 22 proceeds to step 406 of not controlling the removable feature 140.

Figure 14:
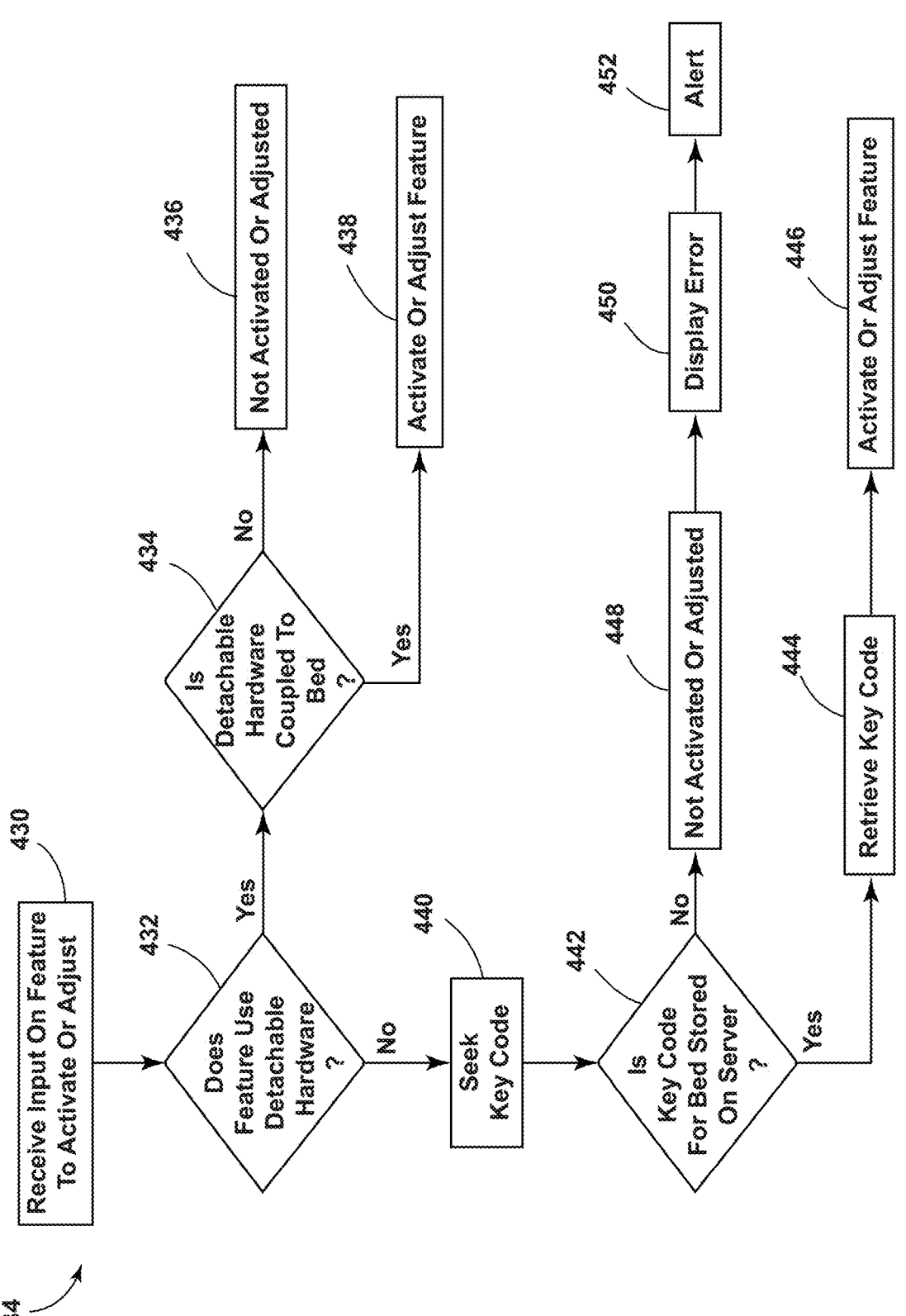
FIG. 14 is a flow diagram of a routine for authorizing control of an integrated feature via a key code stored in at least one of a server and a remote device, according to the present disclosure.

Referring to FIG. 14, additionally or alternatively, the control unit 22 may include at least one routine 84 directed to authorizing and controlling features of the support apparatus 10 through wirelessly obtaining the key code 24. In step 430, the control unit 22 is configured to receive the input relating to the feature 20, 140 to be controlled. The control unit 22 then proceeds to decision step 432 to determine whether the selected feature 20, 140 utilizes new or additional hardware. If the control unit 22 determines that the selected feature 140 utilizes new or additional hardware, the control unit 22 proceeds to decision step 434.

In decision step 434, the control unit 22 is configured to determine whether the hardware is coupled to the support apparatus 10. If the hardware is not coupled to the support apparatus 10, the control unit 22 proceeds to step 436 where the selected removable feature 140 is not activated or adjusted. Returning to decision step 438, if the hardware is coupled to the support apparatus 10, the removable feature 140 is controlled based on the user input.

Referring still to FIG. 14, returning to decision step 432, if the control unit 22 determines that the selected feature 20 utilizes no additional hardware and is, therefore, the integrated feature 20, in step 440, the control unit 22 is configured to seek the key code 24 via the communication network 354. The control unit 22 is communicatively coupled with at least one of the remote server 350, the local server 320, and the remote device 352. Based on the routine 84, the control unit 22 follows the predefined path to the predefined location where the key code 24 is stored. For example, the predefined location may be the remote server 350. In such examples, the control unit 22 may not seek the key code 24 from the local server 320 or the remote device 352. Alternatively, the control unit 22 may seek the key code 24 from one or more of the remote server 350, the local server 320, and the remote device 352. This may be advantageous if the predefined path to one location of the key code 24 is corrupted, and a secondary path can be utilized to authorize the use of the integrated feature 20.

Upon locating the key code 24, in step 444, the control unit 22 is configured to retrieve or read the key code 24. In step 444, the control unit 22 is configured to adjust the selected integrated feature 20 to the unlocked state upon obtaining the key code 24. In step 446, the control unit 22 proceeds to control the selected integrated feature 20 in accordance with the user input. In step 446, the control unit 22 may return the integrated feature 20 to the locked state.

Returning to decision step 442, if the control unit 22 does not or cannot obtain the key code 24, the control unit 22 proceeds to step 448. The key code 24 may be unobtainable due to a lack of communication between the control unit 22 and the authorization source 26, the key code 24 not being generated (e.g., no authorization), or an issue with the key code 24 or path to the key code 24. In step 448, the integrated feature 20 is not activated, adjusted, or deactivated as the input is not authorized. In step 450, the control unit 22 is configured to generate and communicate the error message 390, and in step 452, the control unit 22 is configured to generate and communicate the alert 392.

It is contemplated that the key code 24 may also be utilized with the removable feature 140 when the detachable hardware is coupled to the support apparatus 10. In such examples, when the control unit 22 determines in decision step 434 that the detachable hardware is coupled to the support apparatus 10, the control unit 22 proceeds to step 440 to seek the key code 24 and decision step 442 to determine whether the key code 24 is stored in a select location. If so, the control unit 22 proceeds to step 444 to retrieve the key code 24 and then to step 438 to activate the removable feature 140 or, if not, the control unit 22 proceeds to step 436 of not controlling the removable feature 140.

Figure 15:
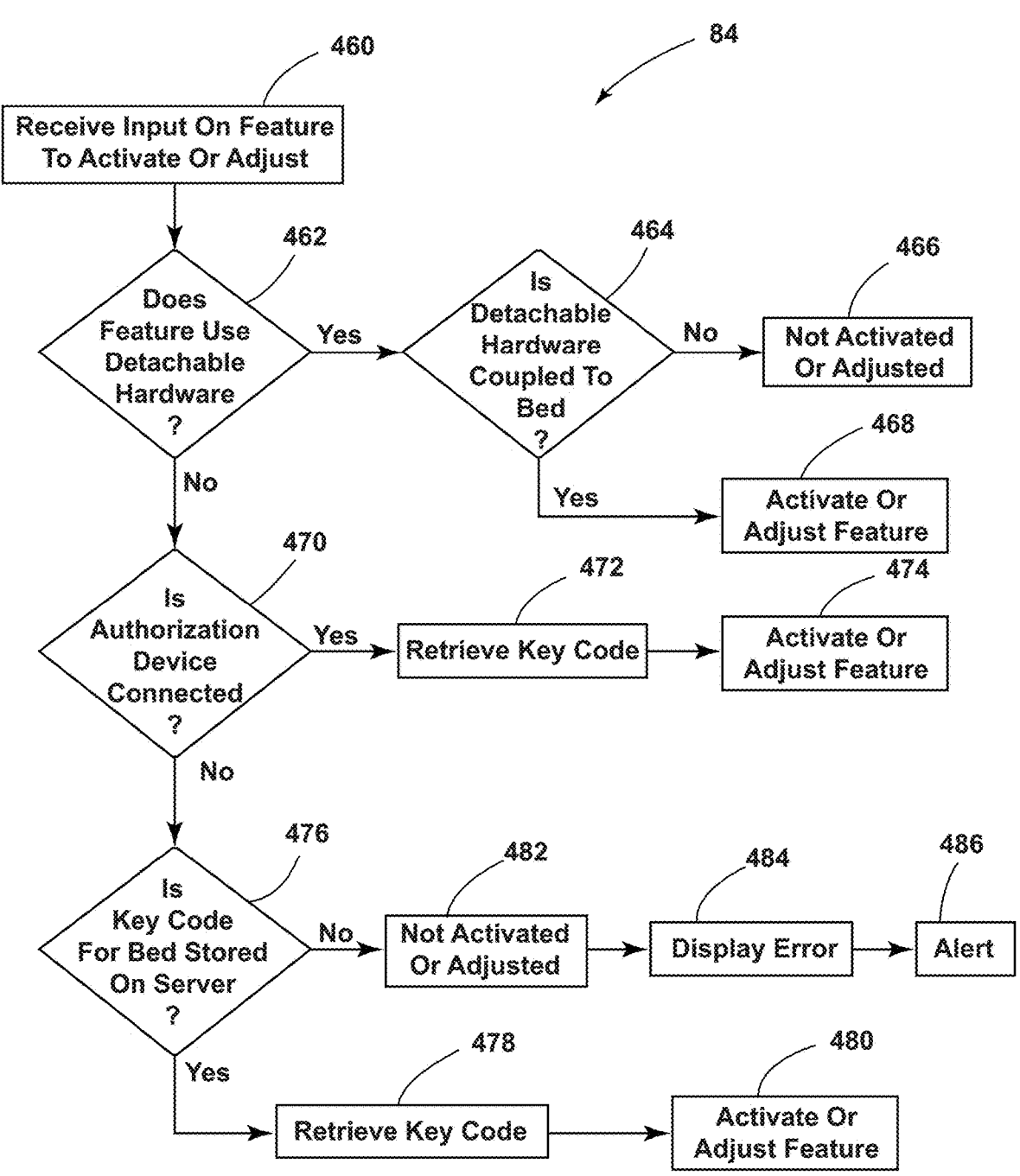
FIG. 15 is a flow diagram of a routine for authorizing control of an integrated feature via a key code stored in an authorization source, according to the present disclosure.

Referring now to FIG. 15, additionally or alternatively, the control unit 22 may include at least one routine 84 configured to control features of the support apparatus 10 through wired and wireless communication with the authorization source 26. In step 460, the control unit 22 is configured to receive the input relating to the feature 20, 140 of the support apparatus 10 to be controlled. In decision step 462, the control unit 22 is configured to determine whether or not the selected feature utilizes new or additional hardware (e.g., whether the selected feature is the removable feature 140 or the integrated feature 20). If the selected feature utilizes new or additional hardware, the control unit 22 proceeds to decision step 464 where the control unit 22 determines whether the hardware is coupled to the support apparatus 10. If the hardware is not coupled to the support apparatus 10, the control unit 22 proceeds to step 466 where the selected removable feature 140 is not activated or adjusted. In decision step 464, if the hardware is coupled to the support apparatus 10, the control unit 22 proceeds to step 468 to control the selected removable feature 140 in response to the received input.

Returning to decision step 462, if the selected feature does not utilize new or additional hardware (e.g., is the integrated feature 20), the control unit 22 proceeds to decision step 470. In decision step 470, the control unit 22 is configured to determine whether there is wired communication with the authorization source 26. Generally, in decision step 470, the control unit 22 is configured to determine whether the authorization device 302 is connected to the support apparatus 10 either directly or indirectly. The control unit 22 may also seek the key code 24 from the local server 320 via wired communication. The control unit 22 is configured to follow the predefined path to the location of the key code 24. Accordingly, the control unit 22 may seek the key code 24 in a single location or, alternatively, may seek the key code 24 in multiple locations. Seeking the key code 24 in multiple locations may be advantageous if there is an issue with a primary path and the key code 24 in a secondary location may grant authorization.

In decision step 470, if the authorization device 302 is in communication with the control unit 22 by being coupled to the support apparatus 10, the control unit 22 proceeds to step 472 to retrieve or read the key code 24. In step 474, the control unit 22 is configured to activate, adjust, or deactivate the integrated feature 20 in accordance with the user input.

Returning to decision step 470, if the control unit 22 determines that the authorization device 302 is not connected to the support apparatus 10 or cannot otherwise obtain the key code 24 via the connected authorization device 302 (e.g., no key code 24 in the predefined location, an issue with the path, etc.), the control unit 22 proceeds to decision step 476. In decision step 476, the control unit 22 is configured to determine whether the key code 24 can be found in the authorization source 26 wirelessly. The control unit 22 is configured to wirelessly seek the key code 24 from one or more of the remote server 350, the local server 320, and the remote device 352 to seek the key code 24 and determine whether the key code 24 is available. The control unit 22 may follow the predefined path to the location of the key code 24 and may also follow a secondary path or a tertiary path to seek each location the key code 24 could be stored.

If the control unit 22 is able to locate the key code 24, in step 478, the control unit 22 is configured to retrieve or read the key code 24 and unlock the integrated feature 20. In step 480, the selected integrated feature 20 is controlled in accordance with the user input. After controlling the integrated feature 20 based on the user input, the integrated feature 20 may again be locked.

Returning to decision step 476, if the key code 24 is not stored in the predefined location, the control unit 22 proceeds to step 482 where the integrated feature 20 is not activated, adjusted, or deactivated. Accordingly, the selected integrated feature 20 remains in the current state of operation and remains locked. The control unit 22 then proceeds, in step 484, to generate and communicate the error message 390 and, in step 486, generate and communicate the alert 392.

The key code 24 may also be utilized with the removable feature 140 when the detachable hardware is coupled to the support apparatus 10. The control unit 22 may seek the key code 24 before activating the removable feature 140 or prevent control of the removable feature 140 if the key code 24 is not obtained. It is understood that the steps of the routines 84 set forth in FIGS. 13-15 may be performed in any order, simultaneously, repeated, and/or omitted without departing the teachings provided herein. Further, each routine 84 described herein may be performed in combination or independently.

With reference now to FIG. 16, as well as FIGS. 1-15, a method 500 of controlling the integrated feature 20 includes step 502 of generating the key code 24. The caregiver may input information into the authorization system 300 relating to which integrated features 20 are to be utilized. The integrated features 20 may be requested by the patient, included in an upgrade, or utilized by the caregiver for treating the patient. The information may be input via the remote device 352, the caregiver device 308, or another facility device. At least one of the remote server 350, the local server 320, and the remote device 352 includes software (e.g., routines) that generates the key code 24. For example, the caregiver may input the information through the remote device 352, which is communicated to the remote server 350 via the communication network 354. The remote server 350 is then configured to generate the key code 24. In another non-limiting example, the caregiver may enter the information through the caregiver device 308, which is communicated to the local server 320.

The generated key code 24 may be a more generic code, which is applicable for more than one caregiver, integrated feature 20, or support apparatus 10. The same key code 24 may be used to authorize multiple integrated features 20 or support apparatuses 10. Alternatively, the generated key code 24 may be a more specific code that is utilized for a single support apparatus 10, a single integrated feature 20, etc. In such examples, the serial number of the support apparatus 10 may be included in the key code 24, differentiating the key code 24 for each support apparatus 10.

Further, in step 502, the key code 24 may also be encrypted. For example, the key code 24 may be encrypted via hashing. By encrypting the key code 24, the key code 24 may not be reverse-engineered. This provides additional protection to the authorization system 300.

In step 504, the key code 24 is stored in the authorization source 26. The key code 24 may be downloaded and stored on the authorization device 302. Additionally or alternatively, the key code 24 may be communicated via the communication network 354 to the local server 320, the remote server 350, or the remote device 352. The predefined location for storing the key code 24 may be determined by the software that generates the key code 24 for the caregiver. In certain aspects, the predefined location and path may be programmed into the control unit 22.

Additionally or alternatively, the software that generates the key code 24 may communicate the path and the location of the key code 24 to the control unit 22. In such configurations, the information is stored in the control unit 22 and the routine 84 follows the path to the location. The control unit 22 may have routines 84 for following additional paths should the communicated or programmed path (e.g., a primary path) not lead to the key code 24. Additionally or alternatively still, the software that generates the key code 24 may communicate the path and location for the key code 24 to a central location. The control unit 22 may be configured to seek the path and location information in the central location and be configured to determine which path and location correspond to the specific support apparatus 10 or integrated feature 20.

In step 506, the authorization source 26 is coupled with the support apparatus 10. In certain aspects, the authorization device 302 is physically coupled, either directly or indirectly, to the support apparatus 10. Additionally or alternatively, the support apparatus 10 is communicatively coupled with the authorization source 26 to be able to wirelessly communicate to retrieve the key code 24.

In step 508, the user input related to the integrated feature 20 to be controlled (e.g., activated, adjusted, or deactivated) is provided through the user interface 18. The user interface 18 may be the control panel 90, the remote device 352, or another facility device. The user input is communicated to the control unit 22. At this time, the integrated feature 20 is generally in the locked state, such that authorization is sought before any adjustment to the integrated feature 20 is made. In step 510, the control unit 22 is configured to seek the key code 24 according to one or more of the routines 84 described herein.

In step 512, the control unit 22 is configured to retrieve, obtain, read, or otherwise seek the key code 24 from the authorization source 26 as described herein. Additionally, in step 512, the control unit 22 is configured to adjust the integrated feature 20 to the unlocked state. In step 514, the control unit 22 is configured to control the integrated feature 20 in accordance with the user input. For example, if the integrated feature 20 is in the off state, the control unit 22 may be configured to activate the integrated feature 20. If the integrated feature 20 is activated, the control unit 22 may be configured to deactivate the integrated feature 20. Further, the control unit 22 may also be configured to adjust the integrated feature 20 (e.g., provide a different therapy, etc.).

In step 516, the control unit 22 is configured to return the integrated feature 20 to the locked state, which is the default condition. The integrated feature 20 may be adjusted to the locked state after a predefined period of time has elapsed since the user input related to the integrated feature 20, or any user input, was communicated to the control unit 22. Depending on the integrated feature 20, the integrated feature 20 may be deactivated in the locked state or may be maintained in the activated state. For example, the lift system 48 may be deactivated when in the locked state to maintain the upper frame 44 in the selected position. In another example, the pneumatic system 130 may remain activated when in the locked state to continue to provide the selected therapy. The integrated feature 20 may remain in the locked state until the authorization is again sought and provided. It is understood that the steps of the method 500 may be performed in any order, simultaneously, repeated, and/or omitted without departing from the teachings provided herein.

Referring to FIG. 17, as well as FIGS. 1-16, a method 530 for controlling the integrated feature 20 includes step 532 of providing the user input related to the integrated feature 20 to be controlled. Similar to method 500 illustrated in FIG. 16, in step 532, the user input is generally provided via the control panel 90, remote device 352, etc. and is communicated to the control unit 22.

In step 534, the control unit 22 is configured to seek the key code 24 from the authorization source 26. The control unit 22 may be configured to seek the key code 24 through wired communication with the authorization source 26, through wireless communication with the authorization source 26, or a combination thereof. In method 530, the key code 24 is not obtained by the control unit 22. For example, the caregiver may not have input information into the authorization system 300 for the key code 24 to be generated. In another example, the control unit 22 is free of communication with the authorization source 26. The control unit 22 will not be able to obtain the key code 24 to provide authorization for the user input.

In step 536, the control unit 22 is configured to generate the error message 390 in response to not finding or retrieving the key code 24. In such configurations, the authorization device 302 may not be coupled to the support apparatus 10, the key code 24 may not have been generated, the key code 24 may have been saved in an incorrect location, etc. The error message 390 is communicated to the caregiver, for example, via the touchscreen display 92 on the control unit 22, the remote device 352, a status board at a nurse call station, etc.

In step 538, the control unit 22 is configured to generate the alert 392 and communicate the alert 392 to the caregiver. The alert 392 may be communicated to the remote device 352, a nurse call station device, etc. The alert 392 notifies the caregiver that an unauthorized attempt at controlling the integrated feature 20 was made, an error occurred in the control unit 22 obtaining the key code 24, etc. The control unit 22 is configured to maintain the selected integrated feature 20 in the current state or condition. In this method 530, the authorization is sought, whether on purpose or accidentally, and is not provided by the authorization system 300. It is understood that the steps of the method may be performed in any order, simultaneously, repeated, repeated, and/or omitted without departing from the teachings provided herein.

With reference to FIGS. 1-17, the authorization system 300 may be utilized with the support apparatus 10 as well as any other devices or assemblies that have integrated features 20. The support apparatus 10, and other devices, are often modular products that are flexible and scalable, providing multiple configurations with different integrated features 20. The support apparatus 10 can be changed to include or remove various integrated features 20 and removable features 140. The authorization system 300 provides additional steps to protect against unauthorized, accidental, or inadvertent control of the integrated features 20 included in the support apparatus 10.

In certain aspects, the support apparatus 10 may be configured to transfer between different units of the medical facility. For example, it may be advantageous for the support apparatus 10 to be transferable or interchangeable between the intensive care unit (ICU) and a medical/surgical (Med-Surg) unit. Typically, each of the MedSurg unit and the ICU utilize separate beds 40 having separate functions. However, the transferable or interchangeable support apparatuses 10 may be advantageous for providing a surge solution in medical facilities. For example, during certain surge events, surge patients may overflow from the ICU to the MedSurg unit. The surge patients may be provided the same care and treatments in ICU and the MedSurg unit using the support apparatus 10 disclosed herein. Further, the authorization system 300 may allow the same support apparatuses 10 to transfer between the ICU and the MedSurg unit with different features and functions being authorized depending on the current unit in which the support apparatuses 10 are being used.

Figure 18:
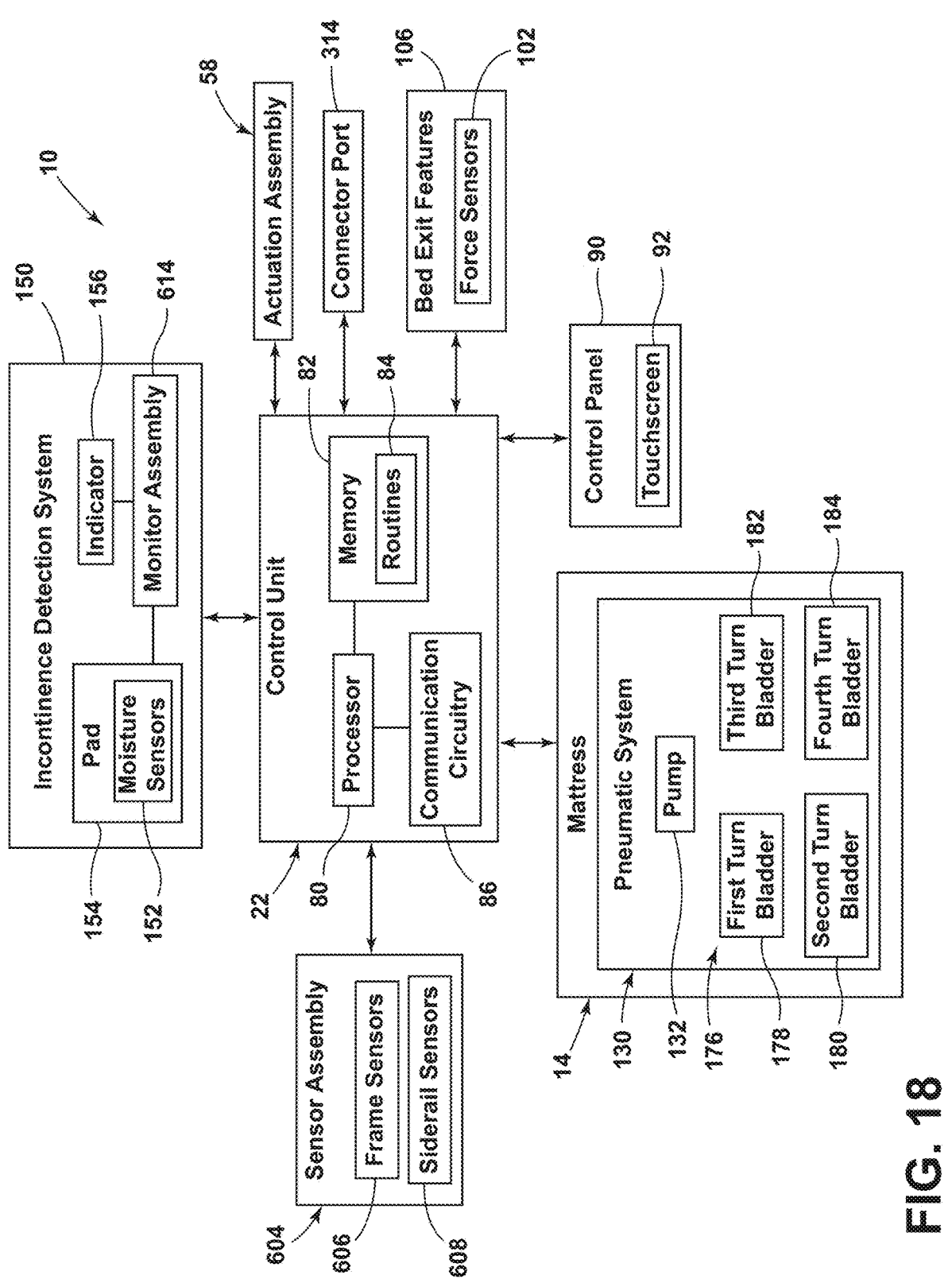
FIG. 18 is a block diagram of an authorization system including a pneumatic system and an incontinence detection system, according to the present disclosure.

Referring to FIG. 18, the support apparatus 10 that is usable in both the MedSurg unit and the ICU provides a continuous lateral rotation (CLR) function for providing pulmonary treatment. The CLR function provides continuous side-to-side movement or rotation for the patient to address pulmonary concerns. The CLR function generally utilizes the pneumatic system 130 within the mattress 14. Accordingly, the CLR function is an exemplary integrated feature 20 of the mattress 14, which may be enabled and/or activated with the authorization system 300 via the key code 24 stored in the authorization source 26 (FIG. 6) or through the touchscreen display 92 of the control panel 90.

According to various aspects, the support apparatus 10 may be updated with additional or new software related to the CLR function. In certain aspects, the authorization device 302 (FIG. 4), such as a USB device, having the software update may be selectively coupled with the connector port 314 of the support apparatus 10 or the connector port 306 of the control panel 90 to program the control unit 22 with the CLR function. Additionally or alternatively, the support apparatus 10 may be in communication with the local server 320 or the remote server 350 (FIG. 6) and can wirelessly receive the software update. In this way, the support apparatuses 10 may be manufactured with the CLR function or updated to provide the CLR function.

Figure 19:
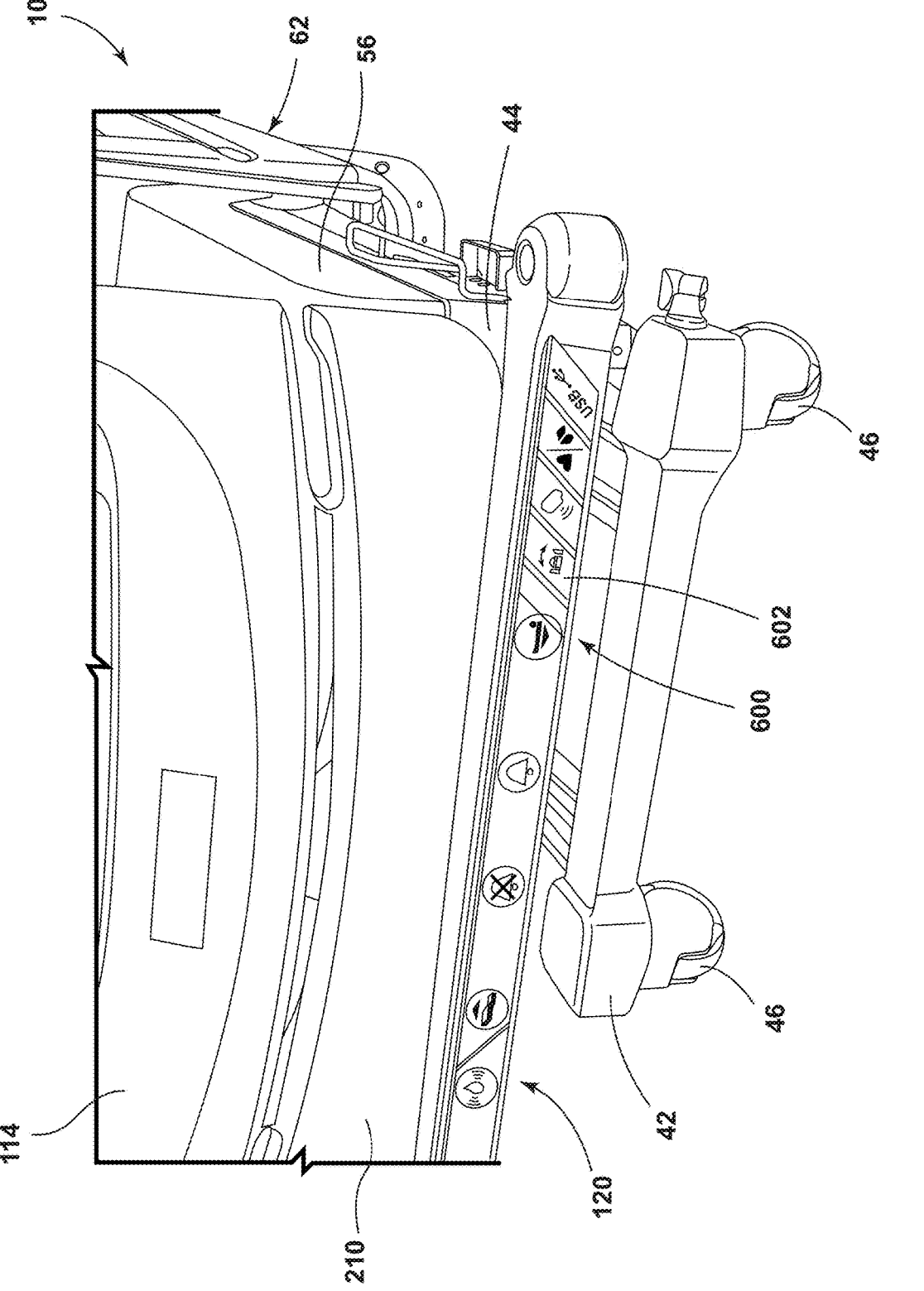
FIG. 19 is a partial side perspective view of a foot end of a support apparatus having symbols relating to functions of the support apparatus, including a continuous lateral rotation function, according to the present disclosure.

Referring still to FIG. 18, as well as to FIG. 19, the upper frame 44 of the support apparatus 10 may include various symbols 600 at the foot end 210 thereof, which allows caregivers to efficiently determine whether the support apparatus 10 includes various features or functions, such as the CLR function. As illustrated in FIG. 19, the support apparatuses 10 that include the CLR function include a CLR symbol 602 at the foot end 210 of the upper frame 44. As the caregiver moves past the support apparatus 10, the caregiver can quickly and efficiently note that the support apparatus 10 includes the CLR function. This may be advantageous during surge events to transfer support apparatuses 10 between the MedSurge unit and the ICU that include the CLR function.

Referring again to FIG. 3, and still to FIGS. 18 and 19, the CLR function utilizes the rotation bladders 176 of the pneumatic system 130 to adjust the patient between a left side position, a center position, and a right side position, which may be referred to as patient positions or predefined positions. The pump 132 is in fluid communication with the rotation bladders 176, which include the turn bladders 178, 180, 182, 184, to adjust the turn bladders 178, 180, 182, 184 between the inflated condition and the deflated condition. For example, when the first and third turn bladders 178, 182 are adjusted to the inflated condition, the mattress 14 is angled to rotate the patient to the left side position. When the second and fourth turn bladders 180, 184 are adjusted to the inflated condition, the mattress 14 is angled to rotate the patient to the right side position. The CLR function provides continuous adjustment in cycles between the different patient positions over a predefined period of time. Each cycle may include an adjustment of the patient from the left side position, to the center position, to the right side position, and back to the center position. Each of the left side position, the center position, and the right side position may be held for a predefined hold time based on settings of the CLR function, generally provided by the caregiver.

Referring again to FIG. 1, as well as FIGS. 18 and 19, predefined conditions of the support apparatus 10 are generally to be satisfied prior to the activation of the CLR function. The predefined conditions relate to a position of the support apparatus 10 and the components coupled to the support apparatus 10. For example, the predefined conditions may include a position of the upper frame 44, including the head end segment 52 in a lowered position, a lowered knee position defined between the base segment 54 and the foot end segment 56, the foot end segment 56 in a raised position, and the upper frame 44 in a level or flat condition. The support apparatus 10 generally includes a sensor assembly 604 with frame sensors 606 configured to sense the position of the upper frame 44.

Additional predefined conditions may include the siderails 62 in a raised position, devices being disengaged from the connector port 314 on one or more of the siderails 62, and an adjustment of the bed exit feature 106 to a lowest sensitivity level. A predefined number or all of the predefined conditions may be satisfied prior to the control unit 22 activating the CLR function. The predefined conditions generally relate to patient safety, minimizing interference between components as the mattress 14 adjusts between the different patient positions, and minimizing false alarms.

Generally, the patient is to be lying in a substantially flat or supine position on the support apparatus 10 during the CLR function. The level state or condition of the upper frame 44 provides a more comfortable side-to-side rotation of the patient. The sensor assembly 604 of the support apparatus 10 includes the frame sensors 606 configured to sense the position of the upper frame 44, including various segments 52, 54, 56 thereof. The frame sensors 606 are configured to sense a position of the head end segment 52, a position of the base segment 54, a position of the foot end segment 56, and/or the overall position of the upper frame 44 (e.g., level or not). The control unit 22 is configured to receive sensed information from the frame sensors 606 to confirm that the position of the upper frame 44 and the segments 52, 54, 56 satisfy the predefined conditions. If the predefined conditions are not satisfied, the control unit 22 may be configured to activate the actuation assembly 58 to adjust the upper frame 44 to the select position that satisfies the predefined condition (e.g., lowering the head end segment 52, raising the foot end segment 56, etc.). The adjustment with the actuation assembly 58 may be automatic or in response to a caregiver input.

Referring still to FIGS. 1, 18, and 19, the siderails 62 being in the raised position provides additional safety to the patient during the side-to-side rotation. The sensor assembly 604 may also include siderail sensors 608 configured to sense a position of each siderail 62 of the support apparatus 10. The control unit 22 is configured to receive sensed information from the siderail sensors 608 to confirm the siderails 62 are in the raised position and, therefore, satisfy the predefined conditions for activating the CLR function.

Further, the device engaged with the connector port 314 on one or more of the siderails 62 (generally one of the head siderails 64, 66) may be disposed within a movement path of the mattress 14 as the pneumatic system 130 adjusts to at least one of the right side position or the left side position. Any cord extending between the siderail 62 and the device may also affect the movement of the mattress 14 or the comfort of the patient. The device may be, for example, a personal device of the patient or a bed remote for controlling the support apparatus 10 and/or components of the patient room, etc.

The device may hinder movement of the mattress 14, be moved by the mattress 14, and/or be disengaged from the siderail 62 by the movement of the mattress 14, and, therefore, disengagement of the device is advantageous prior to the activation of the CLR function. The control unit 22 may be configured to sense when the device is engaged or disengaged with the connector port 314. Further, the control unit 22 may be configured to sense when the cord, such as a power cord, is engaged with the connector port 314 when the cord is not engaged with the device.

Referring still to FIGS. 18, and 19, adjusting the bed exit feature 106 may also be one of the predefined conditions to be satisfied before activating the CLR function. The adjustment of the sensitivity of the bed exit feature 106 minimizes false alarms during the activation of the CLR function. The bed exit feature 106 includes the force sensors 102 configured to monitor the position and movement of the patient on the support apparatus 10. Generally, the control unit 22 is configured to generate an alert in response to the movement of the patient that indicates that the patient is attempting to exit the support apparatus 10.

When operating independently, the bed exit feature 106 generally has three sensitivity levels. The first, and highest, sensitivity level results in an alert being generated when the patient moves from a lying position to a sitting position. The second, middle, sensitivity level results in the alert being generated when the patient moves toward an edge of the mattress 14. The third, and lowest, sensitivity level results in the alert being generated when the patient exits the bed (e.g., the force sensors 102 no longer sense the weight of the patient). The sensitivity level determines at what stage of movement (from the lying position to fully exiting the bed) triggers the bed exit alert generation.

When the CLR function is operating in a preview mode or an active mode, the pneumatic system 130 moves the patient in a side-to-side motion, which may trigger the bed exit feature 106 at the highest or middle sensitivity levels. Accordingly, the bed exit feature 106 may be adjusted by the caregiver to the lowest sensitivity level when activating the CLR function. This may be advantageous to minimize or prevent false alarms from the bed exit feature 106 caused by the CLR function.

Referring still to FIG. 18, an additional non-limiting example of a feature that may be enabled or activated through the touchscreen display 92 of the control panel 90 includes the incontinence detection system 150, which may also utilize the CLR function. The incontinence detection system 150 may be an example of the integrated feature 20 (FIG. 2) that is installed during the manufacture of the support apparatus 10 or an example of the removable feature 140 (FIG. 2) added onto the support apparatus 10. The incontinence detection system 150 includes multiple components to sense an incontinence event and provide a timely alert to the caregiver to maximize the comfort of the patient.

The incontinence detection system 150 includes a monitor assembly 614 coupled to the support apparatus 10. The monitor assembly 614 generally includes a control unit having a processor, a memory, and other control circuitry. Instructions or routines are stored in the memory and executable by the processor. The monitor assembly 614 may include communication circuitry for bidirectional wired or wireless communication. The monitor assembly 614 may be in communication with the control unit 22 of the support apparatus 10 and/or other systems of the medical facility directly or through the communication network 354 (FIG. 6).

The incontinence detection system 150 includes the pad 154 with the moisture sensors 152 and which are configured to be positioned on the mattress 14 under the patient. The moisture sensors 152 are configured to sense moisture levels or the incontinence event. The monitor assembly 614 is in communication with the moisture sensors 152. When the moisture sensors 152 sense moisture and communicate sensed information to the monitor assembly 614, the monitor assembly 614 is configured to activate the indicator 156 on the support apparatus 10 or communicate an alert to a nurse call system or other systems of the medical facility.

Figure 20:
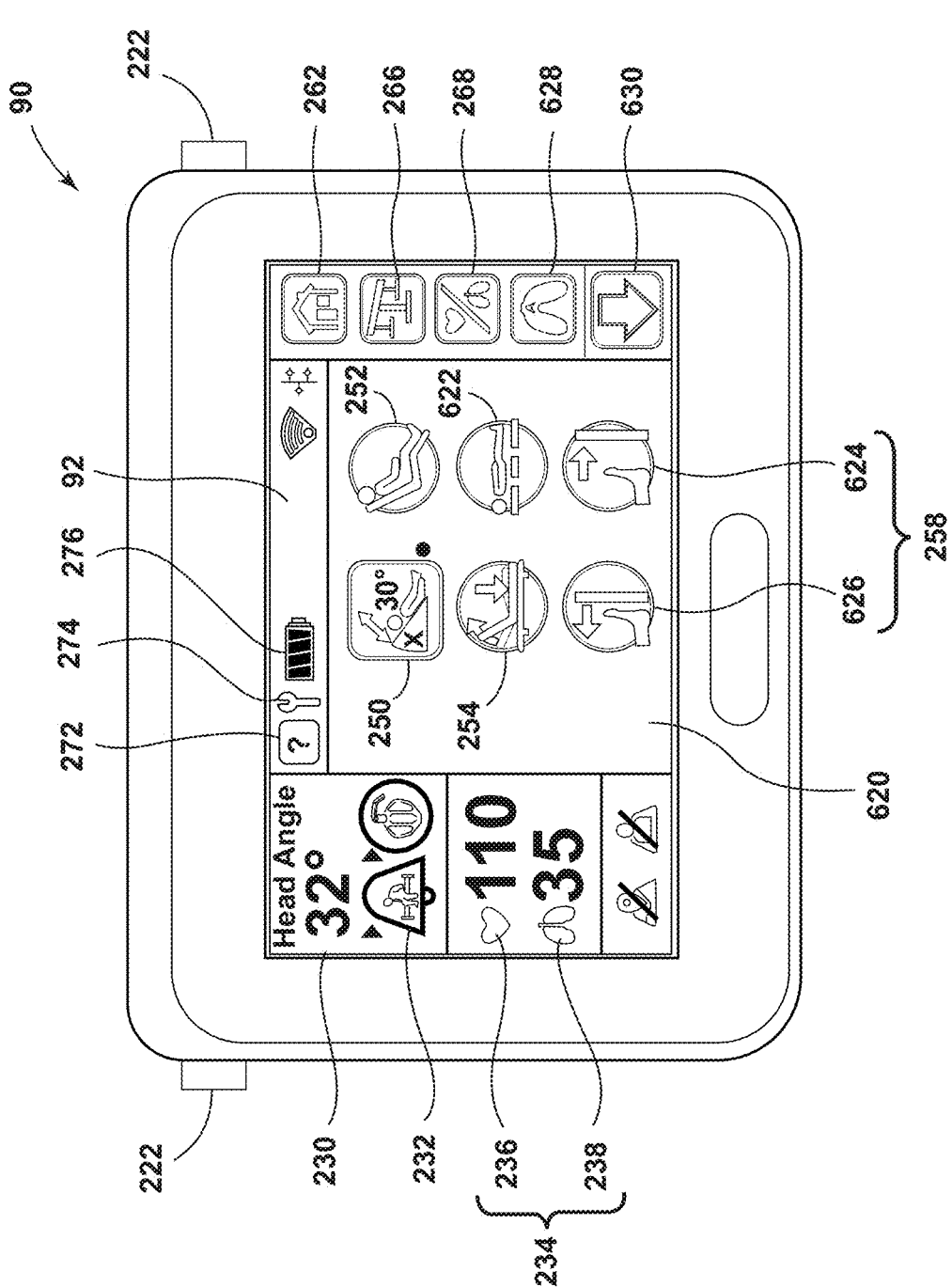
FIG. 20 is illustrative of a home screen on a display of a control panel, according to the present disclosure.

Referring still to FIG. 18, as well as FIG. 20, the integrated features 20, such as the CLR function, may be enabled and/or activated via the touchscreen display 92 of the control panel 90. The control panel 90 is configured to receive inputs from the caregiver for controlling the support apparatus 10 and features or functions thereof. Additionally, as illustrated in FIG. 20, a home screen 620 displayed on the touchscreen display 92 of the control panel 90 is configured to provide information about the patient, active functions, the variety of information 226, and the selectable icons 228. For example, the home screen 620 illustrated in FIG. 20 includes the head angle measurement 230, the active alert 232 that shows the sensitivity level of the bed exit feature 106, and the vital signs information 234 with the heart rate 236 and the respiration rate 238. The home screen 620 also includes the head angle icon 250, the sitting position icon 252, the stand assist icon 254, a frame adjustment icon 622, and two length adjustment icons 258, which include an extend icon 624 and a retract icon 626. Further, as illustrated on a side of the touchscreen display 92 of FIG. 20, the home screen 620 includes the home icon 262, the scale icon 266, the vital signs icon 268, a CLR icon 628, and an arrow icon 630 for viewing additional icons 228.

The order of the icons 228, particularly those on the side of the touchscreen display 92 under the home icon 262, are configured to be automatically adjusted by the control unit 22 in response to activated features. For example, when the support apparatus 10 does not include the CLR function, the CLR icon 628 is not included on the touchscreen display 92. When the CLR function is included in the support apparatus 10 but is disabled, the CLR icon 628 may be lower in the order, generally accessible by selecting the arrow icon 630. When the CLR function is enabled and active, the CLR icon 628 may be closer to the home icon 262 to provide more convenient access to information related to the CLR function. The control unit 22 is configured to prioritize the icons 228 based on predefined priority, activation status, etc.

Figure 21:
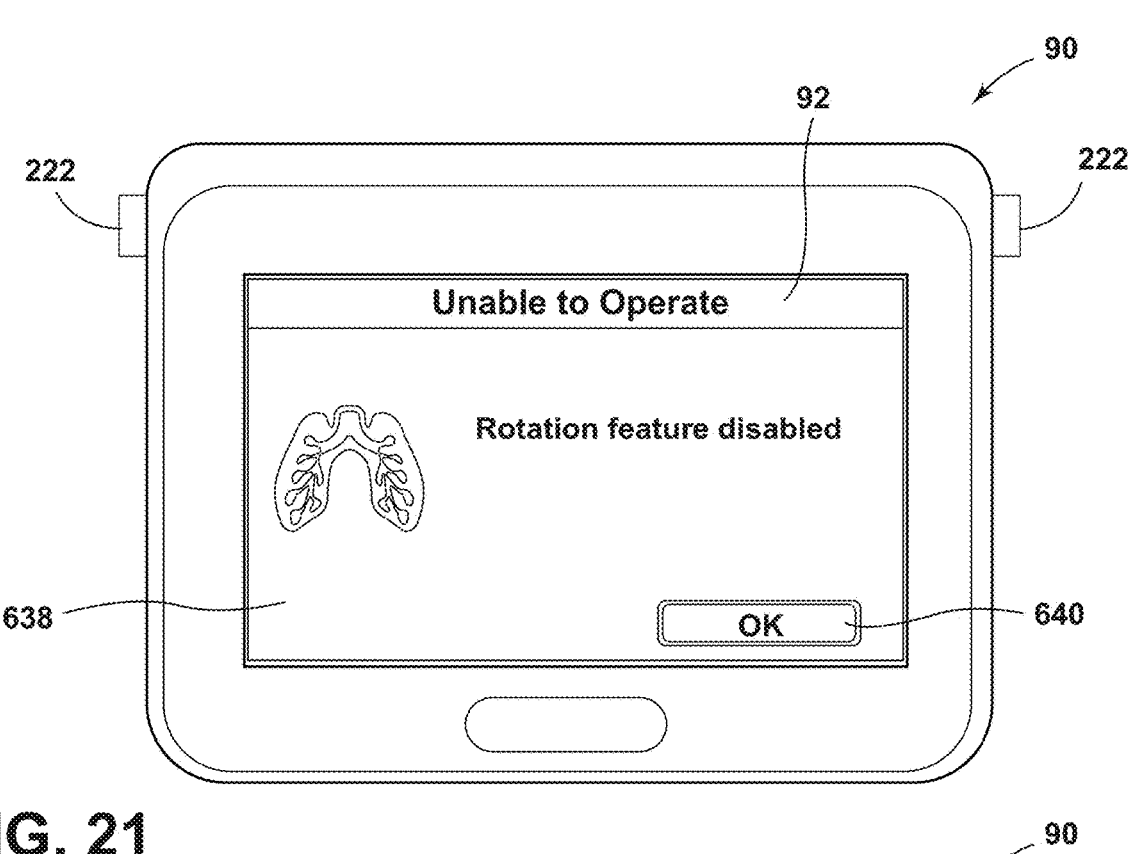
FIG. 21 is illustrative of a function disabled notification screen on a display of a control panel, indicating a rotation function is disabled, according to the present disclosure.

Referring still to FIG. 20, as well as FIG. 21, the CLR function may be available on the support apparatus 10, as indicated by the appearance of the CLR icon 628, but may be in an enabled state or a disabled state. If the CLR function is disabled when the caregiver selects the CLR icon 628, the control unit 22 is configured to generate a function disabled notification screen 638, as illustrated in FIG. 21. The function disabled notification screen 638 is generated by the control unit 22 and displayed on the touchscreen display 92. The function disabled notification screen 638 alerts the caregiver that the CLR function is available but is currently in the disabled state. The caregiver may select the "OK" icon 640, as illustrated in FIG. 20, which may cause the control unit 22 to return to the home screen 620.

Figure 22:
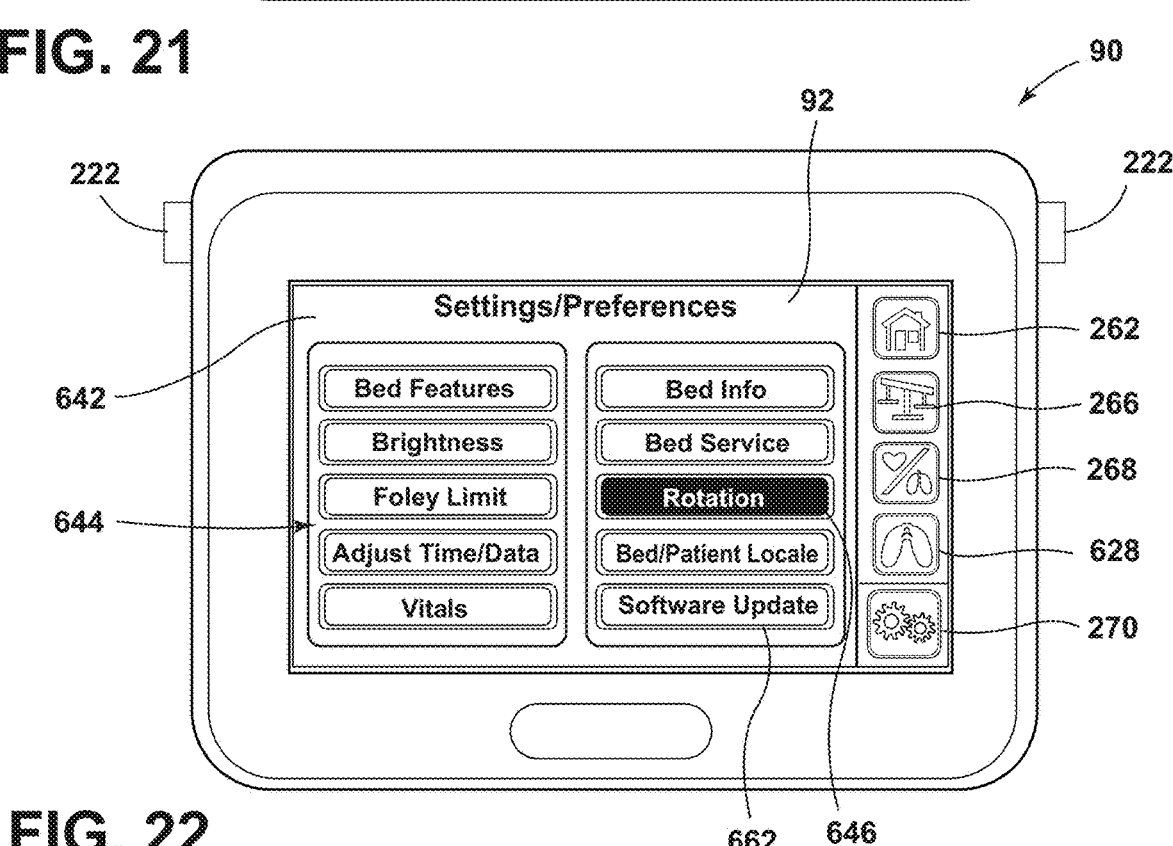
FIG. 22 is illustrative of an apparatus settings screen on a display of a control panel with a rotation icon, according to the present disclosure.

Referring to FIG. 22, in order to enable the CLR function, the caregiver may select the settings icon 270, which may be accessed by selecting the arrow icon 630 on the home screen 620 (FIG. 20). Selecting the settings icon 270 results in the control unit 22 generating and displaying an apparatus settings screen 642. As illustrated in FIG. 22, the apparatus settings screen 642 includes multiple selectable icons 644 for adjusting, controlling, enabling, and activating various features and functions of the support apparatus 10, including the CLR function, which is indicated by a rotation icon 646.

Figures 23, 24:
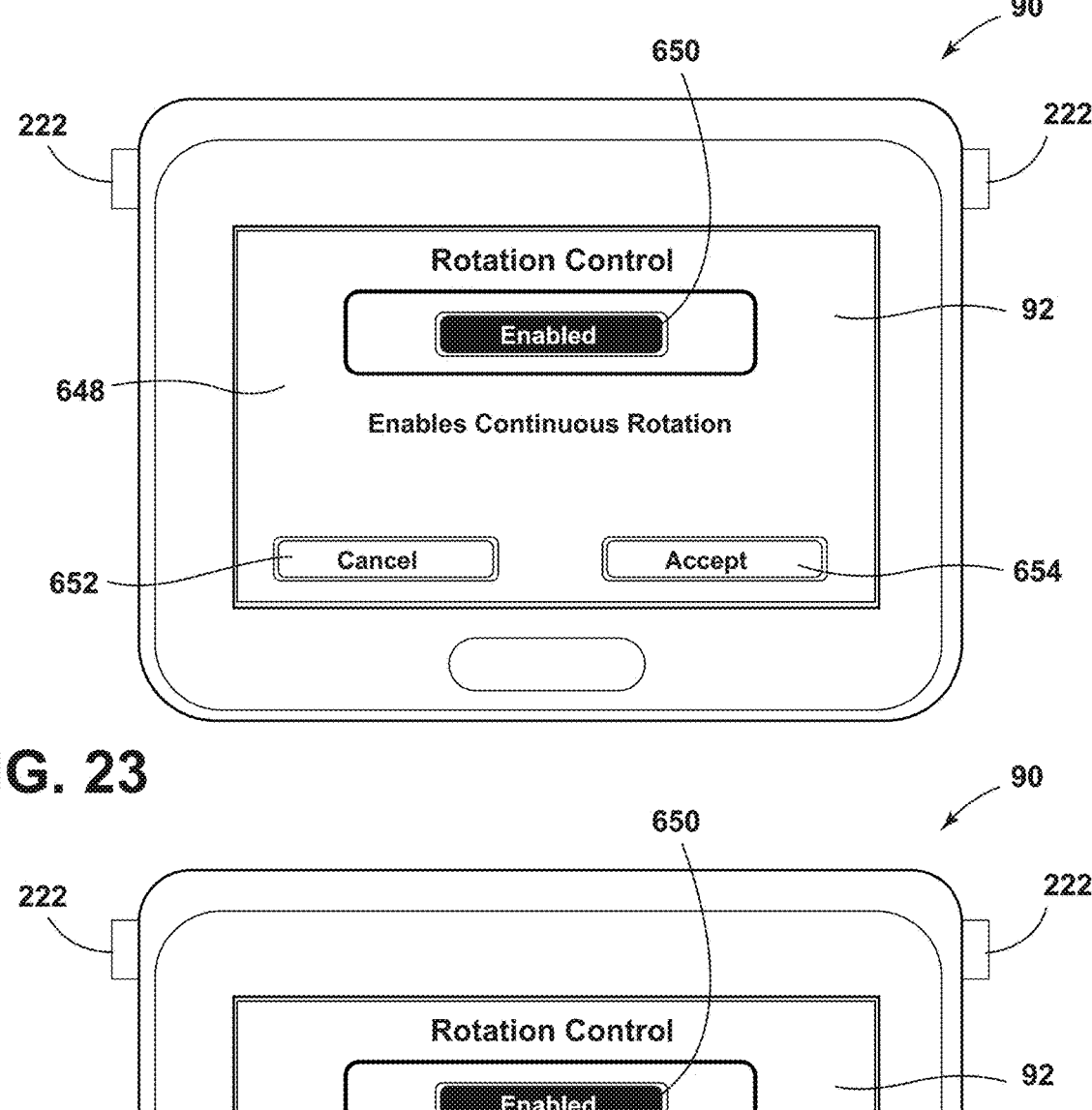
FIG. 23 is illustrative of a confirmation screen on a display of a control panel for providing two-step authorization to enable a rotation function, according to the present disclosure.
FIG. 24 is illustrative of an authorization screen on a display of a control panel for providing a control input and seeking a key code for enabling a rotation function, according to the present disclosure.

Referring still to FIG. 22, as well as FIG. 23, upon selection of the rotation icon 646, the control unit 22 is configured to generate at least one confirmation screen 648, which allows the caregiver to confirm the enablement or disabling of the CLR function. As illustrated in FIG. 23, the confirmation screen 648 may include an enable icon 650. Upon selection of the enable icon 650, the caregiver may then select a cancel icon 652, which maintains the CLR function in the disabled state, and an accept icon 654, which adjusts the CLR function to the enabled state. It is contemplated that the control unit 22 may generate a first confirmation screen 648 with the enable icon 650 and, upon selection of the enable icon 650, may generate a second confirmation screen 648 with the cancel icon 652 and the accept icon 654. Additionally or alternatively, the cancel icon 652 and the accept icon 654 may be on a single confirmation screen 648 with the enable icon 650. In such examples, the cancel icon 652 and the accept icon 654 may be selectable after the selection of the enable icon 650. The selection of the enable icon 650 and the accept icon 654 provides two-step authorization or confirmation to enable the CLR function. Selection of either the cancel icon 652 or the accept icon 654 generally returns the caregiver to the apparatus settings screen 642 (FIG. 21).

Referring still to FIGS. 21-23, a process for disabling the CLR function is generally similar to the process for enabling the CLR function. For example, to fully disable the CLR function, the caregiver navigates through the apparatus settings screen 642 and selects the rotation icon 646. The control unit 22 is configured to generate at least one confirmation screen 648, which includes a disable icon. Upon selection of the disable icon, the caregiver may then select a cancel icon or an accept icon. The selection of the disable icon and the accept icon provides two-step authorization to disable the CLR function. It is contemplated that the control unit 22 may generate a single confirmation screen 648 with the various icons or may generate a first confirmation screen 648 with the disable icon and, upon selection of the disable icon, may generate a second confirmation screen 648 with the cancel icon and the accept icon. It is contemplated that multi-step authorization, utilizing two or more inputs from the caregiver, may be utilized for enabling and/or disabling the CLR function.

Referring to FIG. 24, the control unit 22 may be configured to seek the key code 24 (FIG. 6) to enable, or disable, the CLR function. In such examples, the control unit 22 is configured to generate an authorization screen 660, which informs the caregiver that the key code 24 has been sought and received, as illustrated in FIG. 24. If the key code 24 is not received, the control unit 22 is configured to generate the authorization screen 660 informing the caregiver that the key code 24 was not received and the CLR function remains in the disabled condition. The enablement through the two-step authorization and the key code 24 may be used independently of one another or in combination. For example, the caregiver may override the lack of the key code 24 through another input provided to the control panel 90.

Referring again to FIG. 22, the apparatus settings screen 642 includes a software update icon 662. The software update icon 662 may be utilized to seek or process the software update relating to the CLR function. For example, selecting the software update icon 662 may prompt the control unit 22 to seek communication with the local server 320 and/or the remote server 350 (FIG. 6) to receive the updated software. Additionally or alternatively, the caregiver may couple the authorization device 302 with the connector port 314 (FIG. 6) and select the software update icon 662 to being downloading the software update from the authorization device 302. Additional or alternative software updates may be received by using the software update icon 662 on the control panel 90.

Figure 25:
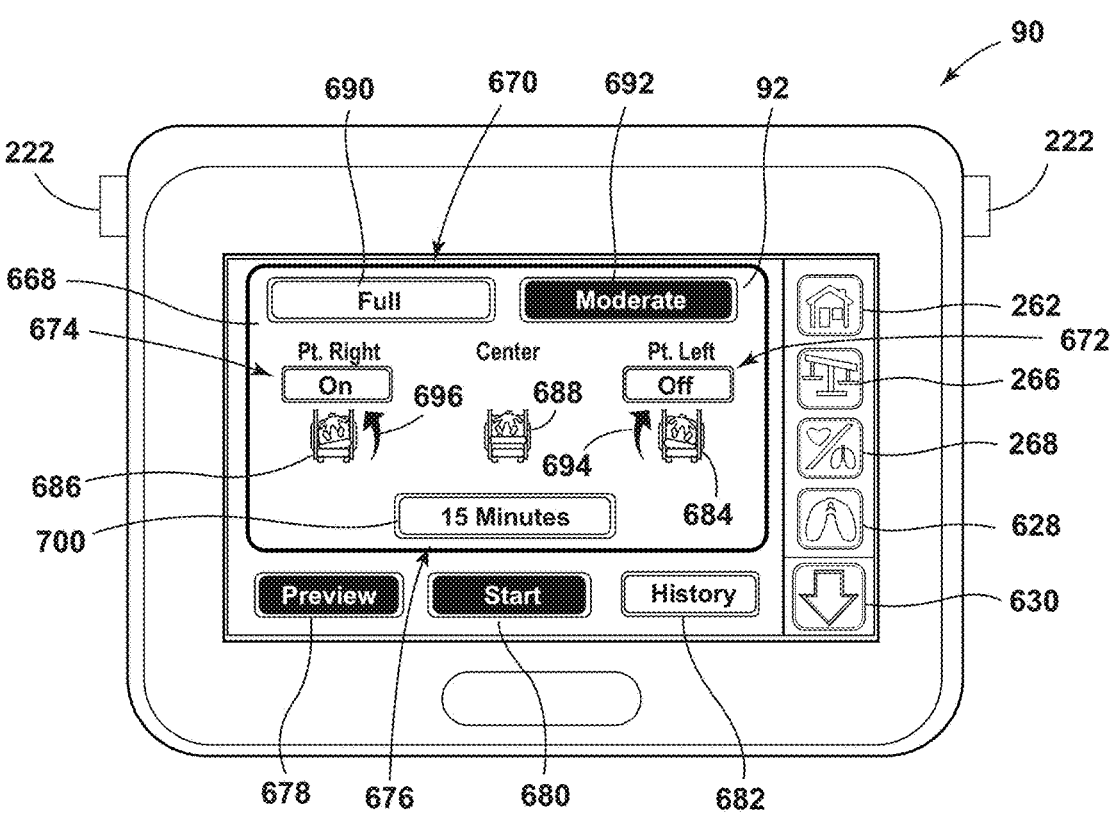
FIG. 25 is illustrative of a rotation settings screen on a display of a control panel for entering and adjusting settings for a rotation function, according to the present disclosure.

Referring to FIG. 25, when the CLR function is enabled and the caregiver selects the CLR icon 628, the control unit 22 is configured to generate and display a rotation settings screen 668. The rotation settings screen 668 is configured to display current rotation settings and receive inputs from the caregiver to adjust the settings of the CLR function. In the example illustrated in FIG. 25, the settings that may be adjusted include a rotation level 670, a left side status 672, a right side status 674, and a hold time 676. The rotation settings screen 668 also includes a preview icon 678, for activating the CLR function in the preview mode, a start icon 680, for activating the CLR function in the active mode, and a history icon 682, for viewing a history of the CLR function. Additionally or alternatively, the rotation settings screen 668 may include a left side graphic 684, a right side graphic 686, a center graphic 688 that illustrate the patient positions for the CLR function.

For the rotation level 670, the caregiver may choose between predefined settings, such as full rotation or moderate rotation by selecting a full icon 690 or a moderate icon 692, respectively. The rotation level 670 is determined by an amount the rotation bladders 176 (FIG. 18) are inflated. For example, when the CLR function is set to provide the full rotation, the rotation bladders 176 may inflate to, for example, about 100% of an inflation capacity. When the CLR function is set to the moderate rotation, the rotation bladders 176 may inflate to, for example, about 60% of the inflation capacity. The exemplary 100% and 60% inflation are not limiting, such that the percentage or amount of inflation may be any practicable values without departing from the teachings herein.

Referring still to FIG. 25, for the right side status 674 and the left side status 672, the caregiver may activate or deactivate the rotation to a certain side. In the illustrated example of FIG. 25, the right side turn is activated while the left side turn is deactivated. In such settings, the patient is configured to rotate between the right side position and the center position without rotating to the left side position. For certain patients or certain functions, it may be advantageous to deactivate one of the side rotations, which then provides the CLR function where the patient rotates between a single side position and the center position.

Further, the rotation settings screen 668 generally includes the left side graphic 684, which is a graphical representation of the left side position, the center graphic 688, which is a graphical representation of the center position, and the right side graphic 686, which is a graphical representation of the right side position. An arrow 694, 696 is positioned proximate to each side graphic 684, 686, respectively. The arrows 694, 696 show the direction of rotation along with the chosen level of rotation. In the example illustrated in FIG. 25, the arrows 694, 696 are fully filled, solid, or colored, indicating full rotation to each side position. If the moderate rotation was selected, the arrows 694, 696 may be partially solid. This provides another indication of the rotation level 670. It is contemplated that when one of the side positions is in the deactivated state, the graphic 684, 686 and/or the arrow 694, 696 may be dimmed, grey in color, or otherwise indicated as deactivated.

Figure 26:
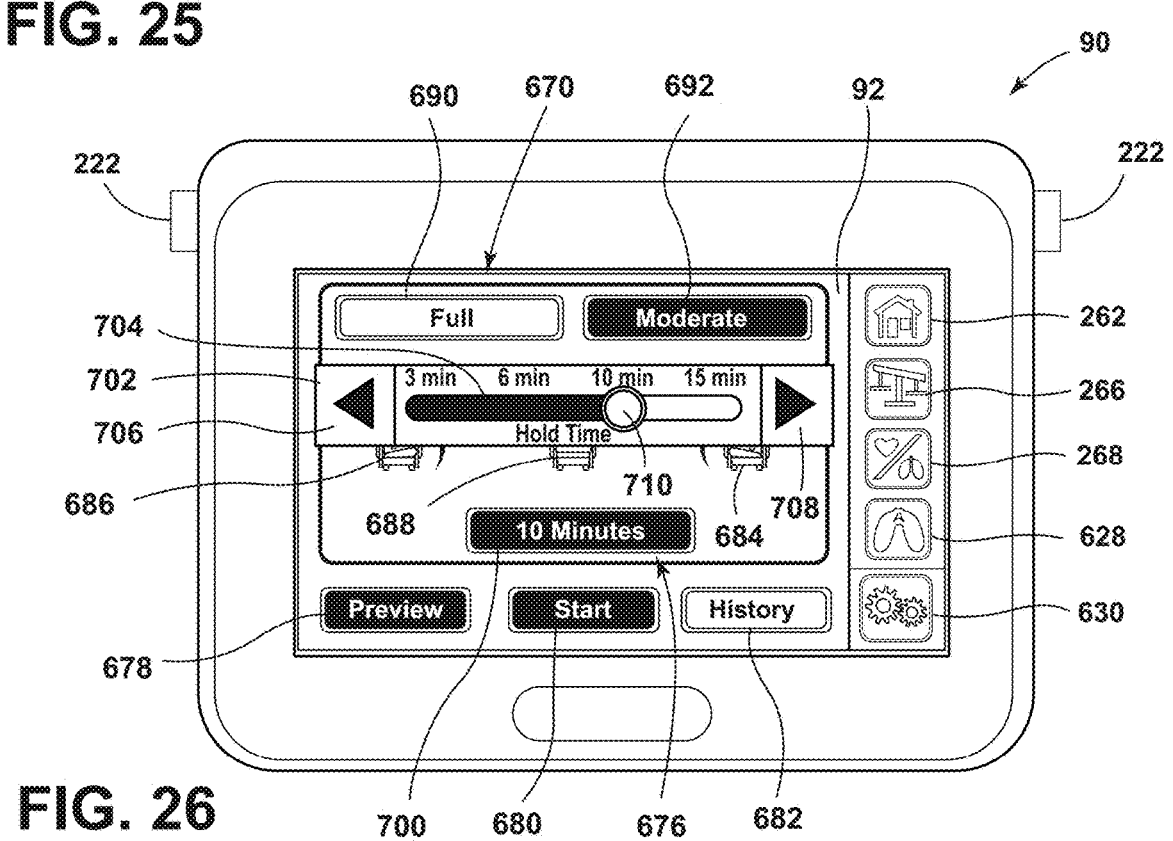
FIG. 26 is illustrative of a timing screen on a display of a control panel for adjusting a hold time of a rotation function, according to the present disclosure.

With reference still to FIG. 25, as well as to FIG. 26, the rotation settings screen 668 also includes a hold time icon 700, which displays the currently selected hold time 676 for the CLR function. The hold time 676 is the period of time that the patient is held or maintained in each activated patient position. In the illustrated example, the hold time 676 is 15 minutes. Upon selection of the hold time icon 700, the control unit 22 is configured to generate a timing screen 702, which allows the caregiver to adjust the hold time 676. The timing screen 702 may be overlaid on the rotation settings screen 668 or may be a separate screen. The timing screen 702 includes a timing bar 704 having predefined timing intervals. As illustrated in the example of FIG. 26, the predefined timing intervals on the timing bar 704 include three minutes, six minutes, 10 minutes, and 15 minutes.

To adjust the hold time 676, the caregiver may select a left arrow 706 or right arrow 708 to adjust a slider 710 along the timing bar 704 between the various predefined intervals. Additionally or alternatively, the slider 710 may be a touch-sensitive feature on the touchscreen display 92. In such examples, the caregiver may select the slider 710 and move or slide the slider 710 along the timing bar 704 to the selected time interval. The timing screen 702 may be enlarged compared to traditional designs, which may be advantageous for allowing caregivers wearing personal protection equipment (PPE), such as gloves, to more conveniently adjust the hold time 676 via the touchscreen display 92 while wearing the PPE. The caregiver may touch a location on the touchscreen display 92 away from the timing screen 702 to confirm the selected hold time 676 or may select a confirm or back button to return to the rotation settings screen 668.

Referring again to FIG. 25, once the rotation settings have been selected, the caregiver may select the preview icon 678 to activate the CLR function in the preview mode. The preview mode provides a shortened cycle of the selected settings of the CLR function, allowing the caregiver to efficiently confirm the selected settings. Additionally, the preview mode may be advantageous for allowing the caregiver to confirm the position of the patient, as well as tubes and lines extending to the patient during the CLR function.

Figures 27, 28:
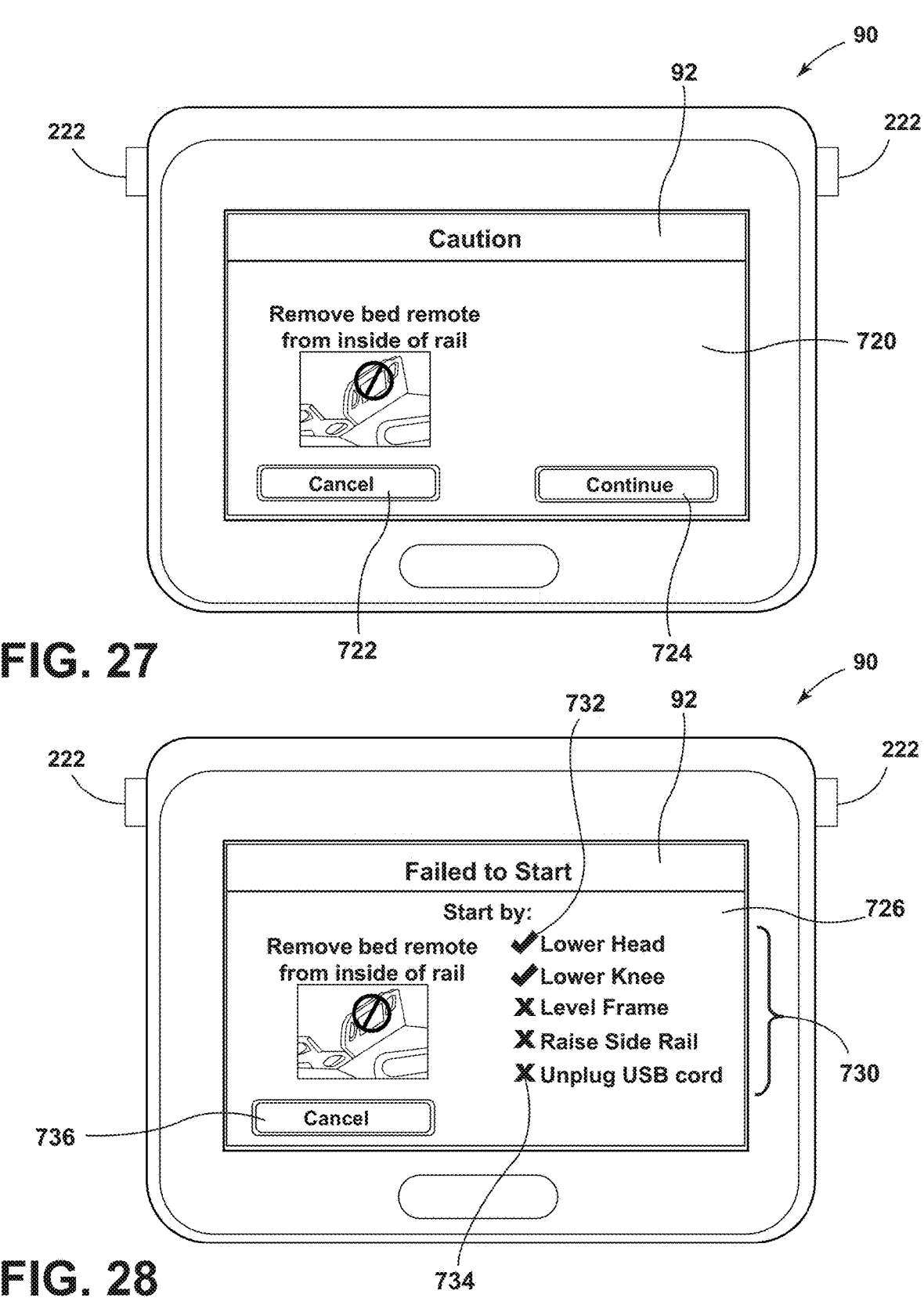
FIG. 27 is illustrative of a caution screen on a display of a control panel, according to the present disclosure.
FIG. 28 is illustrative of a start failure screen on a display of a control panel for indicating which predefined conditions are currently satisfied for a rotation function, according to the present disclosure.

Referring still to FIG. 25, as well as to FIG. 27, upon selection of the preview icon 678, the control unit 22 is configured to generate a caution screen 720 to prompt the caregiver to confirm select conditions are satisfied prior to the activation of the preview mode. Generally, the caution screen 720 indicates conditions that are not sensed or determined by the control unit 22. For example, as illustrated in FIG. 27, the caution screen 720 includes an alert for confirming a bed remote or the pendant 146 (FIG. 2) has been removed from the inside of the siderail 62.

Generally, the bed remote or the pendant 146 may be coupled to one of the siderails 62 for convenient access by the patient on the support apparatus 10. The bed remote or pendant 146 is typically selectively hooked or coupled onto the siderail 62 in a manner that is not sensed by the control unit 22. Accordingly, the control unit 22 may not be able to determine whether the bed remote or the pendant 146 is hooked on the siderail 62 so the caution screen 720 prompts the caregiver to confirm. When hooked on the siderail 62, the pendant 146 or bed remote may be within the movement path of the mattress 14 during the CLR function, which can cause the bed remote or pendant 146 to hinder the CLR function or to be accidentally disengaged from the siderail 62. The caregiver may select a cancel icon 722 to return to the rotation settings screen 668 or a continue icon 724 to proceed with the preview mode.

Figures 29, 30:
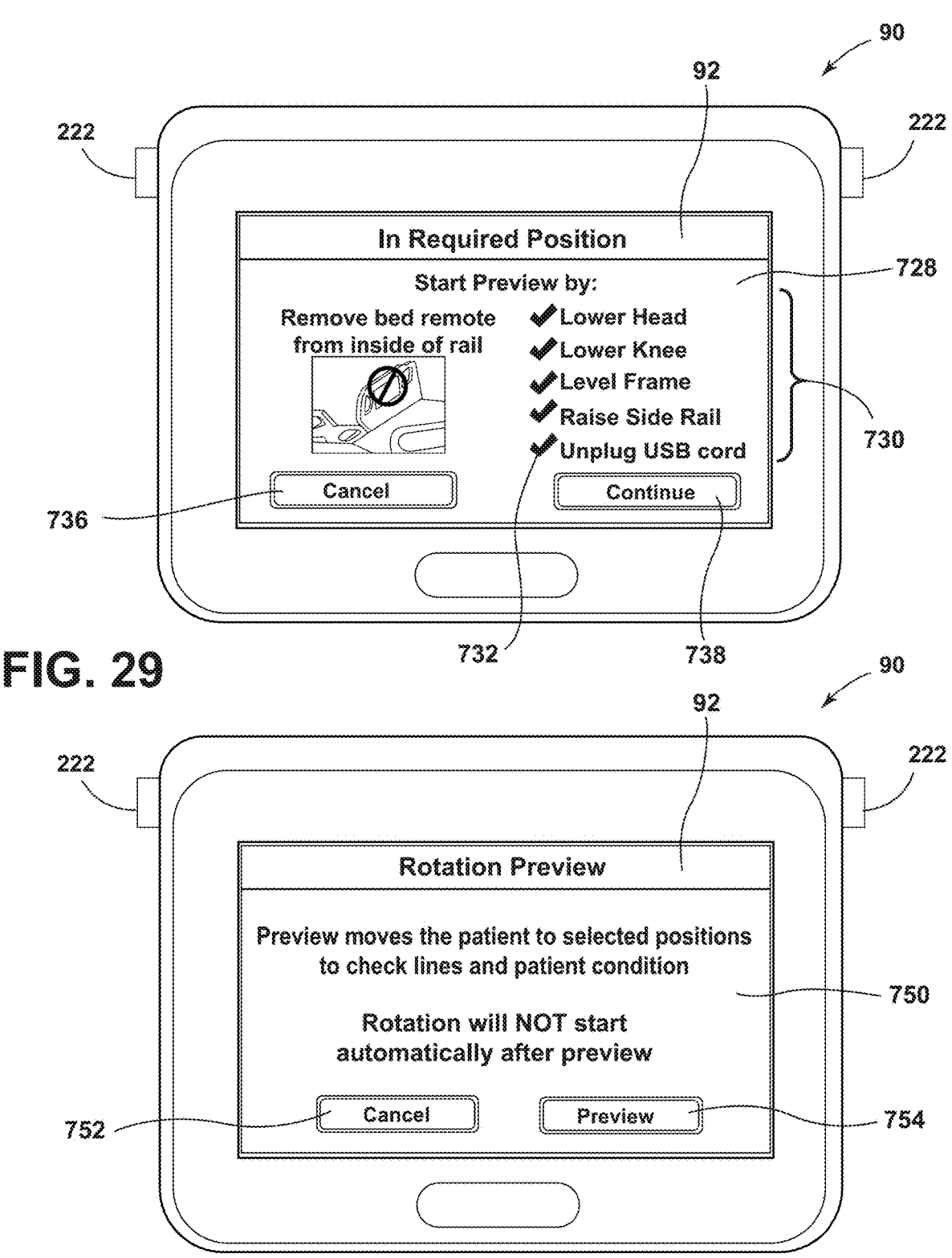
FIG. 29 is illustrative of a start confirmation screen on a display of a control panel indicating that each predefined condition is satisfied for activation of a rotation function, according to the present disclosure.
FIG. 30 is illustrative of a preview notification on a display of a control panel that notifies a caregiver about a preview mode for a rotation function, according to the present disclosure.

Referring to FIGS. 28 and 29, after navigating through the caution screen 720 in FIG. 27 and selecting the continue icon 724, the control unit 22 is configured to generate at least one of a start failure screen 726, as illustrated in FIG. 28, and a start confirmation screen 728, as illustrated in FIG. 29. The control unit 22 is configured to utilize sensed information from the sensor assembly 604 and from the connector port 314 to determine whether the predefined conditions are satisfied. A conditions list 730 is included on both the start failure screen 726 and the start confirmation screen 728. In the illustrated example of FIGS. 28 and 29, the predefined conditions on the conditions list 730 to be satisfied prior to activation of the CLR function include the head end being lowered, the knee being lowered, which may also encompass the foot end 210 being raised, the upper frame 44 being level, the siderails 62 being raised, and the device being disengaged from the connector port 314.

The control unit 22 is configured to generate the start failure screen 726 when at least one of the predefined conditions is not satisfied. In the example illustrated in FIG. 28, the lowered head and the lowered knee conditions are satisfied, as indicated by the checkmark indicators 732. In comparison, the level upper frame 44, the raised siderails 62, and the disengaged device conditions are not satisfied, as indicated by the "X"-indicators 734. When at least one of the predefined conditions is not satisfied, there is generally no option to continue with the preview mode. The caregiver may select a cancel icon 736, which returns the caregiver to the apparatus settings screen 642 (FIG. 22) to allow the caregiver to adjust aspects of the support apparatus 10 to satisfy the predefined conditions.

Referring again to FIG. 29, after selection of the continue icon 724 in the caution screen (FIG. 27) or adjusting the settings after viewing the start failure screen 726, the control unit 22 is configured to generate the start confirmation screen 728. The start confirmation screen 728 is generated when each of the predefined conditions is satisfied. The start confirmation screen 728 shows the conditions list 730 with each of the predefined conditions with the checkmark indicator 732, indicating that each condition is satisfied. Additionally, the start confirmation screen 728 includes a continue icon 738, which the caregiver may select to proceed to the preview mode.

With reference to FIG. 30, the control unit 22 is configured to generate a preview notification 750, which notifies the caregiver about the function of the preview mode. The preview notification 750 may reduce human error in starting the preview mode rather than the active mode of the CLR function. The preview notification 750 generally indicates that the preview mode it utilized for confirmation of the settings for the CLR function and is not the active mode of the CLR function. The caregiver may select a cancel icon 752 to return to the rotation settings screen 668 (FIG. 25) or may select a preview icon 754 to continue toward activating the preview mode of the CLR function.

Figures 31, 32:
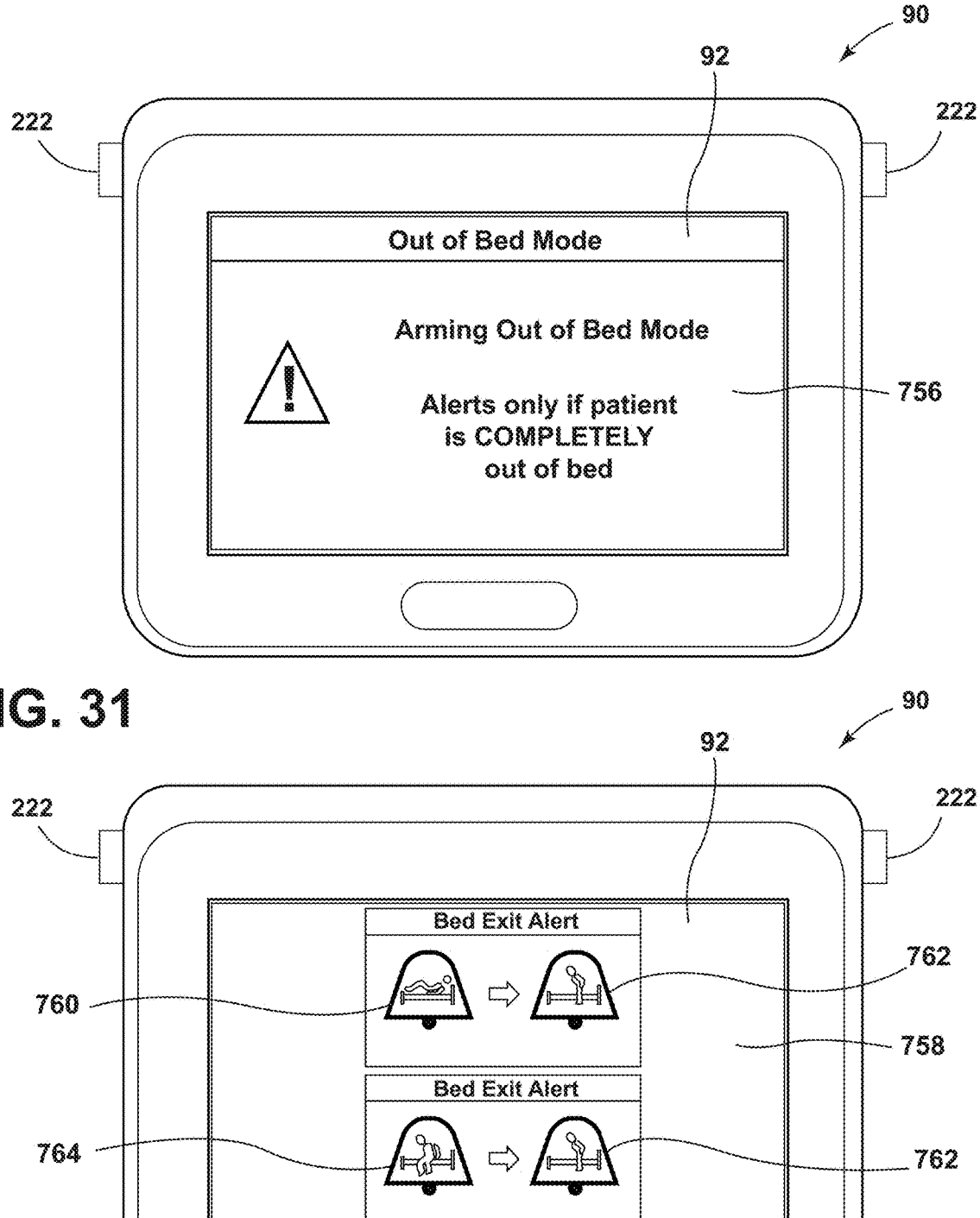
FIG. 31 is illustrative of an exit activation screen on a display of a control panel, indicating activation of a bed exit feature, according to the present disclosure.
FIG. 32 is illustrative of an exit adjustment screen on a display of a control panel, indicating adjustment to a lowest sensitivity level for a bed exit feature, according to the present disclosure.
Figures 33, 34:
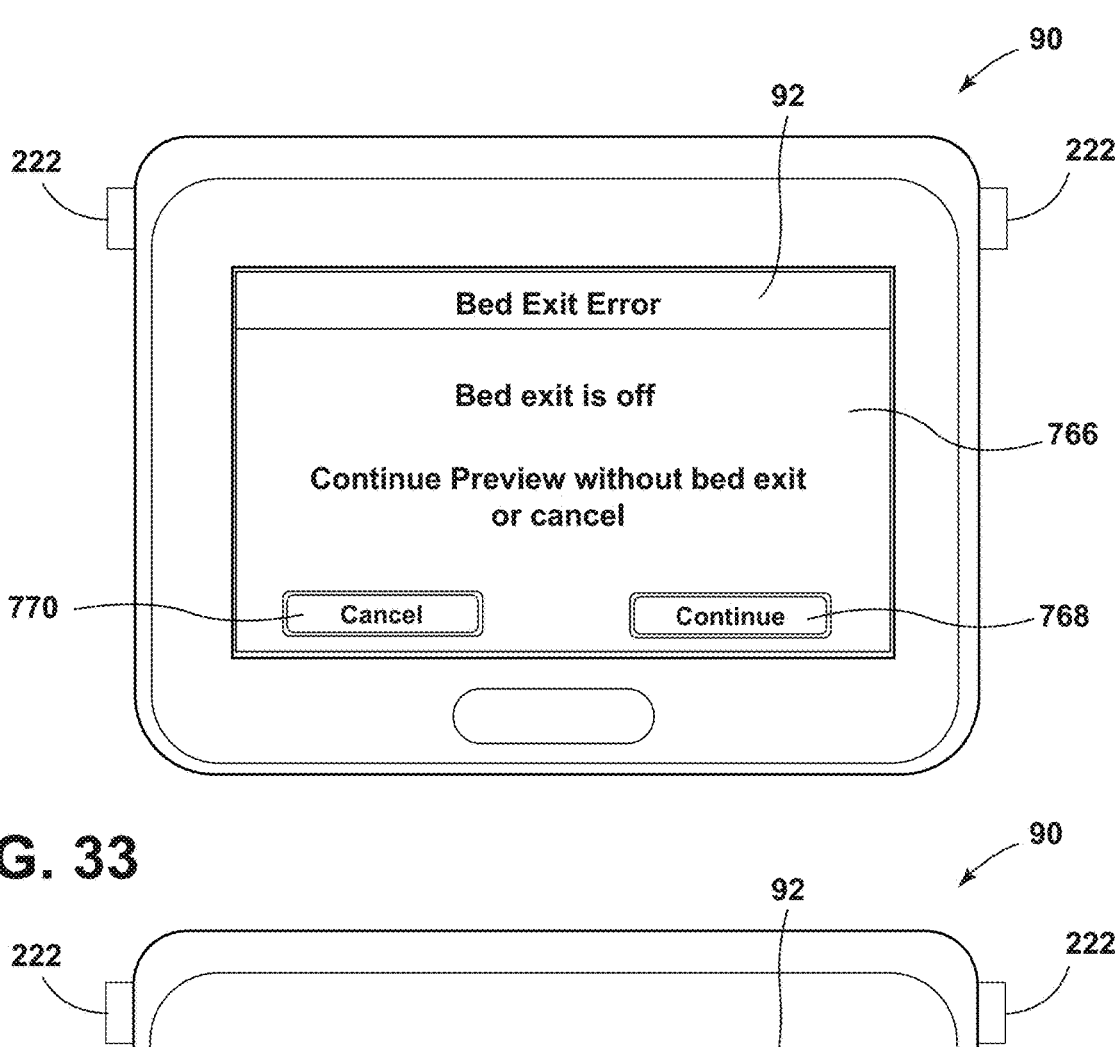
FIG. 33 is illustrative of an exit error alert on a display of a control panel, indicating a bed exit feature is deactivated, according to the present disclosure.
FIG. 34 is illustrative of an exit settings screen on a display of a control panel for selecting a sensitivity level of a bed exit feature, according to the present disclosure.

With reference to FIGS. 31-33, the control unit 22 may be configured to prompt the caregiver about various actions related to the bed exit feature 106. The status and sensitivity level of the bed exit feature 106 may be adjusted prior to activation of the CLR function. If the bed exit feature 106 is enabled but not currently active, the control unit 22 is configured to generate an exit activation screen 756, as illustrated in FIG. 31. The exit activation screen 756 is configured to notify the caregiver that an out-of-bed or bed exit mode of the bed exit feature 106 for the support apparatus 10 is being activated. The exit activation screen 756 also notifies the caregiver of the sensitivity level of the bed exit feature 106, which is the lowest sensitivity (e.g., configured to generate the alert when the patient exits the support apparatus 10).

If the bed exit feature 106 is activated at the highest or middle sensitivity level, the control unit 22 is configured to generate an exit adjustment screen 758, as illustrated in FIG. 32. The exit adjustment screen 758 illustrates the change in sensitivity level to the lowest sensitivity level. The exit adjustment screen 758 may display a high sensitivity graphic 760 and an arrow pointing to a low sensitivity graphic 762. Additionally or alternatively, the exit adjustment screen 758 may display a middle sensitivity graphic 764 and an arrow pointing to the low sensitivity graphic 762. It is contemplated that the exit adjustment screen 758 may display both adjustment indications (high-to-low and mid-to-low) or a single adjustment indication based on the actual adjustment of the support apparatus 10.

If the bed exit feature 106 is not enabled, the control unit 22 may generate an exit error alert 766, as illustrated in FIG. 33. The exit error alert 766 is configured to notify the caregiver that the bed exit mode is deactivated and will not provide any alerts, even if the patient exits the support apparatus 10. The caregiver may select a continue icon 768, to proceed without activation of the bed exit mode, or a cancel icon 770, which allows the caregiver to activate the bed exit feature 106. If the exit error alert 766 remains displayed on the control panel 90, the control unit 22 may be configured to generate an alert to prompt action by the caregiver. In non-limiting examples, the control panel 90 may include a speaker which emits an audible alert at predefined intervals until the caregiver selects the cancel icon 770 or the continue icon 768. The audible alerts may increase in volume at each interval. Additional or alternative audible, visual, or haptic alerts may also be utilized.

With reference to FIG. 34, if the caregiver selects the cancel icon 770 in the exit error alert 766 of FIG. 33, the control unit 22 is configured to generate and display a bed exit settings screen 780. The bed exit settings screen 780 includes options for setting the sensitivity level of the bed exit feature 106. In the example illustrated in FIG. 34, the options include a high sensitivity icon 782, a middle sensitivity icon 784, a low sensitivity icon 786, and an off icon 788. When utilizing the CLR function, the high sensitivity icon 782 and the middle sensitivity icon 784 may be dimmed, grey, or otherwise indicated as deactivated such that these sensitivity levels may not be selected by the caregiver. After activating the bed exit feature 106, the caregiver may navigate through the various screens displayed on the control panel 90 toward the preview mode.

Figures 35, 36:
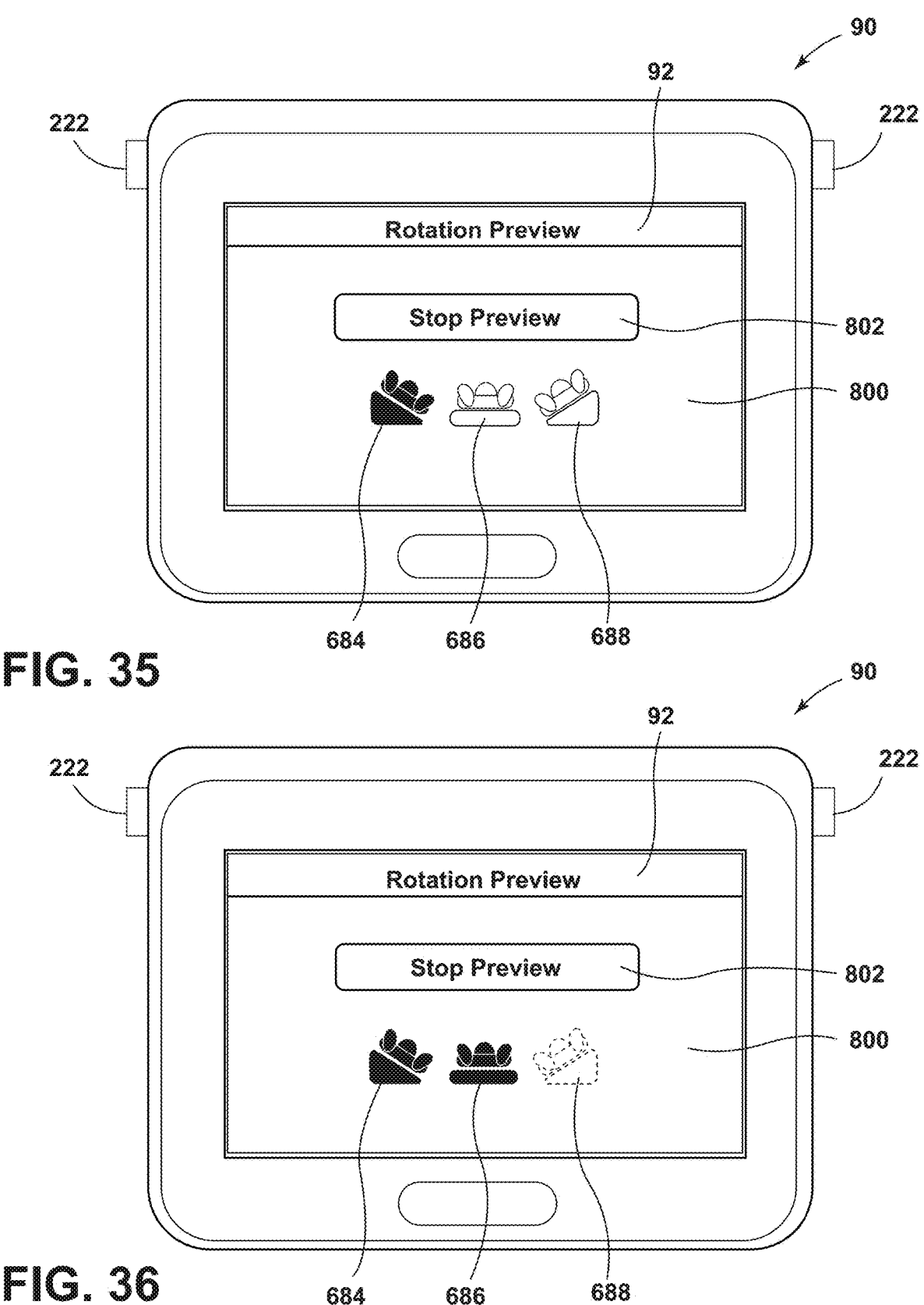
FIG. 35 is illustrative of a preview screen on a display of a control panel, illustrating a current patient position during a preview mode of a rotation function, according to the present disclosure.
FIG. 36 is illustrative of a preview screen on a display of a control panel, illustrating a current patient position, a past patient position, and a deactivated patient position for a preview mode of a control function, according to the present disclosure.

Referring to FIG. 35, after activating the bed exit feature 106 or continuing without activating the bed exit feature 106, the control unit 22 is configured to activate the pneumatic system 130 in the preview mode for the CLR function. In the preview mode, the pneumatic system 130 is adjusted through one cycle of the CLR function. One cycle for the preview mode generally adjusts the patient to the right side position, to the center position, and to the right side position. This allows the caregiver to view the patient in each of the three patient positions for the CLR function. Further, in the preview mode, the CLR function does not follow the hold time 676 in any of the patient positions. In this way, the patient is moved continually through the three patient positions. This provides a faster time to cycle through the three patient positions, which may be advantageous for allowing the caregiver to check or confirm the position of the patient, the position of any tubes or lines extending to the patient, and any adjustments for the tubes and lines to prevent pulling, disengagement, etc. during rotation.

While the pneumatic system 130 is operating in the preview mode for the CLR function, the control unit 22 is configured to generate a preview screen 800 including a stop preview icon 802 and the three position graphics 684, 686, 688. The position graphics 684, 686, 688 illustrate a left side, a center, and a right side, which correspond with the left side position, the center position, and the right side position of the patient. The control unit 22 is configured to show a rotation status by distinguishing or differentiating the graphic for the current position of the patient. As illustrated in FIG. 35, the left side graphic 684 is highlighted to indicate to the caregiver that the patient is currently in the left side position. The preview screen 800 is configured to update concurrently with the adjustment of the pneumatic system 130.

Referring still to FIG. 35, as well as to FIG. 36, as the CLR function in the preview mode adjusts the pneumatic system 130 through the single cycle of patient positions, the preview screen 800 is configured to show the rotation status by distinguishing or differentiating past positions of the patient as well as the current position. As best illustrated in FIG. 36, the patient has been rotated to the left side position and the center position, which is indicated by the differentiation or distinguishing of the left side graphic 684 and the center graphic 688. The preview screen 800 is configured to update concurrently with the adjustment of the pneumatic system 130 to the different patient positions.

In certain aspects, one of the side positions may be deactivated such that the patient does not rotate to that side position. In the example illustrated in FIG. 36, the right side position is deactivated. In the preview screen 800, the right side graphic 686 is dimmed, grey, or otherwise indicated as deactivated to illustrate that the patient is not going to be rotated to the right side position. The preview screen 800 displayed on the control panel 90 is configured to mirror the actions being conducted by the pneumatic system 130 for the CLR function in the preview mode.

The preview mode does not include the hold times 676 but includes continuous motion between the selected positions. This shortened cycle may be advantageous for the caregiver to confirm the position of the patient, as well as any attachments to the patient. For example, the patient may have various lines or tubing that extend from a device to the body of the patient. The rotation of the patient during the CLR function may adjust the lines or tubing to bend, kink, pull, or otherwise affect the treatment or comfort of the patient. The preview mode allows the caregiver to monitor the lines and tubing of the patient and adjust any lines or tubing that may be affected by the CLR function prior to the CLR function being adjusted to the active mode.

The stop preview icon 802 may be selected to fully stop the preview or pause the preview. Stopping and restarting the preview mode may be advantageous for the caregiver to adjust the patient, tubing, lines, or devices. Accordingly, the caregiver may repeatedly stop and start the preview mode or repeat the preview mode until the caregiver is satisfied with the settings.

Figures 37, 38:
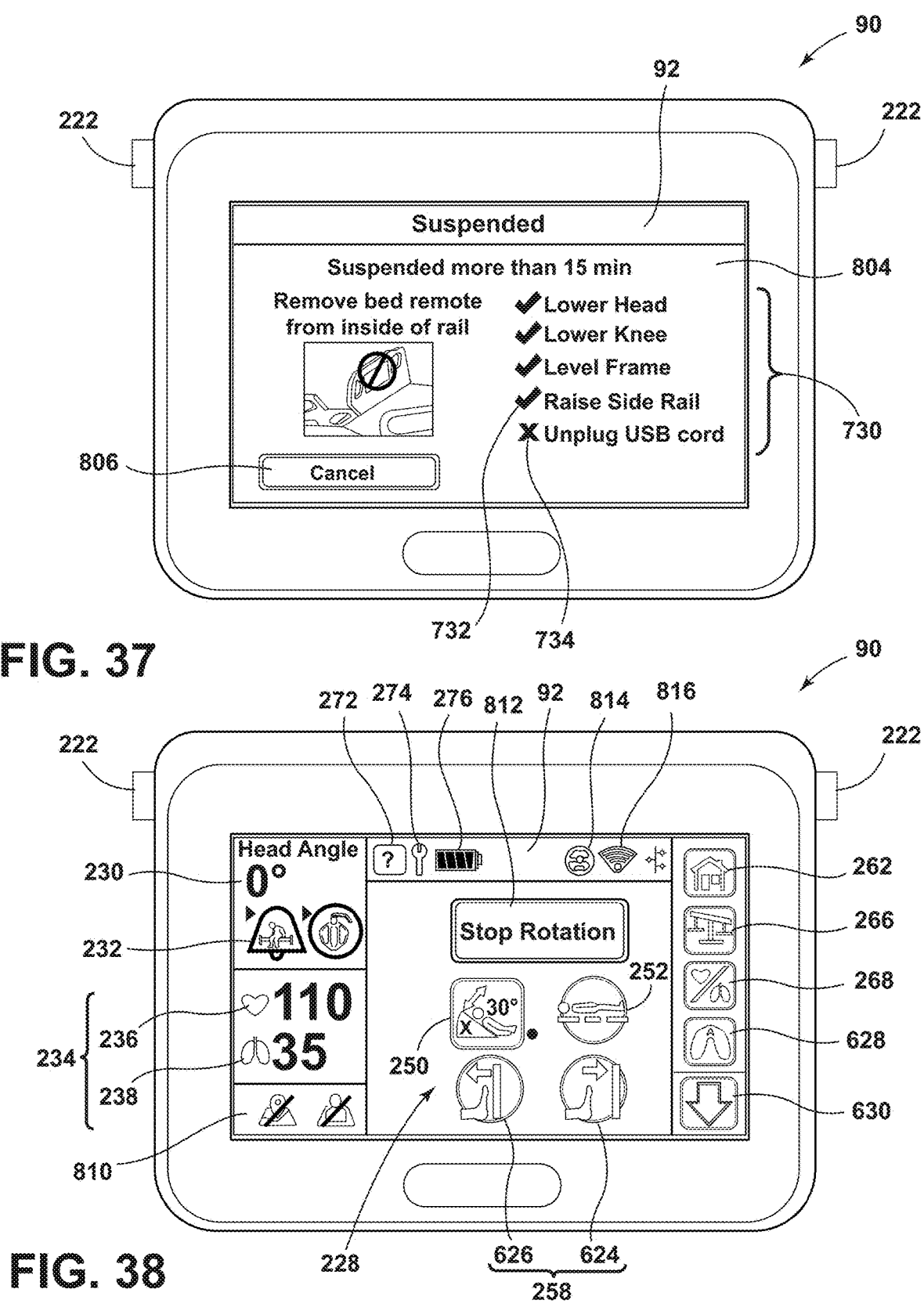
FIG. 37 is illustrative of a suspension screen on a display of a control panel indicating which predefined conditions are satisfied and which aspects may be adjusted to continue a rotation function, according to the present disclosure.
FIG. 38 is illustrative of an updated home screen on a display of a control panel configured to be displayed when a rotation function is active, according to the present disclosure.

As illustrated in FIG. 37, during the preview mode of the CLR function, if the support apparatus 10 is adjusted such that at least one of the predefined conditions is no longer satisfied, the control unit 22 is configured to pause or suspend the preview mode. In this way, the pneumatic system 130 is at least temporarily deactivated to stop the CLR function. Additionally, the control unit 22 is configured to generate and display a suspension screen 804 on the control panel 90. The suspension screen 804 indicates which of the predefined conditions are no longer satisfied.

For example, the suspension screen 804 generally includes the conditions list 730 with the checkmark indicators 732 and the "X"-indicators 734. The suspension of the CLR function may last for a predefined period of time, which is 15 minutes in the example illustrated in FIG. 37. After the predefined period of time has elapsed, the control unit 22 is configured to generate an alert to remind the caregiver the preview mode of the CLR function has been suspended and to prompt action by the caregiver. The alert may be an audible alert at intervals that increases in volume over time or any other audible, haptic, or visual alert. The caregiver may select a cancel icon 806 to return to the apparatus settings screen 642 to adjust aspects of the support apparatus 10 to again satisfy the predefined conditions.

Returning to FIG. 25, upon completion or cancellation of the preview mode, the control unit 22 is configured to return to the rotation settings screen 668. The caregiver may make any adjustments and may again proceed through the various screens to confirm the settings with the preview mode. Once the caregiver is satisfied with the CLR function and settings, the caregiver may then select the start icon 680, which is configured to adjust the pneumatic system 130 into the active mode to provide the CLR function for a predefined period of time.

The predefined period of time for the CLR function in the active mode may be any practicable amount of time based on the treatment or care of the patient. The caregiver may select this period of time in the rotation settings screen 668 or through the apparatus settings screen 642 (FIG. 22). The time for the CLR function to remain active may be measured in minutes or hours, for up to about 24 hours.

After selecting the start icon 680, the control unit 22 may be configured to generate various screens to caution, notify, or alert the caregiver of a variety of information, similar to those described with reference to FIGS. 27-29 and FIGS. 31-33. The control unit 22 may caution the caregiver to confirm certain predefined conditions are satisfied that the control unit 22 is unable to confirm (similar to FIG. 27), indicate which predefined conditions are not satisfied (similar to FIG. 28), and indicate that the predefined conditions are all satisfied (similar to FIG. 29). Additionally, the control unit 22 may adjust the bed exit feature 106 to an activated state (similar to FIG. 30), adjust the sensitivity level of the bed exit feature 106 (similar to FIGS. 31 and 32), and prompt confirmation to proceed without the bed exit feature 106 (similar to FIG. 33). While making these adjustments, the control unit 22 is configured to adjust aspects of the support apparatus 10 and notify the caregiver through the touchscreen display 92 of the control panel 90.

Further, the control unit 22 may be configured to seek the key code 24 (FIG. 6) to adjust the CLR function of the pneumatic system 130 to the active mode. In such examples, the control unit 22 is configured to generate the authorization screen 660 (similar to FIG. 24), which informs the caregiver that the key code 24 has been sought and received. If the key code 24 is not received, the control unit 22 is configured to generate the authorization screen 660 informing the caregiver that the key code 24 was not received and the CLR function will not start. The activation through multiple selections on the touchscreen display 92 and the key code 24 may be used independently of one another or in combination. For example, the caregiver may override the lack of key code 24 through another input provided to the control panel 90.

Referring to FIG. 38, once the CLR function is in the active mode, the control unit 22 may generate and display an updated home screen 810. The updated home screen 810 is configured to include a stop rotation icon 812. The selectable icons 228 on the updated home screen 810 are shifted to accommodate the stop rotation icon 812 in a prominent location on the touchscreen display 92. This allows the caregiver to quickly and efficiently stop the CLR function directly from the updated home screen 810 without navigating through multiple secondary or subsequent screens. Further, the updated home screen 810 includes an active CLR graphic 814 proximate to a connectivity graphic 816. The active CLR graphic 814, also referred to as the active status graphic 814 for the CLR function, provides an additional indication to the caregiver that the CLR function is enabled and currently rotating the patient in the active mode (e.g., in progress).

Figures 39, 40:
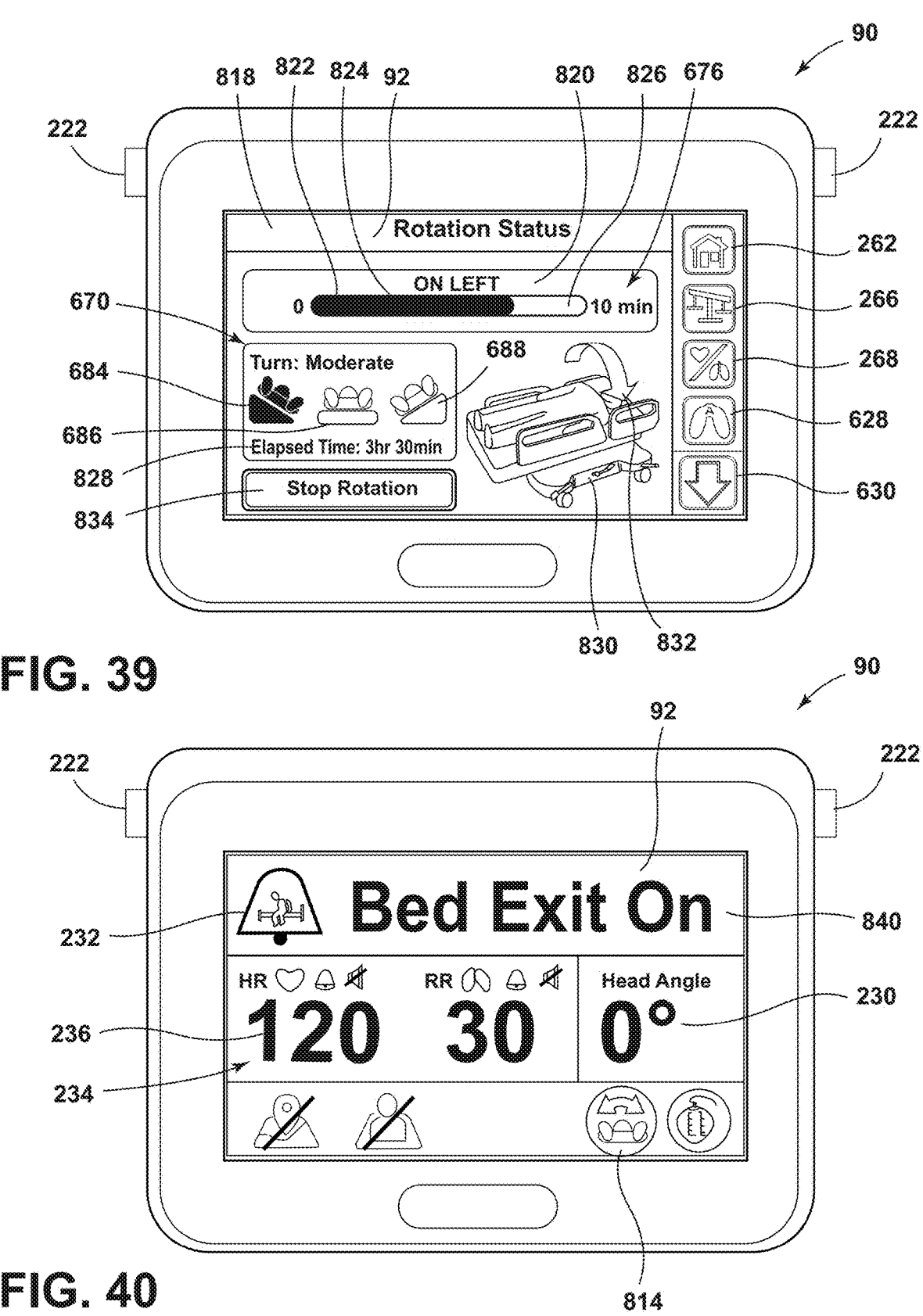
FIG. 39 is illustrative of a rotation status screen on a display of a control panel, illustrating a current status of an active rotation function, according to the present disclosure.
FIG. 40 is illustrative of a sleep screen on a display of a control panel when a rotation function is active, according to the present disclosure.

Referring still to FIG. 38, as well to FIG. 39, the caregiver can select the CLR icon 628 on the updated home screen 810 to view status information about the CLR function. The control unit 22 is configured to generate and display a rotation status screen 818 in response to the selection of the CLR icon 628 when the CLR function is active. Information on the rotation status screen 818 may include a current position indication 820 and a status bar 822, which indicates elapsed time 824 and remaining time 826 in the current patient position, as well as the hold time 676. For example, the current position indication 820 shows the patient in the left side position, and the status bar 822 illustrates that the patient has been in the left side position for over half (e.g., about seven minutes) of the hold time 676, which is 10 minutes. It is contemplated that the status bar 822 may also include intervals to further note the elapsed time 824 and remaining time 826.

The rotation status screen 818 also shows the rotation level 670 for the active CLR function, which is indicated as moderate rotation in the illustrated example of FIG. 39. The rotation status screen 818 also includes the position graphics 684, 686, 688, with one graphic 684 differentiated or distinguished. In the example of FIG. 39, the left side graphic 684 is differentiated to indicate that the patient is currently in the left side position. The arrangement of the position graphics 684, 686, 688 also indicates the next position for the patient. As the cycle between the patient positions is continuous in the active mode, generally a single graphic is differentiated at a single time, which is different from the preview mode (as illustrated in FIG. 35). The rotation status screen 818 is configured to be updated concurrently with the adjustment of the pneumatic system 130 between the patient positions. If one of the positions is deactivated, the corresponding graphic on the rotation status screen 818 may be dimmed, grey, or otherwise indicated as deactivated, similar to the preview screen 800 (as illustrated in FIG. 36). The rotation status screen 818 also indicates an elapsed time 828 since the CLR function was adjusted to the active mode and may also include time remaining for the active mode of the CLR function. The elapsed time 828 is generally based on a 24-hour cycle starting at midnight.

Further, a patient position graphic 830 is also included on the rotation status screen 818. The patient position graphic 830 is illustrative of a patient in one of the three positions for the CLR function on the support apparatus 10 with an arrow 832 indicating a rotation direction. In the example illustrated in FIG. 39, the patient position graphic 830 illustrates the patient rotated to the left side position with the arrow 832 pointing to the left side of the patient.

The rotation status screen 818 further includes a stop rotation icon 834, which allows the caregiver to stop the CLR function. Accordingly, there are multiple screens displayed on the control panel 90 that provide the option for the caregiver to stop the CLR function. Upon activation of the CLR function and/or selection of the CLR icon 628, the rotation status screen 818 may be generated and displayed for a predefined period of time. The predefined period of time may be several minutes, such as, for example, a time up to about two minutes. After the predefined period of time has elapsed, the control unit 22 may automatically display the updated home screen 810 (as illustrated in FIG. 38).

Referring now to FIG. 40, after a predefined period of inactivity on the control panel 90 (e.g., free of receiving inputs), the control unit 22 may adjust the touchscreen display 92 to a sleep screen 840, which is configured to conserve energy. The sleep screen 840 may include a variety of information helpful to the caregiver, including information about the patient, such as the head angle measurement 230, the heart rate 236, and the respiration rate 238, and active functions, such as the bed exit icon 264 and the CLR icon 628. The sleep screen 840 compiles information for quick review by the caregiver.

Figures 41, 42:
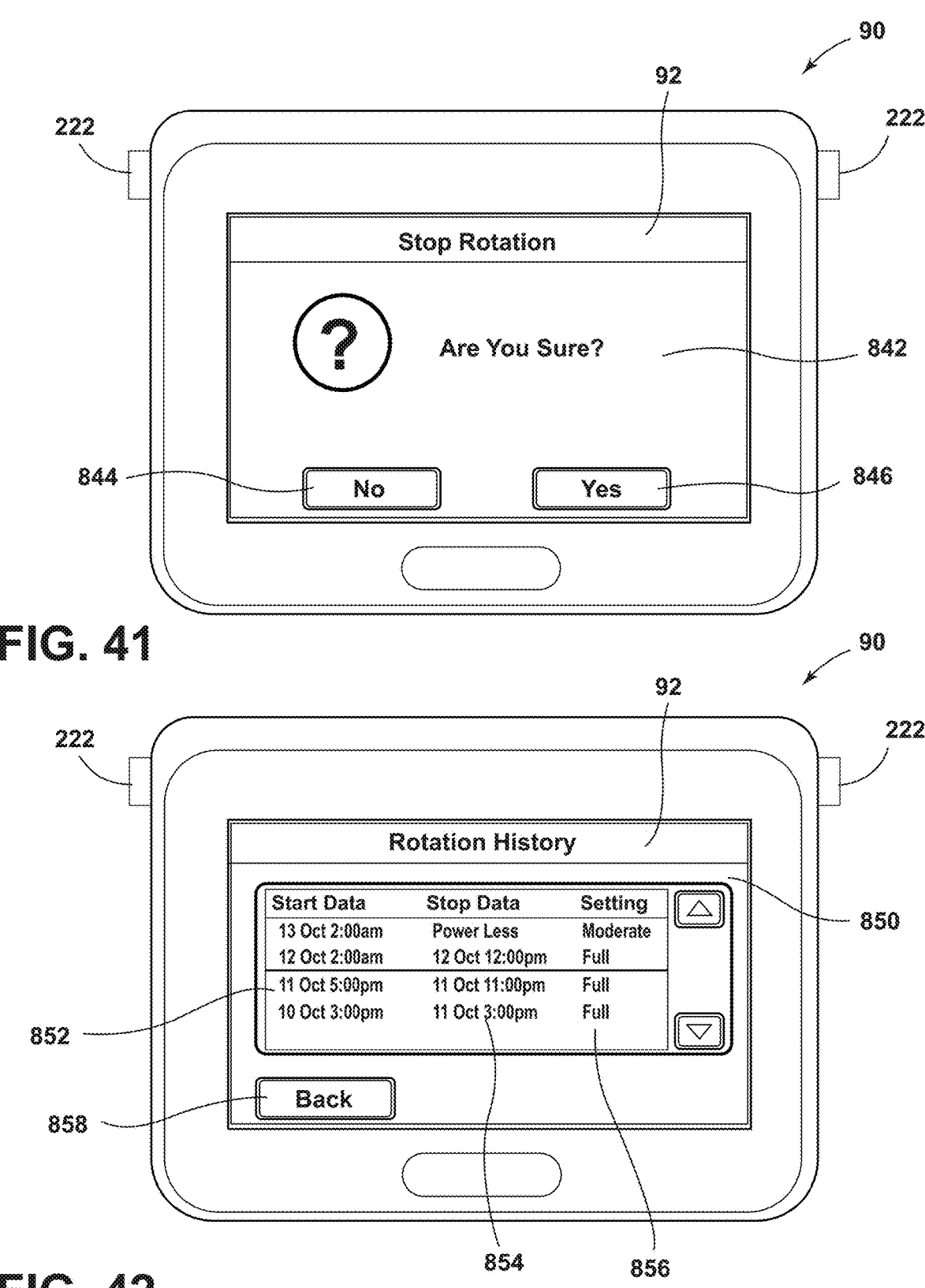
FIG. 41 is illustrative of a stop confirmation screen on a display of a control panel to provide a secondary confirmation to stop a rotation function, according to the present disclosure.
FIG. 42 is illustrative of a history screen on a display of a control panel, illustrating history data for a rotation function, according to the present disclosure.

Referring to FIG. 41, when the caregiver selects the stop rotation icon 834 to stop the CLR function, for example on the updated home screen 810 (FIG. 38) or the rotation status screen 818 (FIG. 25), the control unit 22 is configured to generate a stop confirmation screen 842. The stop confirmation screen 842 provides a "no" icon 844 and a "yes" icon 846 to confirm the change to the CLR function. This provides a secondary step-two authorization to minimize or prevent inadvertent stopping of the CLR function. If the caregiver selects the "no" icon 844, the control screen is configured to return to the updated home screen 810 and the CLR function is configured to remain in the active mode. If the caregiver selects the "yes" icon 846, the CLR function is adjusted to an off mode. When in the off mode, the CLR function remains enabled to be reactivated at a later time.

Referring again to FIG. 25, as well as to FIG. 42, the rotation status screen 818 also includes the history icon 682. The caregiver may select the history icon 682, which results in the control unit 22 generating and displaying a history screen 850, as illustrated in FIG. 42. The history screen 850 compiles the information about the CLR function for the patient, the support apparatus 10, for a predefined period of time, etc. In the example illustrated in FIG. 42, the history screen 850 includes start data 852 for each time the CLR function was adjusted to the active mode, stop data 854 for each time the CLR function was adjusted to the off mode, and settings information 856 about the rotation level 670.

The control unit 22 may store history data (e.g., data 852, 854 and information 856) in the memory 82 (FIG. 18) and/or retrieve the history data from an electronic medical record of the patient generally stored in the local server 320 or the remote server 350 (FIG. 6). The caregiver may return to the rotation settings screen 668 (FIG. 25) by selecting a back icon 858.

Figure 43:
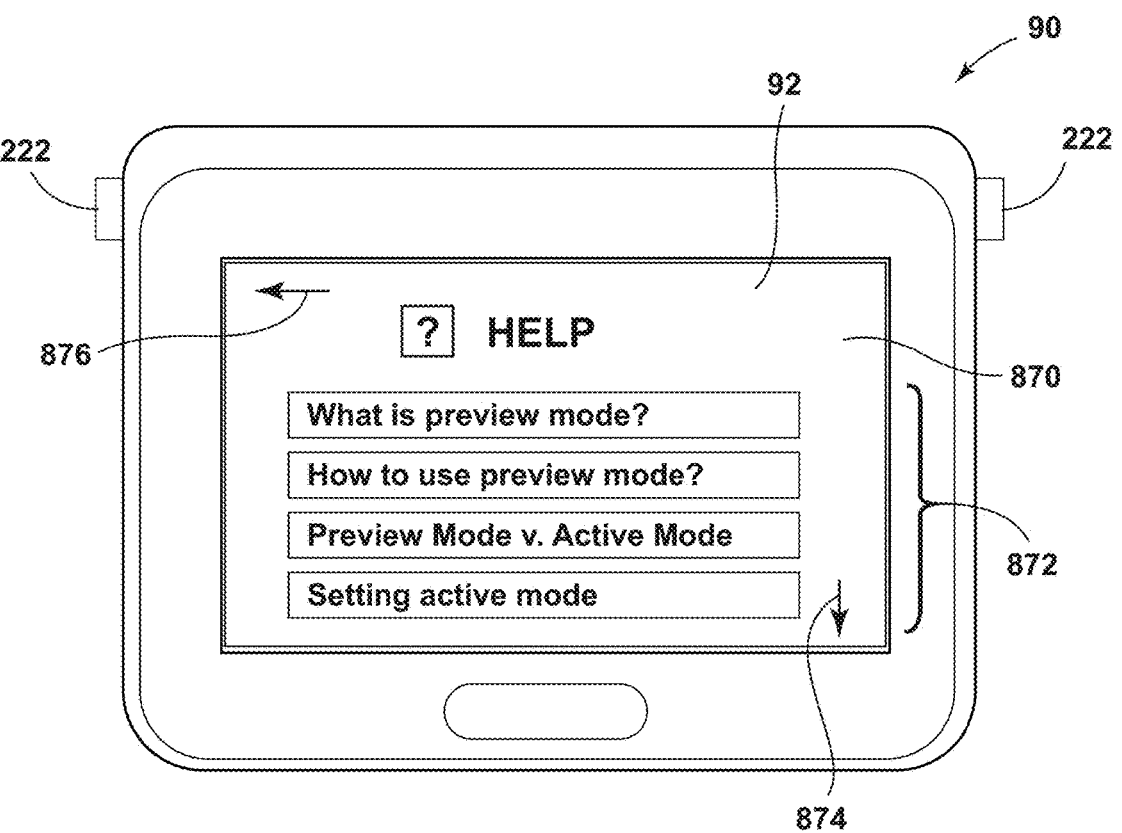
FIG. 43 is illustrative of a help screen on a display of a control panel, according to the present disclosure.

Referring to FIG. 43, in certain aspects, the control unit 22 may be configured to generate and display at least one help screen 870 on the touchscreen display 92 after selecting the help feature 272 on the home screen 620 (FIG. 20). The help screen 870 may provide the caregiver with information on how to operate the CLR function, as well as other functions and features of the support apparatus 10. The help screen 870 may include help icons 872 related to the CLR function. Upon selection of one of the help icons 872, the control unit 22 is configured to display more information for the caregiver. Such information may include how to start the preview mode, how to start the active mode, how to adjust the bed exit feature 106, what features are included in the predefined conditions, etc. Selecting an arrow 874 may display additional help icons 872, while a back arrow 876 extends the caregiver to the home screen 620 (FIG. 20).

Figure 44:
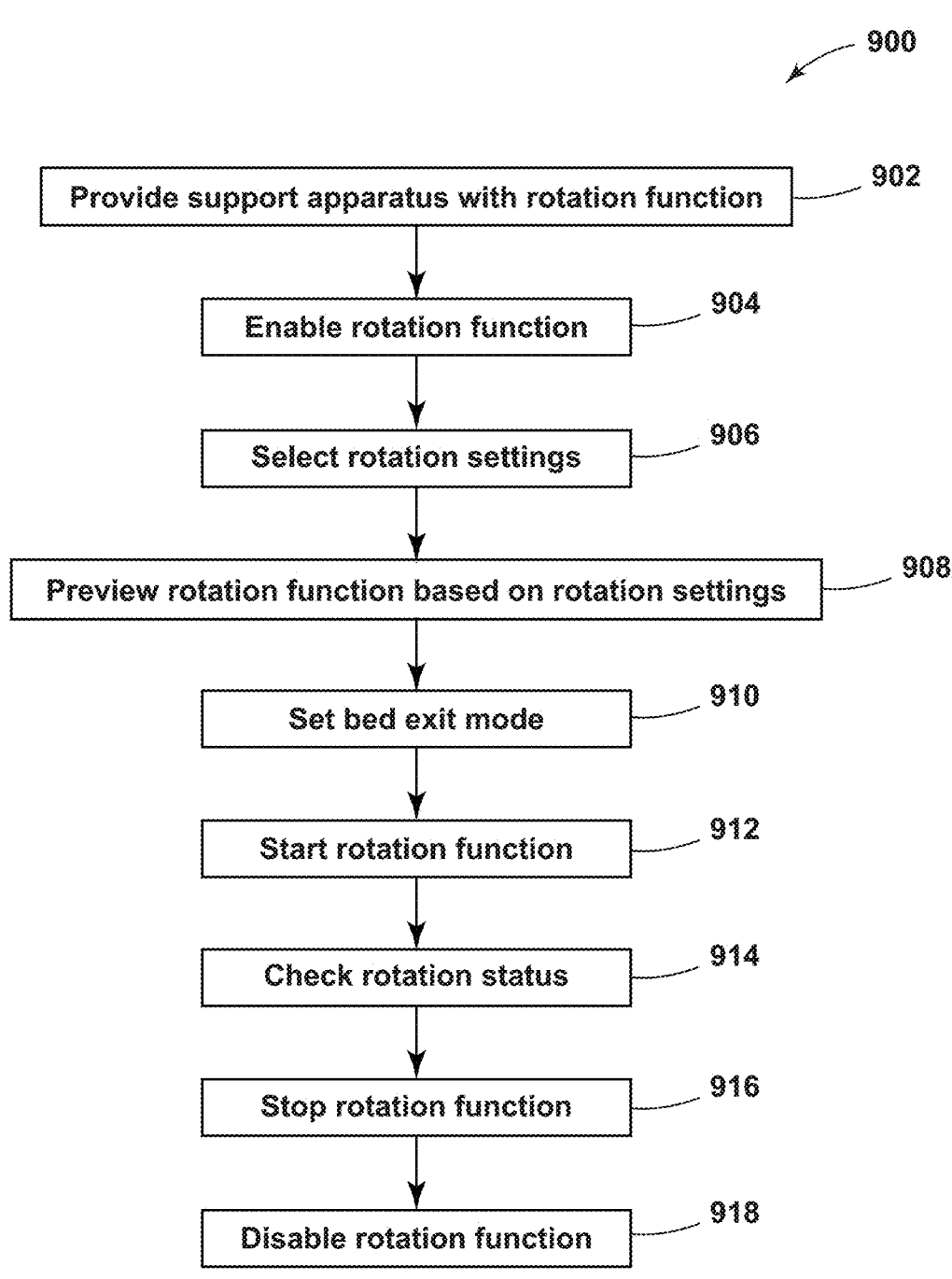
FIG. 44 is a flow diagram of a method for authorizing activation of a rotation function, according to the present disclosure.

Referring to FIG. 44, and with further reference to FIGS. 1-43, a method 900 for authorizing the activation of the CLR function includes step 902 of providing the support apparatus 10 with the CLR function. Step 902 may include providing the support apparatus 10 that had the CLR function installed during manufacturing. Additionally or alternatively, step 902 may include performing the software update on the support apparatus 10 to install the CLR function. The caregiver can confirm the support apparatus 10 has the CLR function through the CLR icon 628 on the touchscreen display 92 of the control panel 90 and/or the CLR symbol 602 on the upper frame 44.

In step 904, the caregiver enables the CLR function. The caregiver may access the apparatus settings screen 642 to select the rotation icon 646 and navigate through the confirmation screen 648 to enable the CLR function. Additionally or alternatively, the control unit 22 may seek the key code 24 from the authorization source 26 to confirm authorization for enabling the CLR function. The enablement is confirmed through a multi-step authorization process.

In step 906, the caregiver may select or adjust various rotation settings via the rotation settings screen 668. Settings that may be adjusted to include, but are not limited to, the rotation level 670, activation or deactivation of the side positions, the hold time 676, overall time for the active mode, etc.

In step 908, the caregiver is configured to preview the CLR function based on the selected rotation settings. The caregiver is configured to navigate through the various screens regarding predefined conditions and/or the bed exit feature 106. The control unit 22 is configured to activate the CLR function for the pneumatic system 130 in the preview mode to complete a single cycle through the selected patient positions. The caregiver is configured to monitor various lines and tubing from devices connected to the patient during the preview mode and make any adjustments prior to adjusting the pneumatic system 130 to the active mode of the CLR function. Additionally, in step 908, the caregiver may view the help screen 870 to obtain additional information about the CLR function.

Further, in step 908, the control unit 22 is configured to generate and display the preview screen 800. The preview screen 800 illustrates the rotation status of the current and past patient positions during the preview mode operation of the CLR function. In this way, the caregiver can preview the selected settings for the CLR function. Additionally, the control unit 22 is configured to update the preview screen 800 to correspond with the adjustment of the pneumatic system 130.

In step 910, the caregiver is configured to activate or adjust the sensitivity level for the bed exit feature 106. The bed exit feature 106 may be deactivated or may be adjusted to the lowest sensitivity to prevent or minimize false alarms due to the movement of the patient during the CLR function.

In step 912, the caregiver is configured to adjust the CLR function to the active mode for the predefined period of time. When in the active mode, the pneumatic system 130 is configured to continuously cycle through the selected patient positions and hold the patient in each selected position for the hold time 676. In step 914, the caregiver is configured to confirm or check the rotation status during the active mode of the CLR function. The control unit 22 is configured to generate the rotation status screen 818 and adjust the touchscreen display 92 to the rotation status screen 818 to display a variety of information about the current status of the CLR function and the pneumatic system 130. The information may include the current patient position, the elapsed time 824 in the current patient position, the remaining time 826 in the current patient position, elapsed time 828 since the CLR function was activated, the rotation level 670, etc. The rotation status screen 818 may be updated with the adjustment of the pneumatic system 130 through the various patient positions.

In step 916, the CLR function is stopped or adjusted to the off mode. Generally, the CLR function remains enabled when in the off mode for reactivation at a later time. The CLR function may be stopped automatically upon completion of the predefined period of time for the active mode or may be stopped by the caregiver through the stop rotation icons 812, 834 on the touchscreen display 92.

In step 918, the caregiver is configured to disable the CLR function. The caregiver is configured to navigate various screens on the touchscreen display 92 to the apparatus settings screen 642 and select the rotation icon 646. The caregiver is then configured to confirm the disabling of the CLR function through the two-step authorization in the confirmation screen 648 or screens 648. Additionally or alternatively, the control unit 22 may seek the key code 24 to provide authorization for disabling the CLR function. It is understood that the steps 902-918 of the method 900 may be performed in any order, simultaneously, repeated, and/or omitted without departing from the teachings herein.

Figures 45, 46:
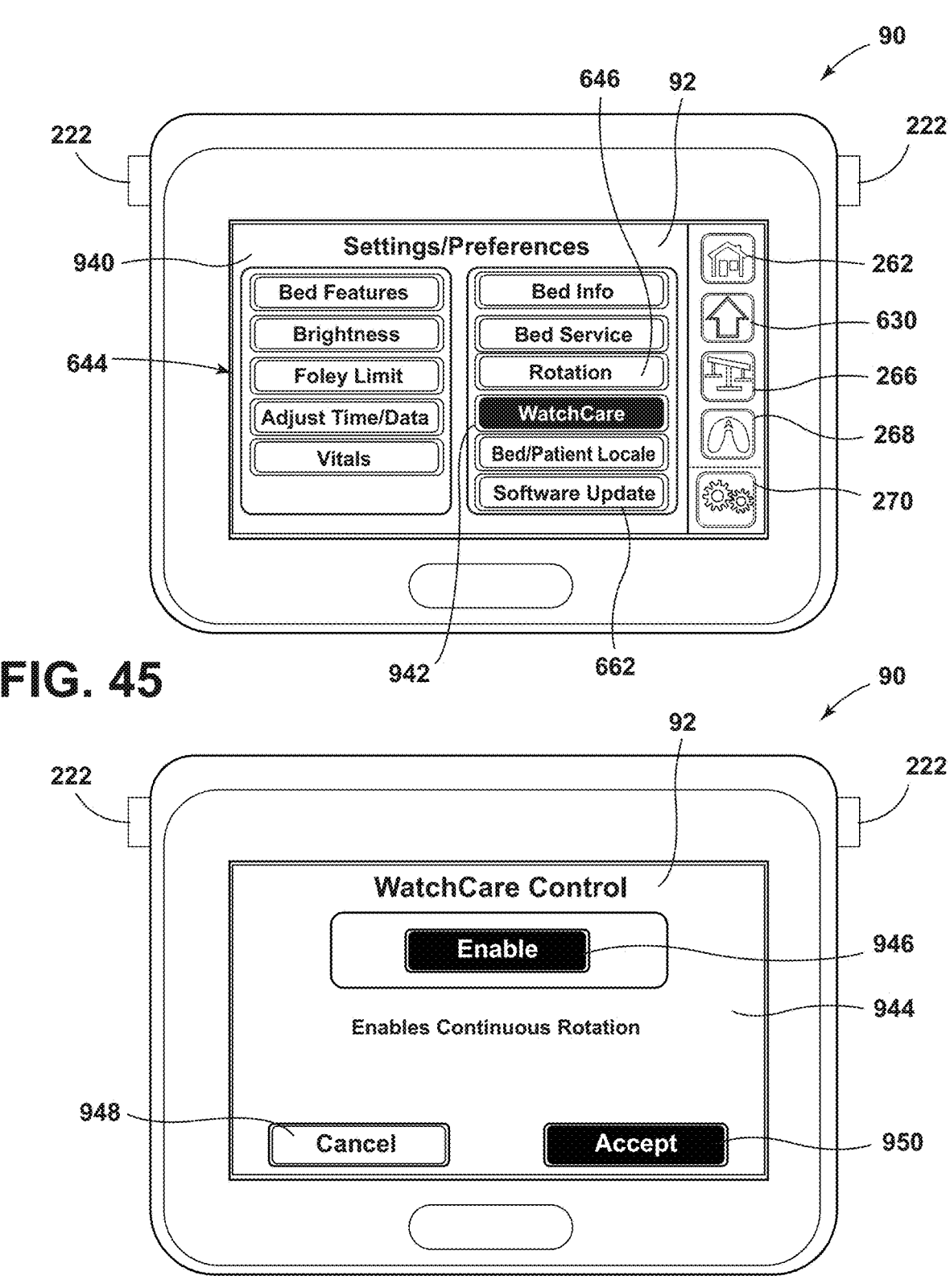
FIG. 45 is illustrative of an apparatus settings screen on a display of a control panel with a detection icon for an incontinence detection system, according to the present disclosure.
FIG. 46 is illustrative of a confirmation screen on a display of a control panel for providing two-step authorization to enable an incontinence detection system, according to the present disclosure.

Referring to FIGS. 44 and 45, as well as FIGS. 1-44, multiple software-based features and functions may be controlled (e.g., enabled, activated, adjusted, deactivated, or disabled) through the touchscreen display 92 of the control panel 90. Each of these features and functions may be enabled and disabled through the two-step authorization on the touchscreen display 92 and/or through the key code 24. In addition to the pneumatic system 130, the incontinence detection system 150 may also be enabled and disabled through the touchscreen display 92 and/or using the key code 24. For example, when the incontinence detection system 150 is in communication with the control unit 22, an apparatus settings screen 940 includes a detection icon 942. The incontinence detection system 150 may be configured as a WatchCare® Incontinence Management System owned by Hill-Rom Services, Inc., and in such examples, the detection icon 942 may be labeled "WatchCare."

Upon selection of the detection icon 942, the control unit 22 is configured to generate a confirmation screen 944 including an enable icon 946, as illustrated in FIG. 46. After selecting the enable icon 946, the caregiver may then select a cancel icon 948 to return to the apparatus settings screen 642 or an accept icon 950 to enable the incontinence detection system 150. It is contemplated that the control unit 22 may generate a first confirmation screen 944 with the enable icon 946 and, upon selection of the enable icon 946, may generate a second confirmation screen 944 with the cancel icon 948 and the accept icon 950. The selection of the enable icon 946 and the accept icon 950 provides two-step authorization to enable the incontinence detection system 150.

Additionally or alternatively, upon selection of the enable icon 946, the control unit 22 may seek the key code 24 to authorize the enablement of the incontinence detection system 150. The incontinence detection system 150 may be disabled through a similar process. It is contemplated that the control unit 22 may be configured to generate multiple confirmation screens 944, with a second confirmation screen 944 viewable after selection of the enable icon 946, or may be configured to generate a single confirmation screen 944 with the accept icon 950 being selectable after the selection of the enable icon 946.

Use of the present device and system may provide a variety of advantages. For example, for integrated features 20, the authorization system 300 may provide additional security for controlling the integrated features 20. Additionally, the control unit 22 of the support apparatus 10 is configured to locate and retrieve the key code 24 to authorize the selected control for the integrated features 20. Also, the key code 24 may be a generic code or may be more specific. Further, the key code 24 may be encrypted, which provides additional security to the authorization system 300. Moreover, the key code 24 may be stored in the authorization source 26, which may be in communication with the control unit 22 via wired or wireless communication. Additionally, the use of the key code 24 prevents unauthorized, inadvertent, or accidental control of the integrated features 20.

Additionally, the control panel 90 may be utilized to provide multiple confirmation screens 648, 944 for enabling and disabling various features and functions of the support apparatus 10, such as the CLR function and the incontinence detection system 150. Further, the confirmation via the control panel 90 may be used independently of or in conjunction with the key code 24 retrieved from the authorization source 26. Also, the CLR function may be customized and personalized for the patient by adjusting settings through the control panel 90. Moreover, the caregiver may activate the CLR function in the preview mode to confirm the settings of the CLR function, maximize efficiency in confirming the settings, and confirm tubes and lines extending to the patient. The preview mode allows the caregiver to adjust any affected tubes and lines prior to adjusting the pneumatic system 130 to the active mode. Additionally, the control unit 22 may prompt the caregiver to check certain predefined conditions and aspects of the bed exit feature 106 prior to adjusting the CLR function to the preview mode and the active mode.

Further, the home screen 620 of the control panel 90 is configured to automatically adjust configurations in response to activated features, as well as to display the stop rotation icon 834 when the CLR function is activated. Additionally, the sleep screen 840 of the control panel 90 is configured to show the active CLR graphic 814 when the CLR function is activated or in progress. Moreover, the support apparatus 10 having the CLR function may be interchangeable between different units, such as the ICU and the MedSurge unit, of the medical facility, allowing for increased flexibility, particularly during a surge event. Additional benefits or advantages may be realized and/or achieved.

The devices and systems disclosed herein are further summarized in the following paragraphs and are further characterized by combinations of any and all various aspects described herein.

According to at least one aspect of the present disclosure, a patient support apparatus includes a user interface operably coupled to a frame. An integrated feature is included in at least one of the frame and a mattress disposed on the frame. The integrated feature is operable between an unlocked state and a locked state. The locked state is a default condition. A control unit is in communication with the user interface and the integrated feature. The control unit is configured to receive an input related to controlling the integrated feature via the user interface, seek a key code stored in an authorization source, control the integrated feature based on the input upon obtaining the key code, and retain the integrated feature in the locked state if at least one of the authorization source is free of the key code and the control unit is free of communication with the authorization source.

According to another aspect of the present disclosure, an integrated feature is a pneumatic system within a mattress.

According to another aspect of the present disclosure, an integrated feature is at least one of an actuation assembly within a frame configured to adjust segments of the frame and a lift system configured to adjust a height of a deck of the frame.

According to another aspect of the present disclosure, an authorization source is at least one of a removable authorization device and a server.

According to another aspect of the present disclosure, a removable authorization device is selectively coupled to at least one of a connector port of a user interface and a connector port on a siderail coupled to a frame.

According to another aspect of the present disclosure, a server is a remote server configured to wirelessly communicate with a control unit.

According to another aspect of the present disclosure, a server is a local server configured to communicate with a control unit via wired communication and wireless communication.

According to another aspect of the present disclosure, a key code includes a serial number of a patient support apparatus.

According to another aspect of the present disclosure, a siderail is operably coupled to a frame. A user interface is a graphical user interface coupled to the siderail.

According to another aspect of the present disclosure, a control unit is configured to unlock an integrated feature in response to obtaining a key code.

According to another aspect of the present disclosure, a control unit is configured to return an integrated feature to a locked state after a predefined period of time has elapsed.

According to another aspect of the present disclosure, an apparatus authorization system includes a pneumatic system disposed within an interior of a mattress. The pneumatic system includes bladders in fluid communication with a pump. An authorization device stores a key code. The authorization device is removably coupled to a frame. A control unit is in communication with the pneumatic system and the authorization device. The control unit is configured to receive an input related to controlling the pneumatic system, determine whether the authorization device is coupled to the frame, seek the key code from the authorization device, and control the pneumatic system based on the input upon obtaining the key code.

According to another aspect of the present disclosure, a siderail is operably coupled to a frame. The siderail includes a connector port configured to receive the authorization device.

According to another aspect of the present disclosure, a caregiver device is in communication with a control unit. An authorization device is coupled to the caregiver device.

According to another aspect of the present disclosure, a caregiver device is coupled to a frame via a device port. A control unit is configured to communicate with the caregiver device via wired communication to seek a key code.

According to another aspect of the present disclosure, a control unit includes circuitry configured to communicate with a caregiver device via wireless communication to seek a key code.

According to another aspect of the present disclosure, a control panel is coupled to a frame. The control panel includes a connector port for selectively receiving an authorization device.

According to another aspect of the present disclosure, a siderail is operably coupled to a frame. A control panel is coupled to the siderail.

According to another aspect of the present disclosure, a control panel includes a graphical user interface.

According to another aspect of the present disclosure, a control unit is configured to retain a pneumatic system in a locked state when the control unit is free of communication with an authorization device.

According to another aspect of the present disclosure, an authorization system includes an integrated feature is included in at least one of a frame and a mattress positioned on the frame. A server stores a key code. A control unit is in communication with the server and the integrated feature. The control unit is configured to receive an input relating to control of the integrated feature, seek the key code from the server, adjust the integrated feature to an unlocked state upon obtaining the key code, and retain the integrated feature in a locked state when the server is free of the key code.

According to another aspect of the present disclosure, a frame and a control unit are included in a support apparatus. A key code includes a serial number of a support apparatus.

According to another aspect of the present disclosure, a server is a local server in communication with a control unit.

According to another aspect of the present disclosure, a server is a remote server in communication with a control unit via wireless communication.

According to another aspect of the present disclosure, a removable feature is selectively coupled to a frame and configured to communicate with a control unit. The removable feature includes at least one of a vital signs system, an incontinence detection system, and a microclimate management system.

According to another aspect of the present disclosure, a control panel is coupled to a frame and in communication with a control unit. The control unit includes a touchscreen display.

According to another aspect of the present disclosure, a touchscreen display includes an icon related to an integrated feature and a lock indicator proximate to the icon.

According to another aspect of the present disclosure, an authorization system includes a control unit of a support apparatus. The control unit is configured to receive an input related to controlling at least one integrated feature of the support apparatus, determine whether an authorization device is in communication with the control unit, retrieve a key code from the authorization device if the authorization device is in communication with the control unit, retrieve the key code from a server if the control unit is free of communication with the authorization device, and unlock the integrated feature upon retrieving the key code.

According to another aspect of the present disclosure, a support apparatus includes a base frame, an upper frame coupled to the base frame, and a mattress positioned on the upper frame.

According to another aspect of the present disclosure, at least one integrated feature includes at least one of an actuation assembly operably coupled to an upper frame, a lift system operably coupled to the upper frame, a pneumatic system within a mattress, and an indicator system coupled with a base frame.

According to another aspect of the present disclosure, at least one integrated feature includes multiple integrated features. A key code is different for each integrated feature.

According to another aspect of the present disclosure, a control unit is configured to retain at least one integrated feature in a locked state when the control unit is free of communication with an authorization device and a server is free of the key code.

According to another aspect of the present disclosure, a control unit is configured to generate an error message when a control unit is free of communication with an authorization device and a server is free of a key code.

According to another aspect of the present disclosure, a control unit is configured to communicate an error message to be displayed on a control panel of a support apparatus.

According to another aspect of the present disclosure, a control unit is configured to generate an alert when the control unit is free of communication with an authorization device and a server is free of the key code.

According to another aspect of the present disclosure, a control unit is configured to communicate an alert to at least one of a caregiver device and a remote device.

According to another aspect of the present disclosure, a method for authorizing control of a support apparatus feature includes receiving an input related to controlling a feature of a support apparatus; determining whether the feature is an integrated feature or a removable feature that utilizes additional hardware; seeking a key code when the feature is the integrated feature; controlling the integrated feature based on the input when the key code is obtained by a control unit of the support apparatus; and retaining the integrated feature in a locked state when the control unit is free of communication related to the key code.

According to another aspect of the present disclosure, a method includes coupling an authorization source with a control unit.

According to another aspect of the present disclosure, a step of coupling an authorization source with a control unit includes coupling an authorization device with a support apparatus.

According to another aspect of the present disclosure, a method includes obtaining a key code from a server via wireless communication with a control unit.

According to another aspect of the present disclosure, a method includes generating at least one of an error message and an alert when a control unit is free of communication related to a key code.

According to another aspect of the present disclosure, a method for authorizing control of a support apparatus feature including generating a key code; storing the key code in an authorization source; coupling the authorization source with a support apparatus; seeking the key code in response to receiving an input related to control of an integrated feature of the support apparatus; and controlling the integrated feature based on the input in response to obtaining the key code.

According to another aspect of the present disclosure, a method includes returning an integrated feature to a locked state.

According to another aspect of the present disclosure, a method includes obtaining a key code from an authorization source.

According to another aspect of the present disclosure, a step of obtaining a key code includes adjusting an integrated feature to an unlocked state.

According to another aspect of the present disclosure, a step of generating a key code includes encrypting the key code.

According to at least one aspect of the present disclosure, an authorization system includes a control panel coupled to a support apparatus having a pneumatic system. The control panel includes a display. A control unit is communicatively coupled to the control panel. The control unit is configured to receive settings information for a continuous rotation function of the pneumatic system, generate a preview screen to be viewed on the display, generate a conditions list to be viewed on the display indicating predefined conditions to be satisfied prior to activation of the continuous rotation function, and activate the pneumatic system in a preview mode to adjust the pneumatic system through a cycle of the continuous rotation function when each of the predefined conditions is satisfied.

According to another aspect of the present disclosure, a pneumatic system includes a first bladder and a second bladder disposed within a mattress. A cycle includes adjusting the first bladder to an inflated condition to rotate a patient to a first side position, adjusting the first bladder and a second bladder to a deflated condition to rotate the patient to a center position, and adjusting the second bladder to an inflated condition to rotate the patient to a second side position.

According to another aspect of the present disclosure, a preview screen includes multiple patient position graphics configured to be updated with adjustment of a pneumatic system during a preview mode of a continuous rotation function.

According to another aspect of the present disclosure, a control unit is configured to generate a timing screen including a slider on a timing bar for adjusting a hold time for holding each patient position when a pneumatic system is an active mode of a continuous rotation function.

According to another aspect of the present disclosure, a control unit is configured to generate an exit error alert to be viewed on a display when a bed exit feature is deactivated and when the control unit receives an input to activate a pneumatic system.

According to another aspect of the present disclosure, a control unit is configured to generate an exit settings screen configured to receive an input to adjust a sensitivity level for a bed exit feature.

According to another aspect of the present disclosure, a control unit is configured to start at least one of a preview mode and an active mode when each condition on a conditions list is satisfied.

According to another aspect of the present disclosure, a conditions list includes at least one of a head end of a support apparatus in a lowered position, a level frame for the support apparatus, a siderail in a raised position, and a disengagement of a device from a connector port of the support apparatus.

According to another aspect of the present disclosure, a control unit is configured to seek a key code from an authorization source to adjust a pneumatic system to an active mode for providing a continuous rotation function for a predefined period of time.

According to another aspect of the present disclosure, a control unit is in communication with an incontinence detection system. The control unit is configured to generate an apparatus settings screen with a detection icon for at least one of enabling and disabling the incontinence detection system.

According to another aspect of the present disclosure, a control unit is configured to seek a key code to at least one of enable and disable a continuous rotation function of a pneumatic system.

According to another aspect of the present disclosure, a control unit is configured to generate a confirmation screen to receive an input for enabling a continuous rotation function of a pneumatic system with a multi-step authorization.

According to another aspect of the present disclosure, an authorization system for a support apparatus includes a pneumatic system including a first bladder and a second bladder. Each of the first bladder and the second bladder are operable between an inflated condition and a deflated condition to provide a rotation function. A control panel includes a display. A control unit is communicatively coupled with the pneumatic system and the control panel. The control unit is configured to generate a preview screen configured to be communicated to the display for viewing information on a preview mode of the rotation function, activate the pneumatic system in the preview mode of the rotation function, activate the pneumatic system in an active mode to perform the rotation function for a predefined period of time and generate a status screen configured to be communicated to the display for viewing a current status of the pneumatic system in the active mode.

According to another aspect of the present disclosure, a current status includes at least one of elapsed time from a start of a predefined period of time for an active mode, an elapsed time from a start of a hold time for a current patient position, patient position graphics corresponding with patient positions, and a stop rotation icon.

According to another aspect of the present disclosure, patient position graphics include a left side graphic, a center graphic, and a right side graphic.

According to another aspect of the present disclosure, a current patient position is indicated by differentiating at least one patient position graphic.

According to another aspect of the present disclosure, a control unit is configured to generate a home screen configured to be viewed on a display. The home screen includes an active status graphic when a rotation function is in an active mode.

According to another aspect of the present disclosure, a control unit is configured to generate an updated home screen when a pneumatic system is in an active mode of a control function. The updated home screen is different from the home screen to include a stop rotation icon for stopping the rotation function of the pneumatic system.

According to another aspect of the present disclosure, sensors are configured to sense a position of a patient on a support apparatus. The sensors are configured to communicate the position to the control unit when a bed exit feature is activated.

According to another aspect of the present disclosure, a bed exit feature has multiple sensitivity levels. A lowest sensitivity level is active when a rotation function is in an active mode.

According to another aspect of the present disclosure, a control unit is configured to utilize a multi-step authorization through inputs received in a confirmation screen to enable a rotation function of a pneumatic system.

According to another aspect of the present disclosure, a control unit is configured to enable a rotation function in response to receiving a key code from an authorization source.

According to another aspect of the present disclosure, an authorization system for a support apparatus includes a control unit configured to adjust a pneumatic system between predefined positions for a rotation function during a preview mode, generate a preview screen indicating a current position of the pneumatic system during the preview mode, adjust the pneumatic system between the predefined positions during an active mode of the rotation function for a predefined period of time, generate a status screen indicating a current status of the pneumatic system during the active mode, and generate a conditions list of predefined conditions to be satisfied prior to activation of the pneumatic system.

According to another aspect of the present disclosure, a control unit is configured to adjust a pneumatic system to an active mode when each predefined condition of a conditions list is satisfied.

According to another aspect of the present disclosure, a conditions list includes at least one of a head end of a support apparatus in a lowered position, a foot end of the support apparatus in a raised position, a level frame for the support apparatus, a siderail in a raised position, and a disengagement of a device from a connector port of the support apparatus.

According to another aspect of the present disclosure, a pneumatic system is configured to be adjusted through a single cycle of predefined positions when in a preview mode.

According to another aspect of the present disclosure, a preview mode is free of a hold time in each position.

According to another aspect of the present disclosure, a conditions list includes a first indicator corresponding with each predefined condition that is satisfied and a second indicator corresponding with each predefined condition to be satisfied prior to the activation of a pneumatic system.

According to another aspect of the present disclosure, a method for authorizing activation of a pneumatic system rotation function includes enabling a continuous rotation function of a pneumatic system; selecting rotation settings including at least one of a predefined period of time for an active mode, patient positions, and a level of rotation; previewing the continuous rotation function based on the rotation settings; setting an out of bed mode for the continuous rotation function; and activating an active mode for the continuous rotation function.

According to another aspect of the present disclosure, a method includes displaying a status screen for viewing a current status of a continuous rotation function. The current status includes at least one of elapsed time in a current position, time remaining in the current position, and graphics indicating the current position.

According to another aspect of the present disclosure, a step of previewing a continuous rotation function includes displaying a preview screen including a rotation status during a preview mode, and adjusting a pneumatic system through a single cycle of patient positions. According to another aspect of the present disclosure, a step of previewing a continuous rotation function includes updating a preview screen as a pneumatic system is adjusted through a single cycle of patient positions.

According to another aspect of the present disclosure, a step of previewing the continuous rotation function includes updating a preview screen as a pneumatic system is adjusted through a single cycle of patient positions.

According to another aspect of the present disclosure, a step of enabling a continuous rotation function includes receiving a multi-step authorization through inputs received in a confirmation screen on a display of a control panel.

According to another aspect of the present disclosure, a step of enabling a continuous rotation function includes retrieving a key code from an authorization source.

According to another aspect of the present disclosure, an authorization system for a support apparatus includes a control unit configured to generate an initial home screen when a rotation function of a pneumatic system is deactivated and generate a notification to be viewed on a display. The notification is configured to instruct a caregiver to confirm that a pendant is removed from a siderail of a support apparatus. The control unit is also configured to generate a conditions list to be viewed on the display that includes predefined conditions to be satisfied prior to activation of a pneumatic system, activate the pneumatic system in at least one of a preview mode and an active mode, and generate an updated home screen when the rotation function is activated. The updated home screen includes a stop feature for deactivating the rotation function.

According to another aspect of the present disclosure, a control unit is configured to indicate which predefined conditions are satisfied with an indicator.

According to another aspect of the present disclosure, a control unit is configured to enable and disable a rotation function.

According to another aspect of the present disclosure, a control unit is configured to seek a key code. The control unit is configured to at least one of enable and disable a rotation function in response to the key code.

According to another aspect of the present disclosure, a control unit is configured to determine when a device is connected to a connector port of a siderail of a support apparatus.

According to another aspect of the present disclosure, a conditions list includes a condition for a device being disconnected from a connector port.

An authorization means include a means for receiving a control input coupled to a support means having a position adjustment means. The means for receiving the control input includes a display means. A control means is communicatively coupled to the means for receiving the control input. The control means is configured to receive settings information for a continuous rotation function of the position adjustment means, generate a preview screen to be viewed on the display means, and activate the position adjustment means in a preview mode to adjust through a single cycle of the continuous rotation function.

A means for supporting a patient includes a base support means and a topper support means disposed on a deck of the base support means. An interfacing means for a user is operably coupled to the first support means. An integrated means is included in at least one of the base support means and the topper support means. The integrated means is operable between an unlocked state and a locked state. The locked state is a default condition. A control means is in communication with the interfacing means and the integrated means. The control means is configured to receive an input related to controlling the integrated means via the interfacing means, seek a key code from an authorizing means, control the integrated means based on the input upon obtaining the key code, and retain the integrated means in the locked state if at least one of the authorizing means is free of the key code and the control means is free of communication with the authorization source.

Related applications, for example those listed herein, are fully incorporated by reference. Assertions within the related applications are intended to contribute to the scope and interpretation of the information disclosed herein. Any changes between any of the related applications and the present disclosure are not intended to limit the scope or interpretation of the information disclosed herein, including the claims. Accordingly, the present application includes the scope and interpretation of the information disclosed herein as well as the scope and interpretation of the information in any or all of the related applications.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An authorization system for a medical facility, comprising:

a support apparatus having a pneumatic system;

a control panel coupled to the support apparatus, wherein the control panel includes a display; and a control unit communicatively coupled to the control panel, wherein the control unit is configured to:

receive settings information for a continuous rotation function of the pneumatic system;

seek authorization for at least one of enabling and activating the continuous rotation function via at least one of a key code and a multi-step authorization process via the display;

activate the pneumatic system in a preview mode to adjust the pneumatic system through a single cycle of the continuous rotation function in response to receiving the authorization;

generate a notification to be viewed on the display of the control panel, wherein the notification is configured to instruct a caregiver to confirm that a pendant is removed from a siderail of the support apparatus; and activate the pneumatic system in an active mode for providing the continuous rotation function for a predefined period of time in response to receiving the authorization.

2. The authorization system of claim 1, wherein the control unit is configured to seek the key code in an authorization source communicatively coupled with the control unit, and wherein the control unit is configured to enable and disable the continuous rotation function in response to the key code.

3. The authorization system of claim 1, wherein the control unit is configured to generate a conditions list to be viewed on the display indicating predefined conditions to be satisfied prior to activation of the continuous rotation function in the preview mode and the active mode, wherein the conditions list includes at least one of a head end of the support apparatus in a lowered position, a level frame for the support apparatus, the siderail in a raised position, and a disengagement of a device from a connector port of the support apparatus.

4. The authorization system of claim 1, wherein the control unit is configured to determine when a device is connected to a connector port of the siderail of the support apparatus, wherein a conditions list for activating the pneumatic system in the preview mode and the active mode includes a condition for the device being disconnected from the connector port.

5. The authorization system of claim 1, wherein the control unit is configured to generate a confirmation screen on the display of the control panel to receive inputs for enabling the continuous rotation function of the pneumatic system with the multi-step authorization process.

6. A patient support apparatus, comprising:

a user interface operably coupled to a frame;

an integrated feature included in at least one of the frame and a mattress disposed on the frame, wherein the integrated feature is operable between an unlocked state and a locked state, and wherein the locked state is a default condition;

a removable feature selectively coupled to said patient support apparatus; and a control unit in communication with the user interface and the integrated feature, wherein the control unit is configured to:

display a first icon with a lock indicator related to the integrated feature and a second icon related to the removable feature on the user interface;

dynamically update the second icon in response to the removable feature currently coupled with said patient support apparatus;

control the removable feature in response to a first input received via the user interface and detection of the removable feature being coupled said patient support apparatus;

receive a second input related to controlling the integrated feature via the user interface;

seek a key code stored in an authorization source in response to the second input;

control the integrated feature based on the second input upon obtaining the key code;

retain the integrated feature in the locked state if at least one of the authorization source is free of the key code and the control unit is free of communication with the authorization source; and generate a notification to be viewed on a display of the user interface, wherein the notification is configured to instruct a caregiver to confirm that at least one of a bed remote and a pendant is removed from a siderail.

7. The patient support apparatus of claim 6, wherein the integrated feature is a pneumatic system within the mattress, the pneumatic system configured to provide a continuous rotation function.

8. The patient support apparatus of claim 7, wherein the control unit is configured to:

generate a conditions list to be viewed on the user interface indicating predefined conditions to be satisfied prior to activation of the continuous rotation function; and activate the pneumatic system in a preview mode to adjust the pneumatic system through a cycle of the continuous rotation function when each of the predefined conditions is satisfied.

9. The patient support apparatus of claim 6, wherein the authorization source is at least one of a removable authorization device and a server.

10. The patient support apparatus of claim 9, wherein the removable authorization device is selectively coupled to at least one of a connector port of the user interface and a connector port on the siderail coupled to the frame.

11. The patient support apparatus of claim 6, wherein the control unit is configured to unlock the integrated feature in response to obtaining the key code.

12. An authorization system, comprising:

a control panel coupled to a support apparatus having a pneumatic system, wherein the control panel includes a display; and a control unit communicatively coupled to the control panel, wherein the control unit is configured to:

receive settings information for a continuous rotation function of the pneumatic system;

51 generate a preview screen to be viewed on the display;

generate a conditions list to be viewed on the display indicating predefined conditions to be satisfied prior to activation of the continuous rotation function;

activate the pneumatic system in a preview mode to adjust the pneumatic system through a cycle of the continuous rotation function when each of the predefined conditions is satisfied, wherein the cycle includes continuous adjustment of the pneumatic system through each selected position that automatically ends after adjusting between each of the selected positions;

activate the pneumatic system in an active mode to adjust the pneumatic system through multiple cycles of the continuous rotation function, wherein the multiple cycles for the active mode include rotation between each of the selected positions for a predefined period of time and maintaining each of the selected positions for a predefined hold time; and start at least one of the preview mode and the active mode when each condition on the conditions list is satisfied, wherein the conditions list includes a condition for a device being disconnected from a connector port of a siderail of the support apparatus.

13. The authorization system of claim 12, wherein the preview screen includes multiple patient position graphics configured to be updated with adjustment of the pneumatic system during the preview mode of the continuous rotation function.

14. The authorization system of claim 12, wherein the conditions list further includes a first indicator corresponding with each predefined condition that is satisfied and a second indicator corresponding with each predefined condition to be satisfied prior to the activation of the pneumatic system.

15. The authorization system of claim 12, wherein the control unit is configured to seek a key code from an authorization source to adjust the pneumatic system to the active mode for providing the continuous rotation function for the predefined period of time.

16. The authorization system of claim 15, wherein the control unit is configured to generate a home screen configured to be viewed on the display, and wherein the home screen includes an active status graphic when the continuous rotation function is in the active mode.

17. The authorization system of claim 16, wherein the control unit is configured to generate an updated home screen when the pneumatic system is in the active mode of the continuous rotation function, and wherein the updated home screen is different from the home screen to include a stop rotation icon for stopping the continuous rotation function of the pneumatic system.

18. The authorization system of claim 12, wherein the control unit is configured to utilize a multi-step authorization through inputs received in a confirmation screen of the display of the control panel to enable the continuous rotation function of the pneumatic system.

* * * * *